(12) United States Patent
Nguyen et al.

(10) Patent No.: US 10,906,179 B2
(45) Date of Patent: Feb. 2, 2021

(54) MOBILE ROBOT AND METHOD OF TRACKING MOBILE ROBOT

(71) Applicant: PANASONIC CORPORATION, Osaka (JP)

(72) Inventors: Duyhinh Nguyen, Osaka (JP); Takeshi Ando, Kyoto (JP); Hiroyuki Sasai, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/926,029

(22) Filed: Jul. 10, 2020

(65) Prior Publication Data

US 2020/0338732 A1    Oct. 29, 2020

Related U.S. Application Data

(63) Continuation of application No. 15/913,133, filed on Mar. 6, 2018.

(30) Foreign Application Priority Data

Mar. 8, 2017  (JP) ................................ 2017-044069
Feb. 21, 2018 (JP) ................................ 2018-028834

(51) Int. Cl.
   *B25J 9/16*     (2006.01)
   *B25J 5/00*     (2006.01)
   *B25J 13/08*    (2006.01)
   *G05D 1/02*     (2020.01)

(52) U.S. Cl.
   CPC ............. *B25J 9/1664* (2013.01); *B25J 5/007* (2013.01); *B25J 9/1684* (2013.01); *B25J 13/089* (2013.01); *G05D 1/0244* (2013.01); *G05D 2201/0216* (2013.01)

(58) Field of Classification Search
   None
   See application file for complete search history.

(56) References Cited

U.S. PATENT DOCUMENTS

| | | |
|---|---|---|
| 2009/0062974 A1 | 3/2009 | Tamamoto et al. |
| 2011/0039021 A1 | 2/2011 | Persson et al. |
| 2014/0172223 A1 | 6/2014 | Murphy |

FOREIGN PATENT DOCUMENTS

| | | |
|---|---|---|
| JP | 6-131044    | 5/1994 |
| JP | 2005-46926  | 2/2005 |
| JP | 2007-529017 | 10/2007 |
| JP | 2009-80804  | 4/2009 |
| JP | 2014-203146 | 10/2014 |

*Primary Examiner* — Kenneth J Malkowski
(74) *Attorney, Agent, or Firm* — Wenderoth, Lind & Ponack, L.L.P.

(57) ABSTRACT

A mobile robot includes a mobile robot body, a drawing unit provided at the mobile robot body and including a marker configured to draw a travel locus of the mobile robot on a travel plane, and a detector provided at the mobile robot body and configured to detect the travel locus drawn by the drawing unit. The mobile robot travels along the travel locus detected by the detector.

5 Claims, 42 Drawing Sheets

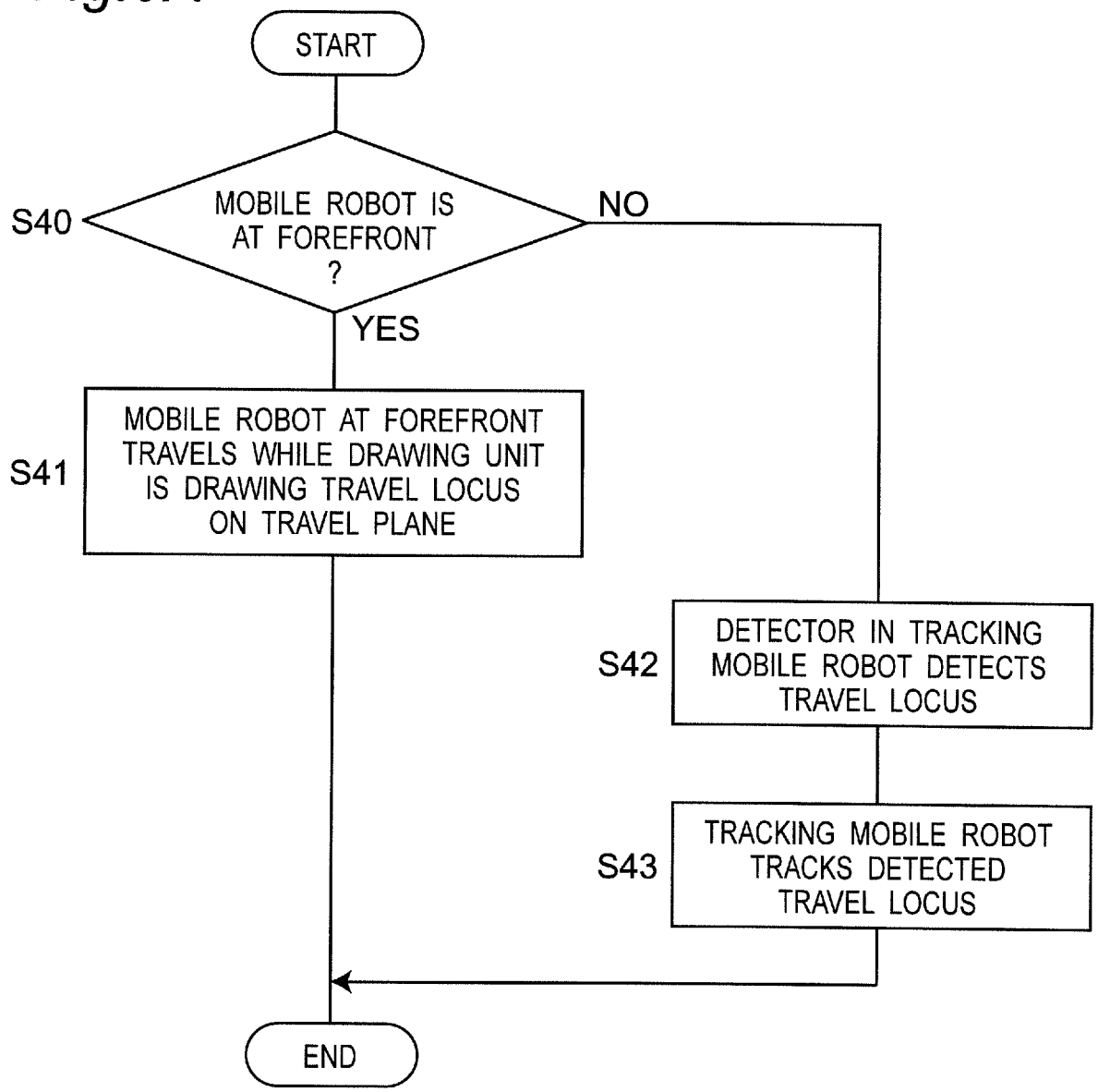

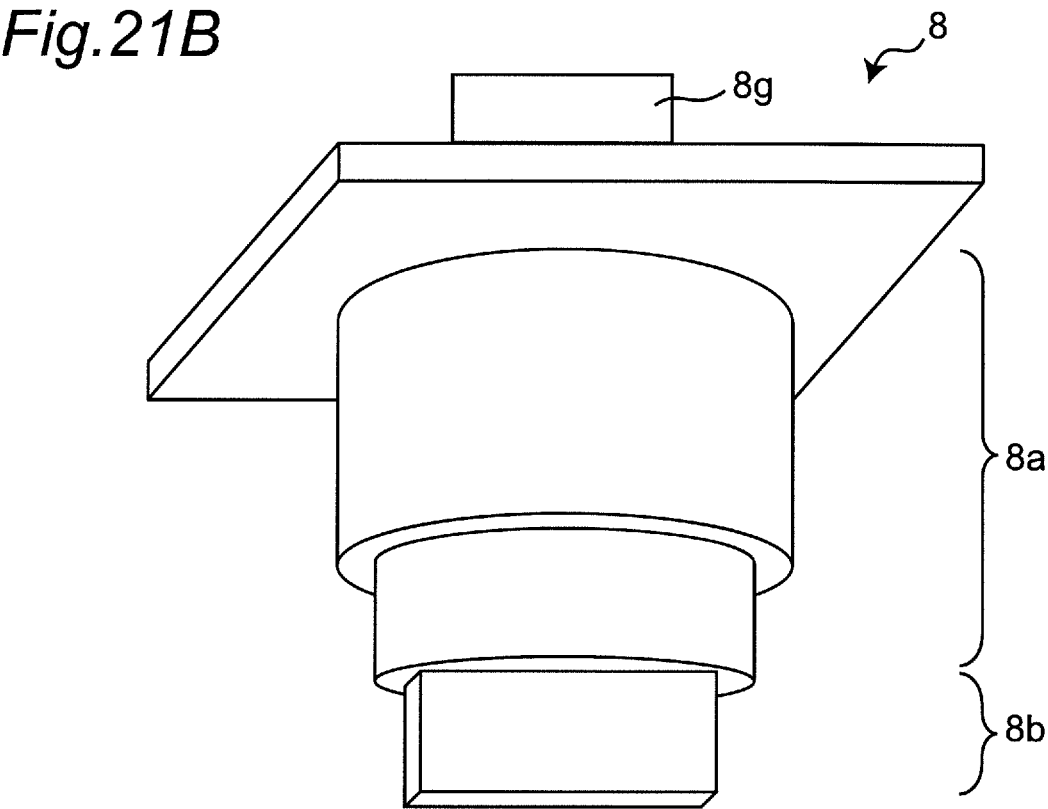
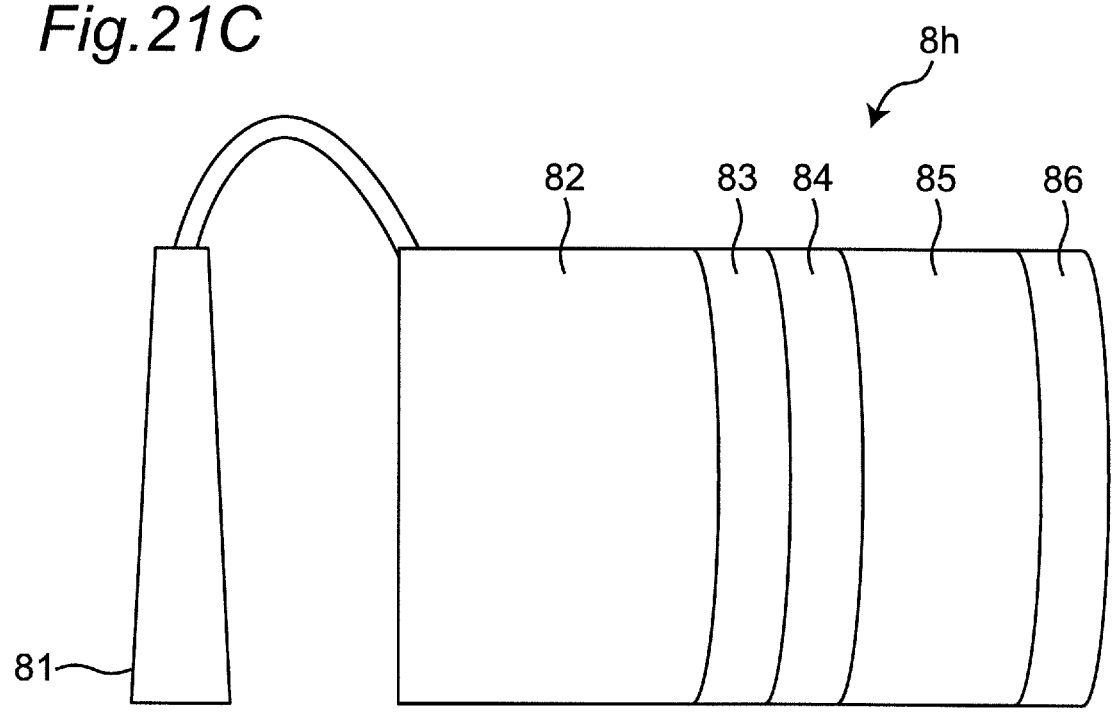

MOBILE ROBOT AND METHOD OF TRACKING MOBILE ROBOT

BACKGROUND OF THE INVENTION

Technical Field

The present disclosure relates to a mobile robot configured to execute tracking control of a single or a plurality of mobile robots and a method of tracking a mobile robot.

Description of the Related Art

A technique for tracking control of a mobile robot includes a typically known method of detecting a target object to be tracked (such as a person or a mobile object) with use of a laser range scanner disposed at a front portion of the mobile robot and tracking the target object.

This method fails to enable distinction of the target object. In a case of tracking one of a plurality of persons, the person to be tracked may be lost and a person different from the tracking target may be tracked.

Assume another case of executing tracking control in accordance with the method described above with a plurality of mobile robots in a single-line formation. When a tracked robot turns around an obstacle or at a corner, tracking robots turn at the respective points. The mobile robot closer to the end of the line has a travel locus too close to the obstacle or the corner and thus highly possibly runs into the obstacle or the corner.

This problem can be solved by executing tracking control along an identical trajectory of causing the plurality of tracking mobile robots to travel along the locus of the tracked mobile robot at the forefront of the line (refer to Patent Document 1: Japanese Unexamined Patent Application Publication No. 2005-46926).

Such tracking control along the identical trajectory requires each of the mobile robots in the formation to accurately recognize the travel locus of the tracked mobile robot at the forefront of the formation and a current own position. The mobile robots accordingly need to move autonomously.

A technique of recognizing an own position of an autonomously mobile robot includes a typical method of comparing a preliminarily prepared map of landmarks with positions of the landmarks acquired by a laser range scanner.

FIG. 38 is an outline view according to Patent Document 1, of tracking control along an identical trajectory. A tracked mobile robot 20 and a tracking mobile robot 50 each include a laser range scanner 40 and a communicator 30. Assume that these robots 20 and 50 travel in a known environment of which an environmental map is prepared. The tracked mobile robot 20 moves autonomously. The mobile robot 20 recognizes an own position with use of the laser range scanner 40 and with reference to the environmental map, and teaches the tracking mobile robot 50 as needed with use of the communicator 30 a locus 60 of the recognized own position. The tracking mobile robot 50 tracks the taught locus 60 of the position of the tracked mobile robot 20 while sequentially recognizing an own position with use of the laser range scanner 40.

This method requires a landmark like a wall in a travel environment for recognition of the own position of the tracking mobile robot 50. The tracking mobile robot 50 fails to recognize the own position in a broad space including no wall or the like. In a case where each autonomously mobile robot loading cargo or a person reaches a destination (e.g. a boarding gate) in a large facility such as an air terminal and scattered autonomously mobile robots are then to be collected at one site, the mobile robots have difficulty in recognizing own positions because of the large facility. Tracking control along an identical trajectory cannot be executed in this case.

SUMMARY

The present disclosure has been achieved in view of such a conventional issue, and an object thereof is to provide a mobile robot configured to execute tracking control along an identical trajectory of a plurality of mobile robots even in an environment like a broad space including no wall or the like, where the mobile robots are inhibited from recognizing own positions, and provide a method of tracking the mobile robot.

One non-limiting and exemplary embodiment of the present disclosure provides a mobile robot comprising:

a mobile robot body;

a drawing unit provided at the mobile robot body and including a marker configured to draw a travel locus of the mobile robot on a travel plane;

a detector provided at the mobile robot body and configured to detect the travel locus drawn by the drawing unit;

a travel driving unit configured to drive to move the mobile robot body; and a drive controller configured to drive control the travel driving unit such that the mobile robot body travels along the travel locus detected by the detector.

It should be noted that general or specific embodiments may be implemented as a system (or an apparatus), a method, an integrated circuit, a computer program, a storage medium, or any selective combination thereof.

Any one of the aspects of the present disclosure enables, in tracking travel of the plurality of mobile robots, the drawing unit in the mobile robot at the forefront of the line to draw the travel locus on the travel plane, enables the detector in the tracking mobile robot to detect the drawn travel locus, and enables the tracking mobile robot to travel along the detected travel locus. Accordingly, tracking control along an identical travel locus of a plurality of mobile robots is achieved even in an environment like a broad space including no wall or the like where the mobile robots are inhibited from recognizing own positions.

BRIEF DESCRIPTION OF THE DRAWINGS

FIG. 4F is a lower-side perspective view depicting an internal structure of the detector in FIG. 4B, excluding a cover and the like;

FIG. 9A is a collection flowchart of basic behavior of the collection system according to the first embodiment of the present disclosure;

FIG. 21B is a perspective view from the bottom of the mobile robot, of the eraser, according to the second embodiment of the present disclosure;

FIG. 21C is an explanatory view depicting a configuration of a sucking device provided as the eraser in the mobile robot;

DESCRIPTION OF THE PREFERRED EMBODIMENTS

The embodiments of the present disclosure will now be described below with reference to the accompanying drawings. Identical constituent elements will be denoted by identical reference signs. The drawings schematically depict their main constituent elements for easier understanding.

First Embodiment

Figure 1:
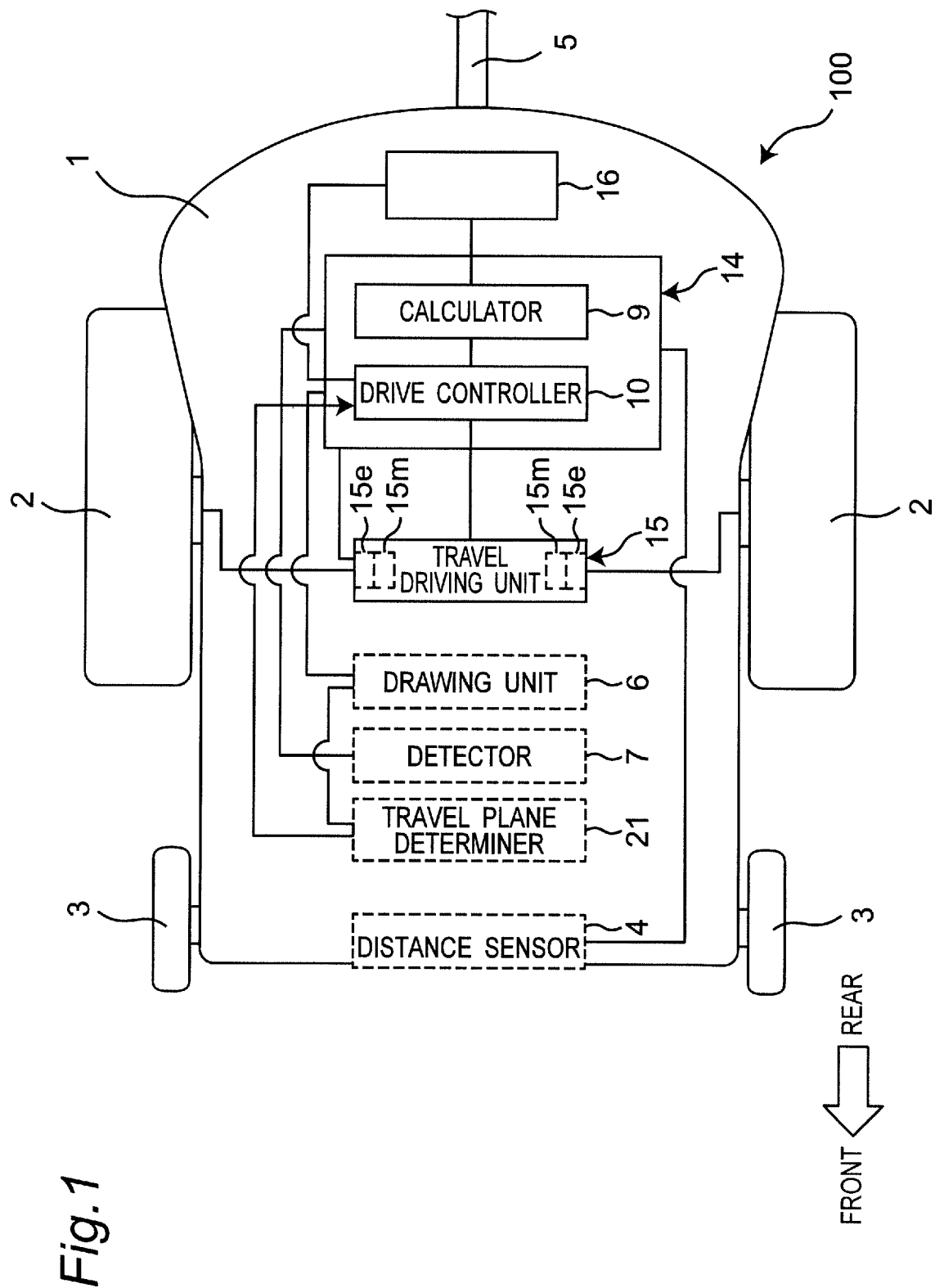
FIG. 1 is a schematic explanatory view from the top of a mobile robot according to a first embodiment of the present disclosure.

A mobile robot according to the first embodiment of the present disclosure will initially be described with reference to the drawings. FIG. 1 is a schematic explanatory view from the top of a mobile robot 100 according to the first embodiment of the present disclosure. The mobile robot 100 at least includes a mobile robot body 1, a drawing unit 6, a detector 7, a travel driving unit 15, and a controller 14 including a drive controller 10.

The drawing unit 6 includes a marker 6b configured to draw a travel locus 5 of the mobile robot 100 on a travel plane 19 of the mobile robot 100.

The detector 7 detects the travel locus 5 drawn on the travel plane 19 by the drawing unit 6.

The travel driving unit 15 is embodied by a driving device like a motor, and is configured to drive to positively and negatively rotate a pair of driving wheels 2 independently from each other. The travel driving unit 15, the pair of driving wheels 2, and a pair of trailing wheels 3 configure a travel driving device.

More specifically, the mobile robot body 1 of the mobile robot 100 further includes a distance sensor 4 and a travel plane determiner 21.

The distance sensor 4 measures a distance to a position ahead of the mobile robot 100, specifically, to an obstacle in a travel direction thereof.

The travel plane determiner 21 detects a material for the travel plane 19 to determine a type of the travel plane 19.

The respective constituent elements will be described in detail below.

The distance sensor 4 is disposed at the front or the like of the mobile robot body 1 and is configured to measure a distance to an obstacle in the travel direction of the mobile robot 100. The controller 14 receives measurement information. The controller 14 drive controls the travel driving unit 15 in accordance with the measurement information, to allow the mobile robot 100 to travel while avoiding the obstacle. The distance sensor 4 is exemplified by an infrared distance sensor.

The controller 14 is connected to the drawing unit 6 and the detector 7, and independently controls drawing by the drawing unit 6 and detection by the detector 7. The controller 14 includes a calculator 9 and the drive controller 10.

The calculator 9 calculates the travel locus 5 to be tracked in accordance with movement trace information on the travel locus 5 detected by the detector 7 and acquired from the detector 7.

The drive controller 10 executes tracking control by causing the travel driving unit 15 to drive control the pair of driving wheels 2 to achieve movement along the travel locus 5 calculated by the calculator 9.

The drive controller 10 drive controls the travel driving unit 15, the detector 7, and the drawing unit 6, independently from one another.

The mobile robot 100 can further include an operation unit 16 at least having a steering wheel and an operation panel used for steering a mobile robot 101 to a desired destination by a collector 11 boarding the mobile robot 101. The travel driving unit 15 can alternatively be drive-controlled via the drive controller 10 of the controller 14 in accordance with an operation command inputted to the operation panel of the operation unit 16 by the collector 11.

Figure 2:
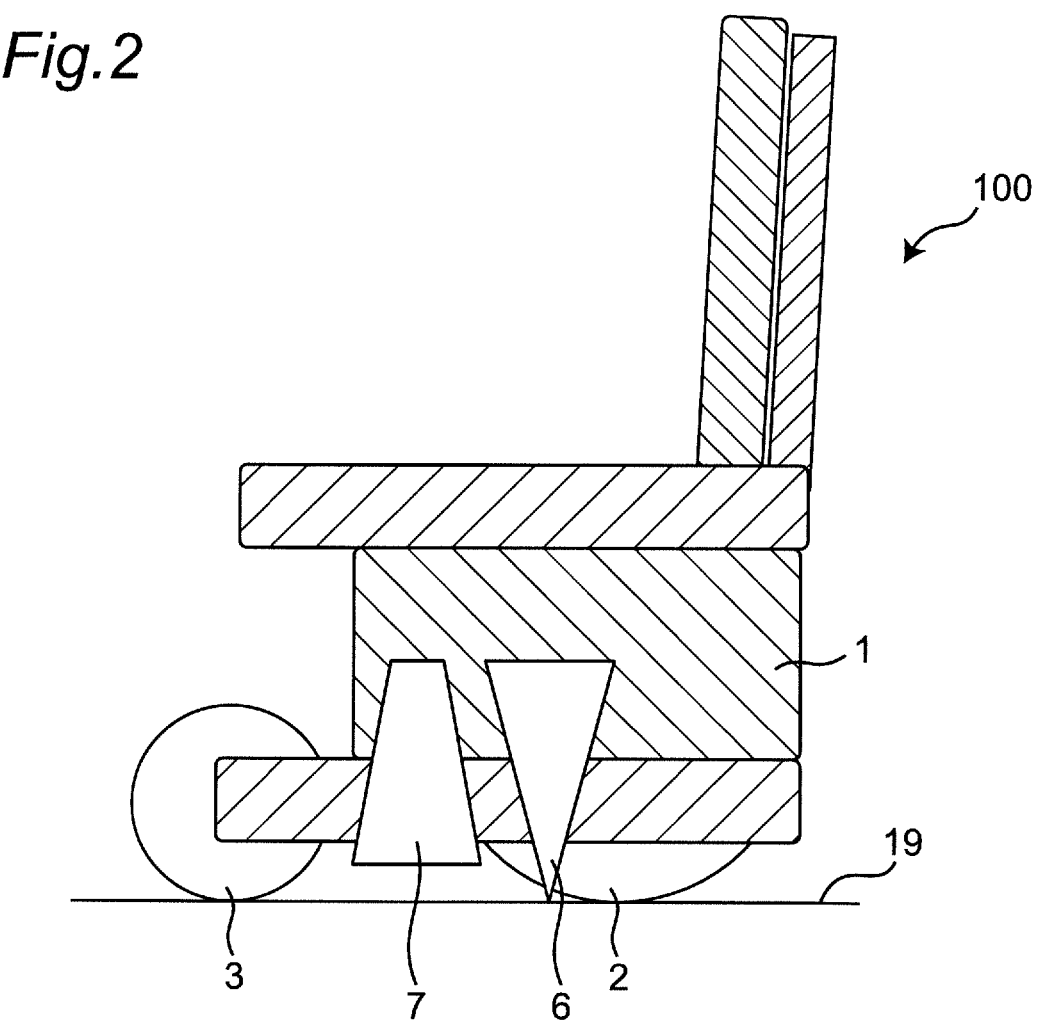
FIG. 2 is a schematic sectional view from a side of the mobile robot according to the first embodiment of the present disclosure.

FIG. 2 is a schematic sectional view from a side of the mobile robot 100. The drawing unit 6 is provided at the mobile robot body 1 to be high enough to draw the travel locus 5 directly on the travel plane 19. The detector 7 is provided at the mobile robot body 1 to be high enough to detect the travel locus 5 drawn on the travel plane 19 by the drawing unit 6. The detector 7 is accordingly disposed ahead of the drawing unit 6 in the travel direction of the mobile robot 100.

Figure 3A:
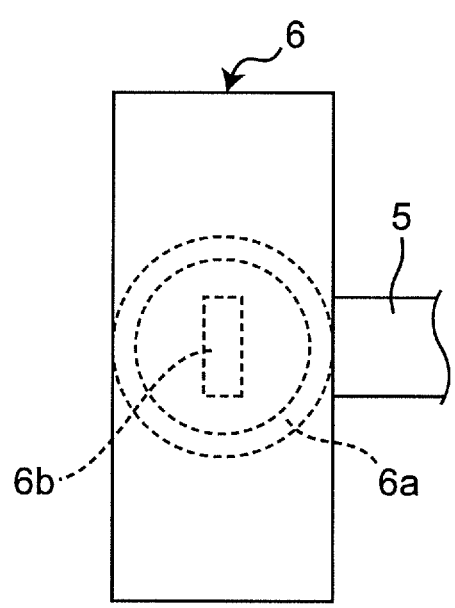
FIG. 3A is a plan view from the top of the mobile robot, of a drawing unit, according to the first embodiment of the present disclosure.
Figure 3B:
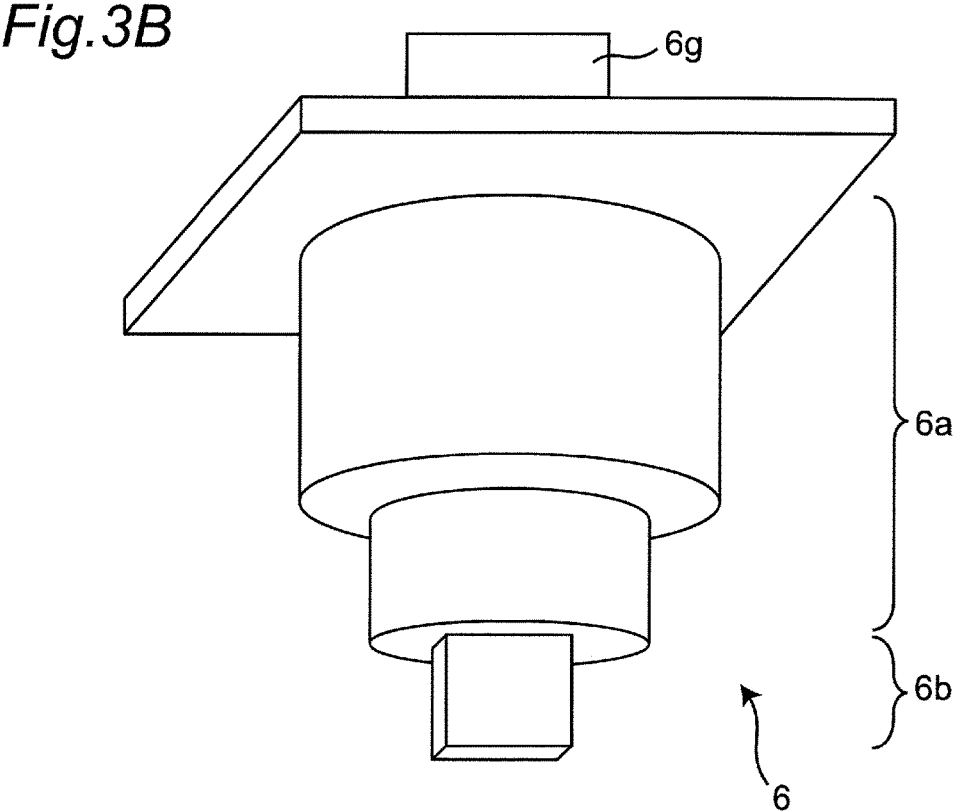
FIG. 3B is a perspective view from the bottom of the mobile robot, of the drawing unit, according to the first embodiment of the present disclosure.

FIGS. 3A and 3B are detailed views of the drawing unit 6. FIG. 3A is a plan view from the top of the mobile robot 100, of the drawing unit 6, whereas FIG. 3B is a perspective view from the bottom of the mobile robot 100, of the drawing unit 6.

The drawing unit 6 includes an expandable portion 6a configured to be axially expandable (e.g. vertically in FIG. 3B), the marker 6b fixed at a distal end (e.g. the lower end in FIG. 3B) of the expandable portion 6a and having a projecting end soaking paint, and a drawing unit driver 6g like a motor configured to axially move the marker 6b via the expandable portion 6a and drive-controlled by the drive controller 10.

When the drawing unit 6 is activated, the drawing unit driver 6g like a motor lowers the marker 6b to extend the expandable portion 6a axially downward and the lower end of the marker 6b comes into direct contact with the travel plane 19 as a travel plane, so that the paint of the marker 6b is directly applied to the travel plane 19 as the travel locus 5. The travel locus 5 is exemplified by a belt-like straight line having a predetermined width of about several centimeters.

When the mobile robot 100 stops or the drawing unit 6 stops drawing, the drawing unit driver 6g like a motor raises the marker 6b to contract the expandable portion 6a and prevent the marker 6b from directly contacting the travel plane 19.

Examples of the paint to be applied to the travel plane 19 include paint to be detected only by the detector 7. More specific examples of the paint include paint that shines only when irradiated with black light or the like. Such specific examples of the paint include black light ink that has milky white color inapparent even when applied without irradiation with black light and apparently changes in color from milky white into red, green, or blue with irradiation with black light. Such paint applied to the travel plane 19 will conveniently be invisible to persons except for the mobile robot 100. The above method includes drawing the travel locus 5 with use of paint, which can be replaced with colored powder, a tape, or the like.

The method of drawing the travel locus 5 can be selected after the travel plane determiner 21 detects the material for the travel plane 19 and determines the type of the travel plane 19.

Figure 3C:
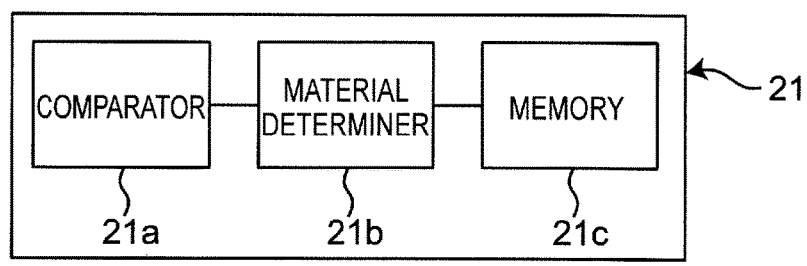
FIG. 3C is a block diagram of a travel plane determiner of the mobile robot according to the first embodiment of the present disclosure.

As shown in FIG. 3C, the travel plane determiner 21 includes a comparator 21a, a material determiner 21b, and a memory 21c. The memory 21c exemplarily stores a surface image of a hard tile and a surface image of a rug or a carpet, as well as information on paint to be applied to the hard tile and particles to be applied to the rug or the carpet and being substantially as large as lime. The comparator 21a receives an image captured by a camera exemplifying an imaging device configuring the detector 7. The comparator 21a compares the received image with the image stored in the memory 21c. According to an exemplary comparison method, the comparator 21a compares the received image with the image stored in the memory 21c in accordance with pattern matching. The material determiner 21b receives a result of the comparison. The material determiner 21b determines whether the received image relates to a hard tile, or a rug or a carpet, in accordance with the result of the comparison by the comparator 21a, acquires information on the paint or the particles corresponding to the determined material in accordance with the information stored in the memory 21c, and outputs, to the drawing unit 6, the acquired information on the paint or the particles as information on the material to be used for drawing.

For example, in a case where the material determiner 21b determines that the travel plane 19 is a hard tile or the like, the drawing unit 6 adopts the paint. In another case where material determiner 21b determines that the travel plane 19 is a rug or a carpet, the drawing unit 6 draws the travel locus 5 by scattering the particles substantially as large as lime on the travel plane 19, instead of applying paint that is hard to be removed from the rug or the carpet. Examples of the particles substantially as large as lime include particles having the maximum diameter more than 0 μm and equal to or less than 10 μm.

The information on the travel plane 19 stored in the memory 21c is exemplified by the two types. The present embodiment is not limited to these types, but the memory 21c can alternatively store a preliminarily captured image of the travel plane 19 to be traveled by the mobile robot 100 and a drawing material to be applied to the travel plane 19 corresponding to the image, associating the image with the drawing material.

Figure 3D:
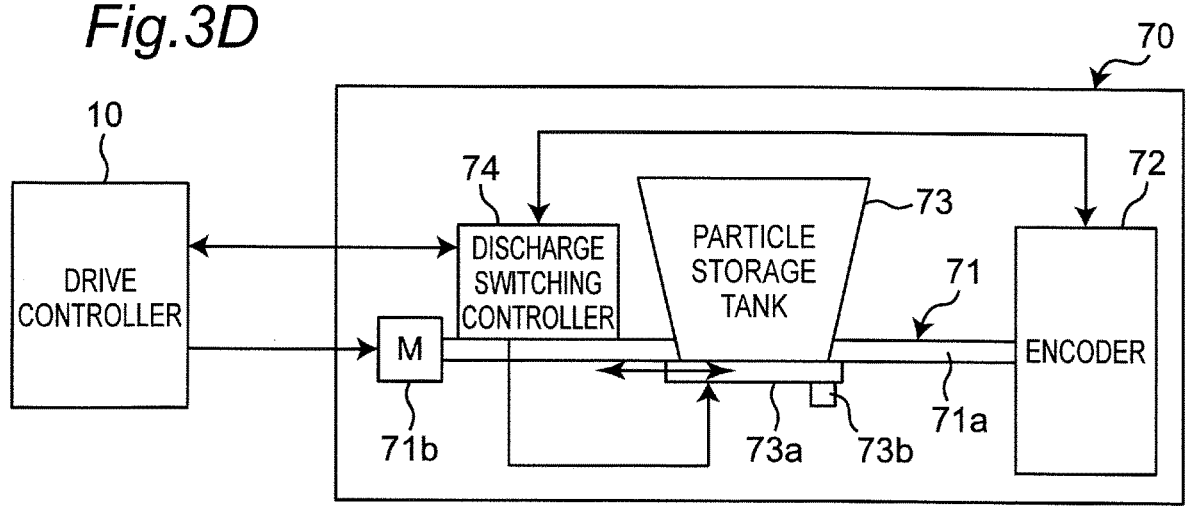
FIG. 3D is an explanatory view of a particle discharge mechanism exemplifying the drawing unit of the mobile robot according to the first embodiment of the present disclosure.

Examples of a device configured to scatter the particles substantially as large as lime include a particle discharge mechanism 70 as shown in FIG. 3D. The drawing unit 6 in FIGS. 3A and 3B may be referred as a first drawing unit, whereas the particle discharge mechanism 70 may be referred as a second drawing unit.

The particle discharge mechanism 70 includes a driving unit 71, an encoder 72, a particle storage tank 73, and a discharge switching controller 74. The driving unit 71 positively or negatively rotates a driving motor 71b to positively or negatively rotate a drive shaft 71a as a screw shaft so as to move the particle storage tank 73 screwed to the drive shaft 71a forward or backward along the drive shaft 71a. The particle storage tank 73 stores the particles and has a lower opening closed by a shutter 73a. Under the control of the discharge switching controller 74, the shutter 73a rotates positively or negatively about a rotary shaft of a motor 73b rotating positively or negatively, to open or close the lower opening of the particle storage tank 73. When the drawing unit 6 starts drawing, the discharge switching controller 74 rotates the shutter 73a to open the lower opening to allow the particles to drop from the particle storage tank 73 for drawing.

The travel driving unit 15 includes an encoder 15e that detects rotational speed of a motor 15m to detect travel speed of the mobile robot 100. The discharge switching controller 74 controls an opening degree of the shutter 73a such that particle density of the travel locus 5 on the travel plane 19 is not largely varied in accordance with the travel speed.

Figure 4A:
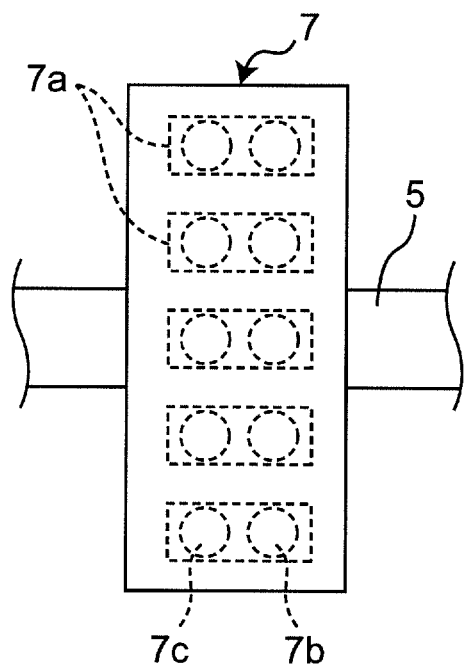
FIG. 4A is a plan view from the top of the mobile robot, of a detector, according to the first embodiment of the present disclosure.
Figure 4B:
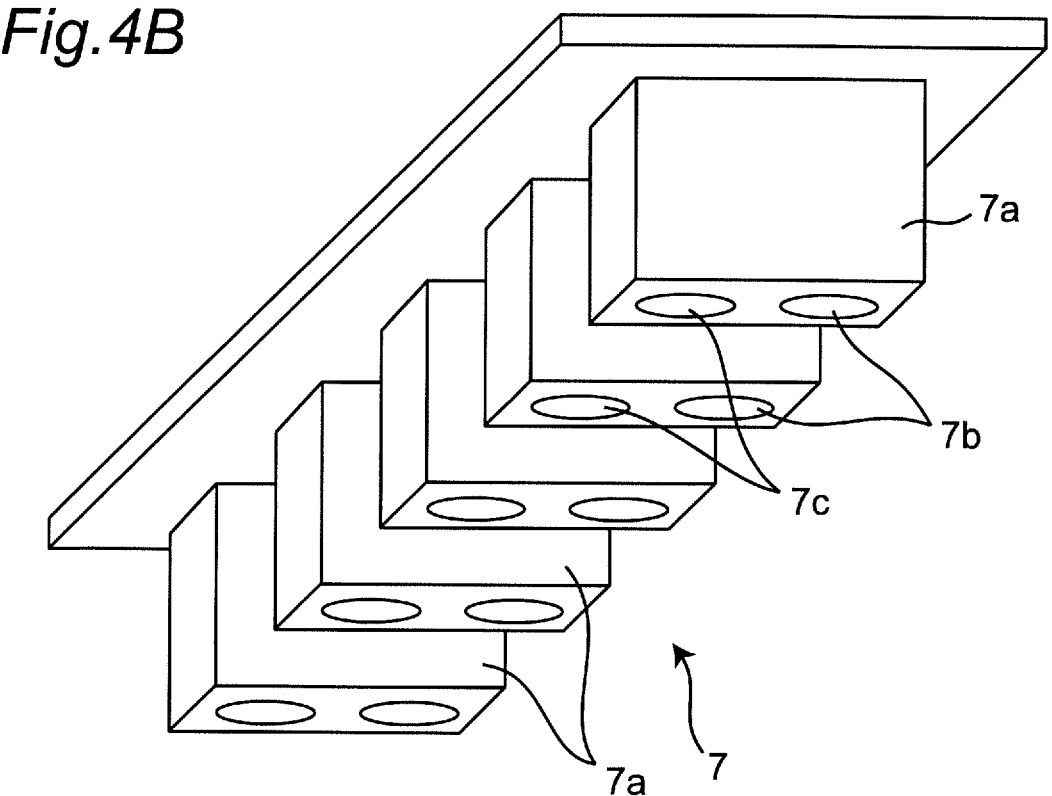
FIG. 4B is a perspective view from the bottom of the mobile robot, of the detector, according to the first embodiment of the present disclosure.
Figure 4C:
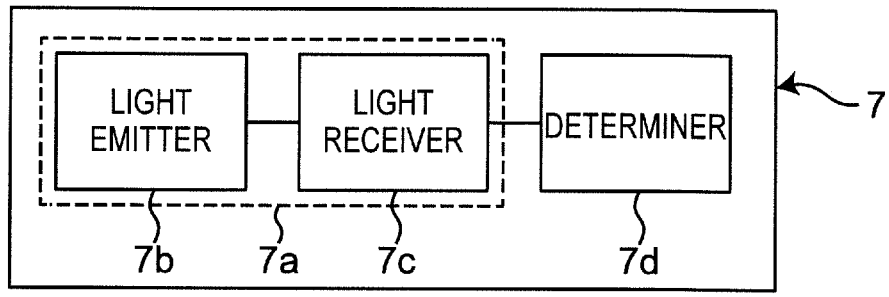
FIG. 4C is a block diagram of the detector having an exemplary configuration, of the mobile robot according to the first embodiment of the present disclosure.
Figure 4D:
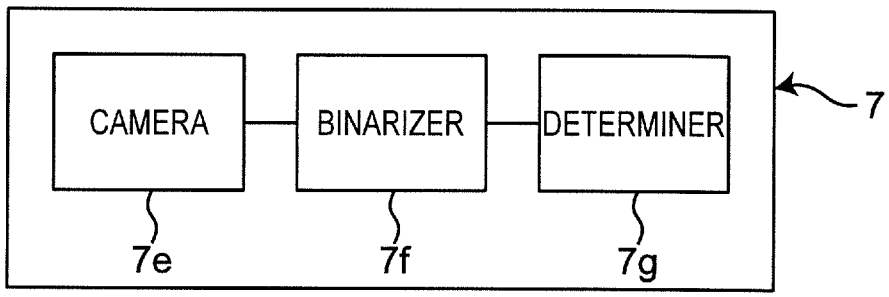
FIG. 4D is a block diagram of the detector having another exemplary configuration, of the mobile robot according to the first embodiment of the present disclosure.
Figure 4E:
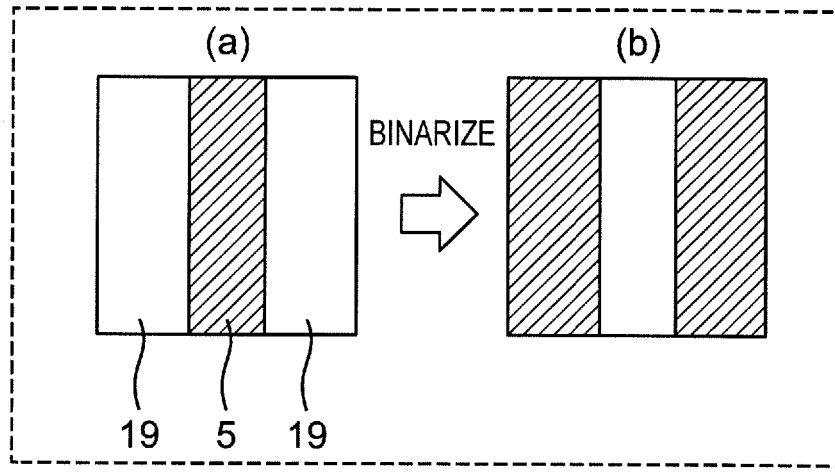
FIG. 4E is an explanatory view depicting an image (a) captured by a camera in FIG. 4D and data (b) obtained by binarizing the image.

FIGS. 4A and 4B are detailed views of the detector 7. FIG. 4A is a plan view from the top of the mobile robot 100, of the detector 7, whereas FIG. 4B is a perspective view from the bottom of the mobile robot 100, of the detector 7. FIG. 4C is a block diagram of the detector having an exemplary configuration, whereas FIG. 4D is a block diagram of the detector having another exemplary configuration. FIG. 4E depicts an image (a) captured by the camera and data (b) obtained by binarizing the image.

The detector 7 includes a plurality of paint detection sensors 7a and a determiner 7d as exemplarily shown in FIG. 4C. The paint detection sensors 7a each include a light emitter 7b and a light receiver 7c. The paint detection sensor 7a irradiates the travel plane 19 with light from the light emitter 7b, causes the light receiver 7c to receive light reflected at the travel plane 19, and the determiner 7d determines whether or not the travel plane 19 has the travel locus 5 in accordance with intensity of the light received by the light receiver 7c. The light emitter 7b is exemplified by an LED black light configured to emit black light. The light receiver 7c is configured by a photo reflector and detects the black light emitted from the light emitter 7b. The determiner 7d determines that the travel plane 19 has the travel locus 5 in accordance with a result of the detection by the light receiver 7c. The determiner 7d can determine that the travel plane 19 has the travel locus 5 in a case where the travel plane 19 and the travel locus 5 have a difference in color value equal to or more than a threshold and the travel locus 5 is linear. The plurality of paint detection sensors 7a is exemplarily aligned in series to cross, for example, to be perpendicular to, the travel direction of the mobile robot 100 or an extending direction of the travel locus 5. Provision of the plurality of the paint detection sensors 7a enables calculation of a relative position of the mobile robot 100 to the travel locus 5. The drive controller 10 in the mobile robot 100 executes tracking control in accordance with information on the relative position.

Figure 4F:
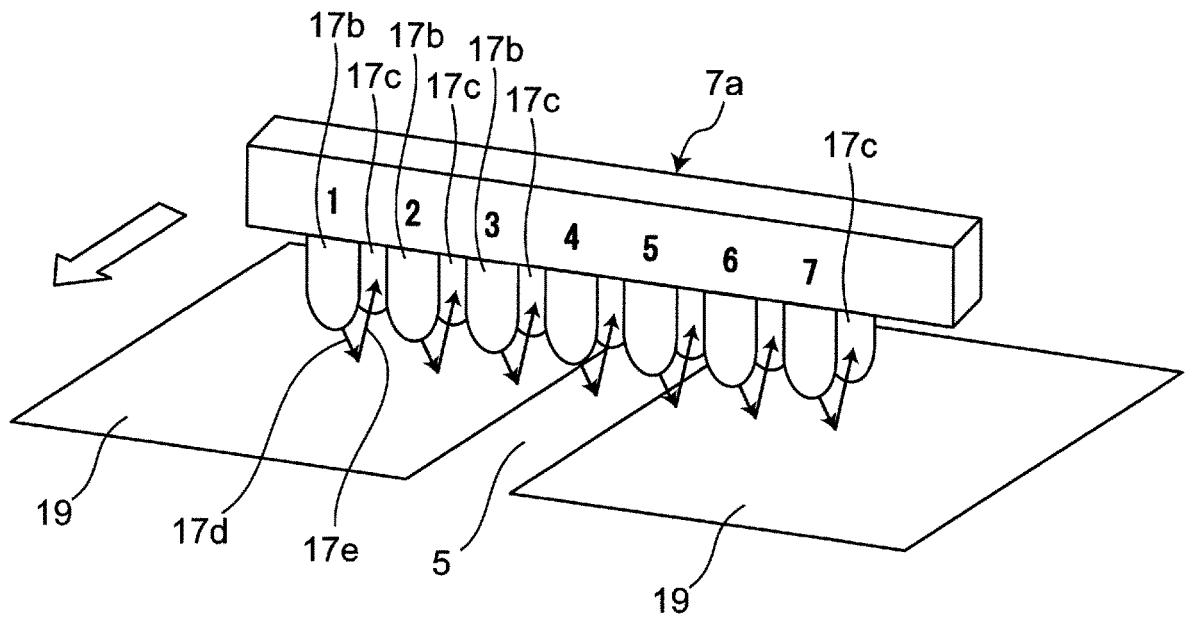
Figure 4G:
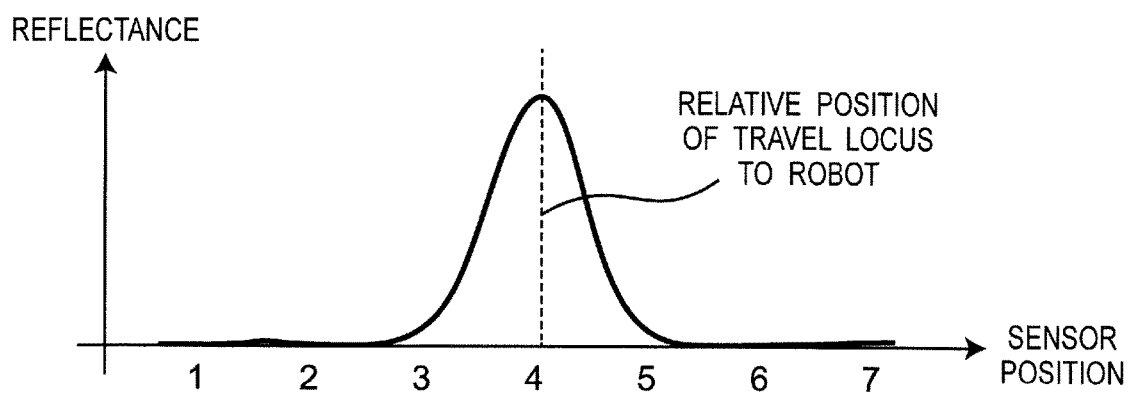
FIG. 4G is a graph indicating an exemplary relationship between reflectance and a sensor position.

FIG. 4F is a lower-side perspective view depicting an internal structure of the detector 7 in FIG. 4B, excluding a cover and the like. As shown in FIG. 4F, the paint detection sensors 7a each irradiate the travel plane 19 with light 17e from a photodiode 17b functioning as the light emitter 7b and causes a photo reflector 17c functioning as the light receiver 7c to receive light 17d reflected at the travel plane 19, and the determiner 7d determines whether or not the travel plane 19 has the travel locus 5 in accordance with reflectance of the light 17d received by the photo reflector 17c. FIG. 4G exemplarily indicates a relationship between the reflectance and positions of the sensors 7a. In a case where there are provided seven sensors 7a as shown in FIG.

4F, the determiner 7d calculates a relative position of the travel locus to the mobile robot 100 in accordance with the position of the fourth sensor 7a having the highest reflectance as indicated in FIG. 4G. Assume that the fourth sensor 7a in the center in the width direction of the seven sensors 7a in the travel direction of the mobile robot 1 has a relative position of zero. The determiner 7d calculates a degree of displacement, from the fourth sensor 7a, of the sensor 7a having detected the travel locus 5. For example, when a sensor 7a detecting the travel locus 5 is the fourth sensor 7a with respect to the fourth sensor 7a in the center, the determiner 7d determines that the relative position is zero and the mobile robot 100 continuously travels straight. In a case where the third or second sensor 7a detects the travel locus 5, the determiner 7d determines that the relative position is displaced by one or two to the left from the fourth sensor 7a, and the travel driving unit 15 is controlled to turn the mobile robot 100 to the right. In another case where the fifth or sixth sensor 7a detects the travel locus 5, the determiner 7d determines that the relative position is displaced by one or two to the right, and the travel driving unit 15 is controlled to turn the mobile robot 100 to the left.

The plurality of paint detection sensors in the detector 7 can be replaced with a wide-field imaging device. Examples of the imaging device include a camera 7e. As shown in FIG. 4D, the detector 7 alternatively may include the camera 7e, a binarizer 7f, and a determiner 7g. When the binarizer 7f binarizes an image captured by the camera 7e, the travel plane 19 and the travel locus 5 can be distinguished from each other in color, as shown in FIG. 4E. For example, in a case where the paint or the particles used for drawing the travel locus 5 are lighter in color than the travel plane 19, the determiner 7g can determine an area in the lighter color as the travel locus 5. Specifically, assuming that the image (a) in FIG. 4E is captured by the camera 7e, the data (b) in FIG. 4E is obtained by binarizing the image (a). In this case, the determiner 7g can determine the area of a white thick line at the center of the image as the travel locus 5.

Figure 5:
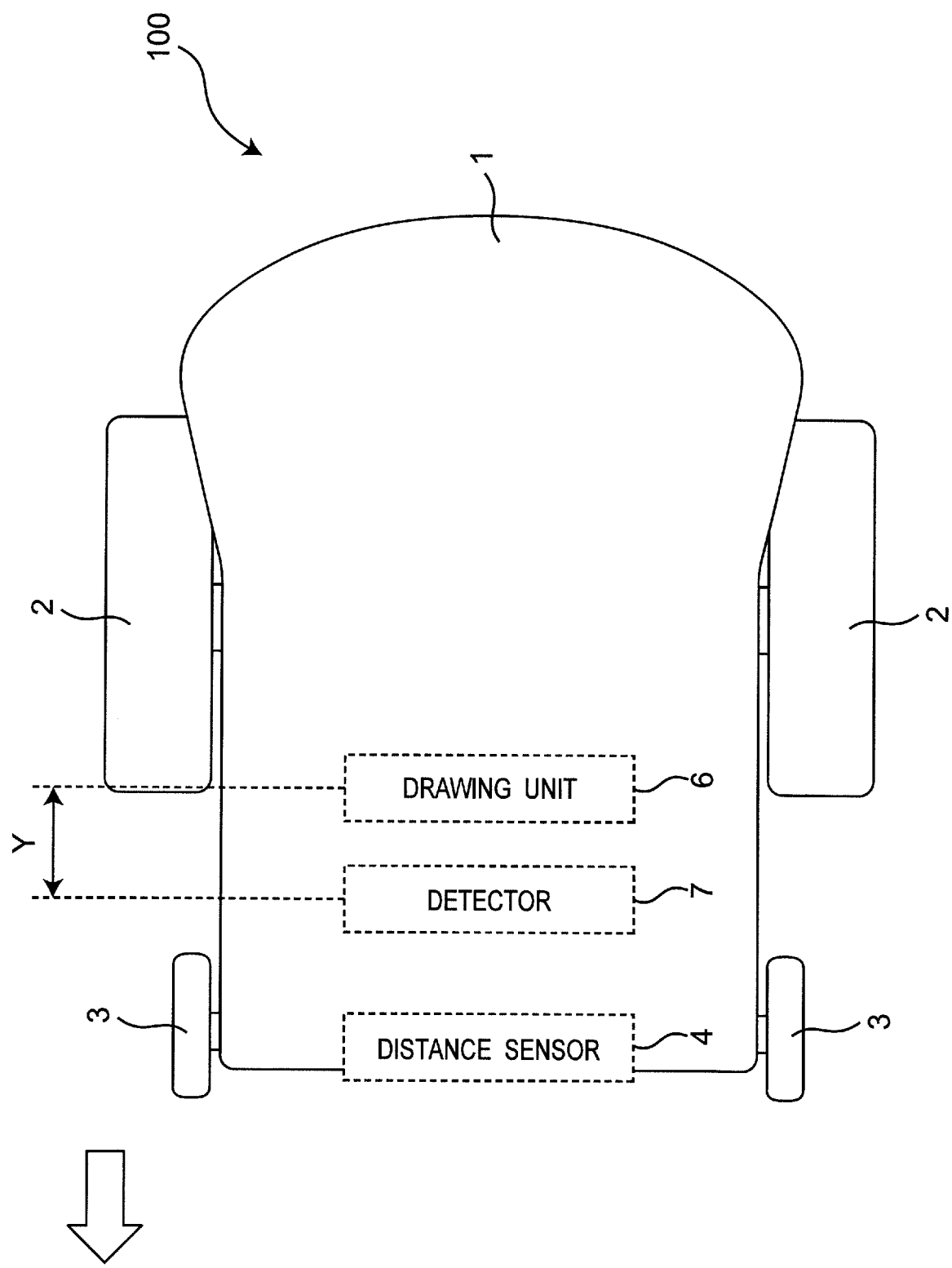
FIG. 5 is a positional relationship diagram of the drawing unit and the detector of the mobile robot according to the first embodiment of the present disclosure.

FIG. 5 depicts a positional relationship among the distance sensor 4, the drawing unit 6, and the detector 7 provided at the mobile robot body 1. The distance sensor 4 is configured to measure a distance to an obstacle in the travel direction of the mobile robot 100, and is thus disposed at the front surface of the mobile robot body 1. The drawing unit 6 and the detector 7 are disposed in series in the mobile robot body 1 in the travel direction of the mobile robot 100. The detector 7 is disposed ahead of the drawing unit 6 in this case.

A first mobile robot 100 and a second mobile robot 100 accordingly have an identical travel locus. The mobile robots 100 can travel on a narrow passage as wide as the single mobile robot 100. Assume that the drawing unit 6 and the detector 7 are disposed apart from each other by a distance Y. The distance Y will be referred to later.

A method of tracking the mobile robot 100 will be described next by exemplifying an air terminal requiring tracking along an identical locus of the mobile robots 100. Specifically described is a collection system S100 adopting tracking control of six mobile robots 100. For convenience in the description, the six mobile robots 100 will be denoted by a first mobile robot 101, a second mobile robot 102, a third mobile robot 103, a fourth mobile robot 104, a fifth mobile robot 105, and a sixth mobile robot 106.

The collection system S100 for the mobile robots 100 includes the first mobile robot 101, the second mobile robot 102, the third mobile robot 103, the fourth mobile robot 104, the fifth mobile robot 105, and the sixth mobile robot 106.

Briefly, in order to gather the two mobile robots 100 disposed in the vicinity of each of boarding gates A to C (in other words, locations T1 to T3) shown in FIG. 6 to be referred to later to form a mobile robot line and then collect the mobile robot line at a single collection site (in other words, a location T4), one of the mobile robots 100 disposed at the location T1 as the boarding gate A most distant from the collection site T4 is assumed to be at the forefront of the mobile robot line. The mobile robots 100 disposed at the locations T2 and T3 as the boarding gates B and C track a single travel locus drawn by the mobile robot 100 at the forefront, and all the mobile robots 100 in the mobile robot line are collected at the collection site T4.

Figure 6:
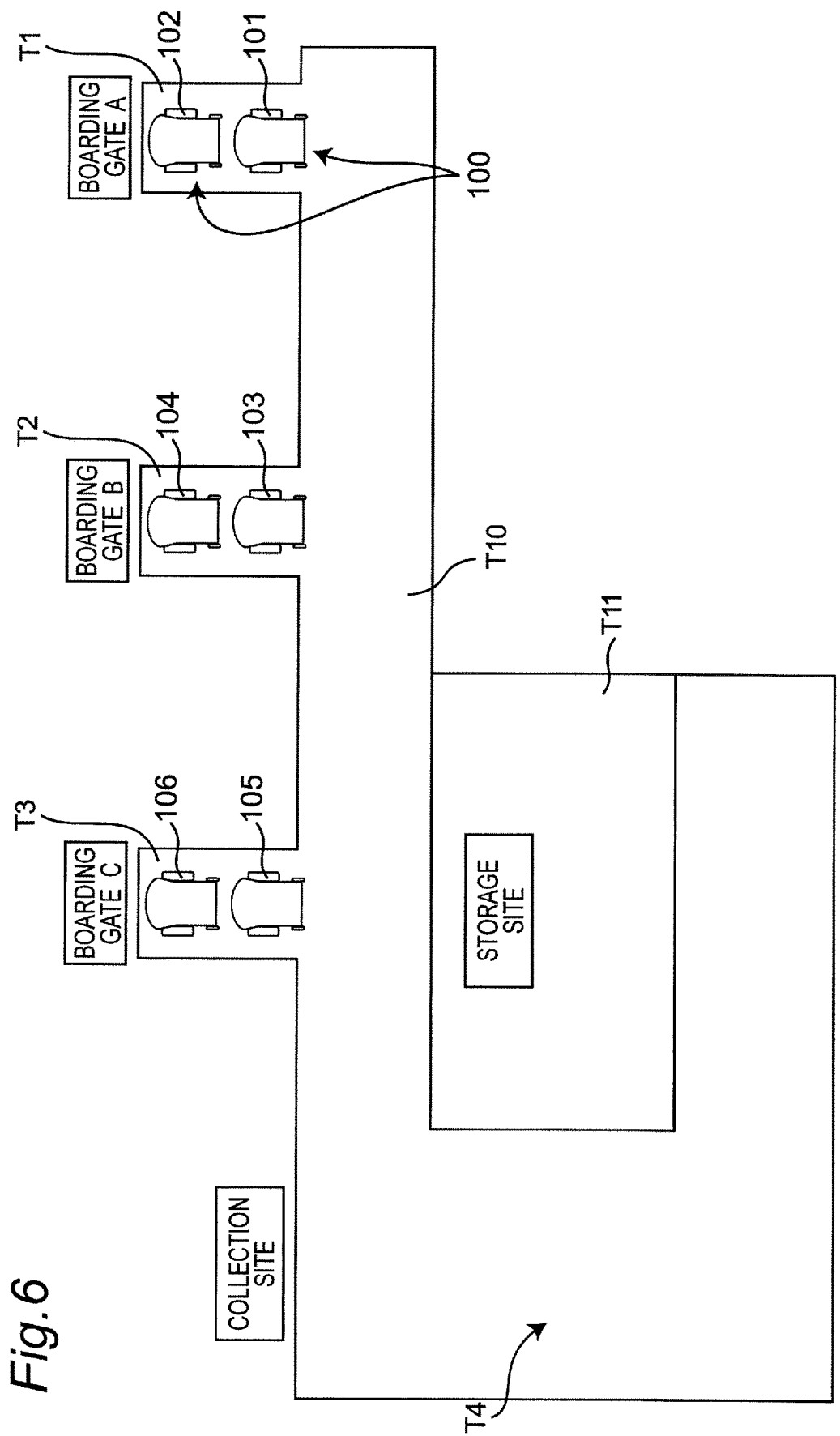
FIG. 6 is an explanatory view depicting a state where mobile robots are disposed in a collection system according to the first embodiment of the present disclosure.

FIG. 6 is a view depicting a state where the six mobile robots 101 to 106 are disposed at the locations T1 to T3 in the collection system S100. The two mobile robots, namely, the first mobile robot 101 and the second mobile robot 102 are disposed next to each other at the location T1 as the boarding gate A and are directed identically in the anteroposterior direction. The first mobile robot 101 is disposed ahead in the travel direction and the second mobile robot 102 is disposed behind in the travel direction of the first mobile robot 101. Similarly, the two mobile robots, namely, the third mobile robot 103 and the fourth mobile robot 104 are disposed next to each other at the location T2 as the boarding gate B and are directed identically in the anteroposterior direction. The third mobile robot 103 is disposed ahead in the travel direction and the fourth mobile robot 104 is disposed behind in the travel direction of the third mobile robot 103. Similarly, the two mobile robots, namely, the fifth mobile robot 105 and the sixth mobile robot 106 are disposed next to each other at the location T3 as the boarding gate C and are directed identically in the anteroposterior direction. The fifth mobile robot 105 is disposed ahead in the travel direction and the sixth mobile robot 106 is disposed behind in the travel direction of the fifth mobile robot 105.

Figure 7:
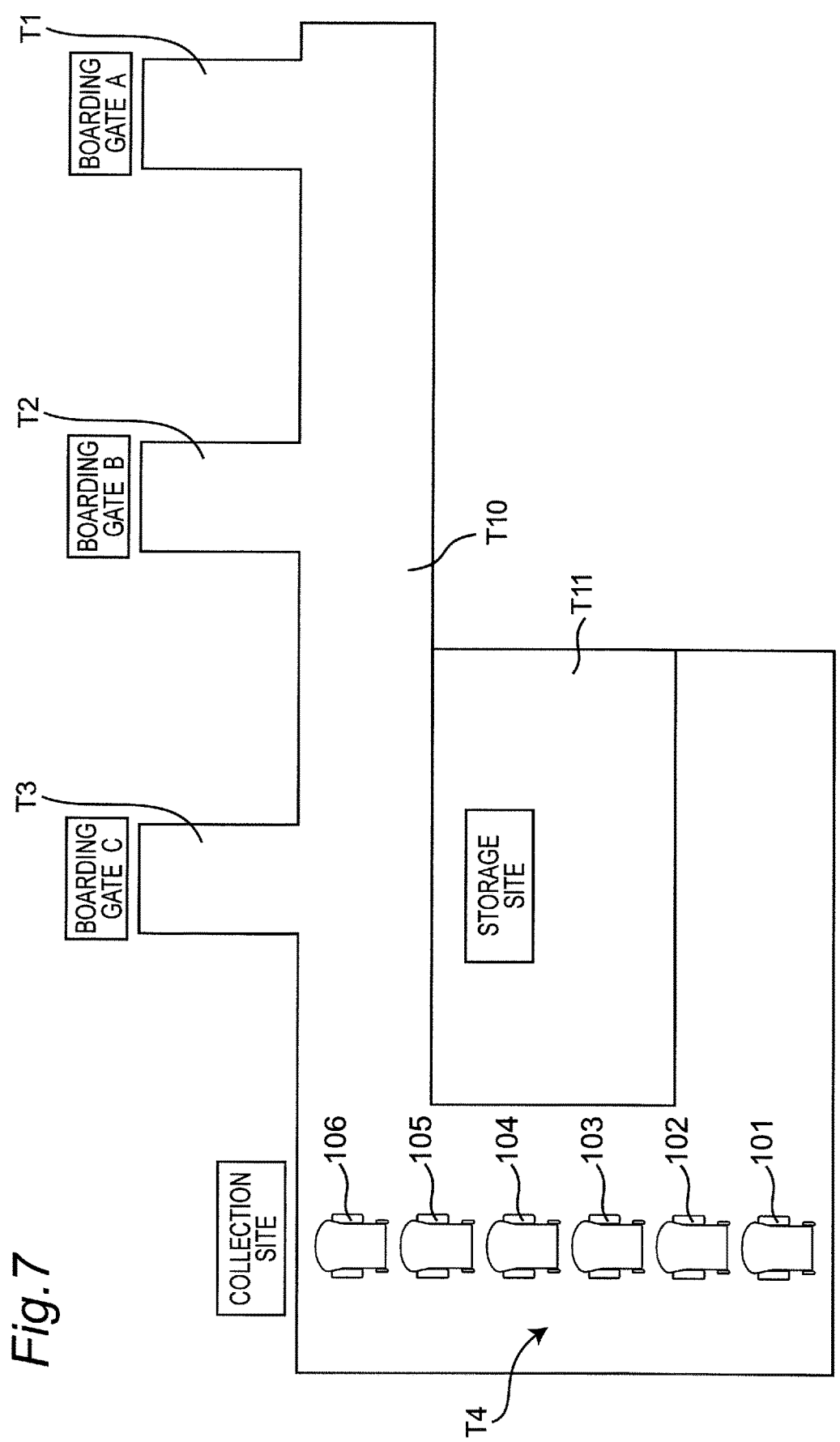
FIG. 7 is a plot plan of the mobile robots at a collection site in the collection system according to the first embodiment of the present disclosure.

FIG. 7 is a view of the collection site T4 for the six mobile robots 101 to 106 in the collection system S100. The mobile robots 101 to 106 are collected sequentially at the collection site T4 to form a single line such that the first mobile robot 101 is disposed at the forefront (e.g. the lower end in FIG. 7) in the travel direction.

Figure 8:
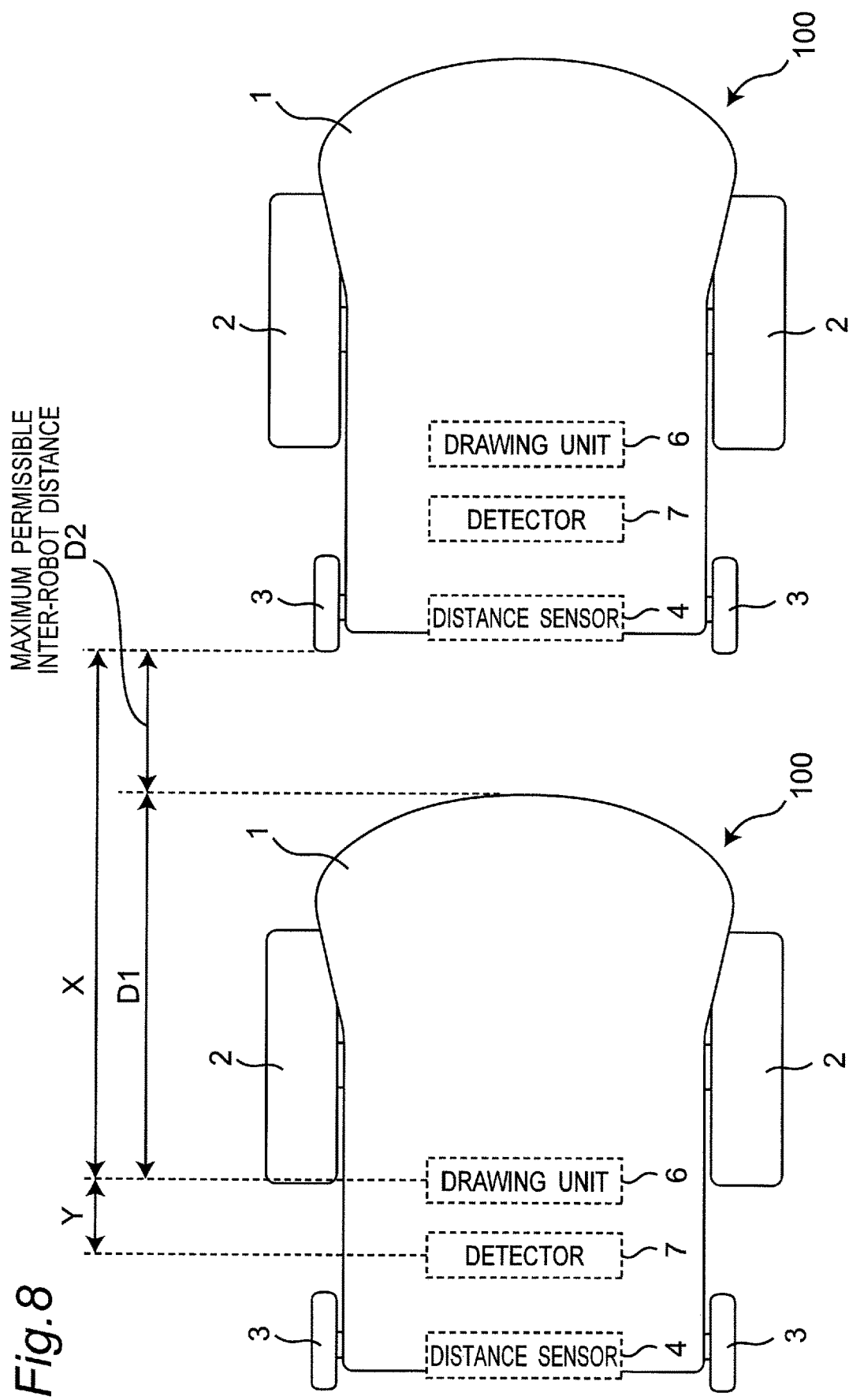
FIG. 8 is a positional relationship diagram of the mobile robots disposed in the vicinity of each boarding gate in the collection system according to the first embodiment of the present disclosure.

FIG. 8 is a view depicting a positional relationship of the mobile robots 101 to 106 disposed at the locations T1 to T3 as the boarding gates. A distance from the rear end of the mobile robot 101, 103, or 105 disposed ahead at the location to the front end of the mobile robot 102, 104, or 106 disposed behind will be referred to as an inter-robot distance, and the permissible maximum value of the inter-robot distance will be referred to as a maximum permissible inter-robot distance. Assume that a distance X is obtained by adding a distance D1 from the drawing unit 6 included in each of the mobile robots 101 to 106 to the rear end of the mobile robot and a maximum permissible inter-robot distance D2.

Described next is a collection flow of the collection system S100 for a plurality of mobile robots 100 executing tracking travel in a single line. A specific example thereof will be described after description of basic behavior. FIG. 9A is a flowchart depicting the basic collection behavior.

Initially in step S40, the drive controller 10 determines whether or not the mobile robot 100 executing tracking travel in a single line of a plurality of mobile robots 100 is at the forefront of the line. This determination can be made by the collector 11 who manipulates the operation unit 16 to inform the drive controller 10 that this mobile robot 100 is at the forefront of the line. The drive controller 10 can alternatively determine that this mobile robot 100 is at the forefront of the line when the distance sensor 4 detects that there is no other mobile robot 100 ahead of this mobile robot 100 for a predetermined period. The drive controller 10 can still alternatively determine that this mobile robot 100 is at the forefront of the line in a case where the detector 7 detects no travel locus 5 even after this mobile robot 100 moves for a predetermined period or by a predetermined distance.

The flow proceeds to step S41 if the drive controller 10 determines that this mobile robot 100 is at the forefront of the line. The flow proceeds to step S42 if the drive controller 10 determines that this mobile robot 100 is not at the forefront of the line.

Subsequently, in step S41, since the mobile robot 100 is at the forefront of the line, the drive controller 10 controls to activate the drawing unit 6 in the mobile robot 100 at the forefront of the line so that the drawing unit 6 starts drawing the travel locus 5 on the travel plane 19. The drive controller 10 controls the travel driving unit 15 while the drawing is executed. The mobile robot 100 at the forefront of the line having reached a predetermined position ends the basic collection behavior shown in FIG. 9A.

In step S42, the detector 7 in each of the mobile robots 100 tracking at the second and the subsequent positions in the line detects the travel locus 5 drawn on the travel plane 19.

Subsequently, in step S43, the drive controller 10 in each of the mobile robots 100 tracking the detected travel locus 5 at the second and the subsequent positions in the line tracking, controls the travel driving unit 15 for tracking travel. The mobile robots 100 tracking at the second and the subsequent positions in the line then end the basic collection behavior shown in FIG. 9A.

Figure 9B:
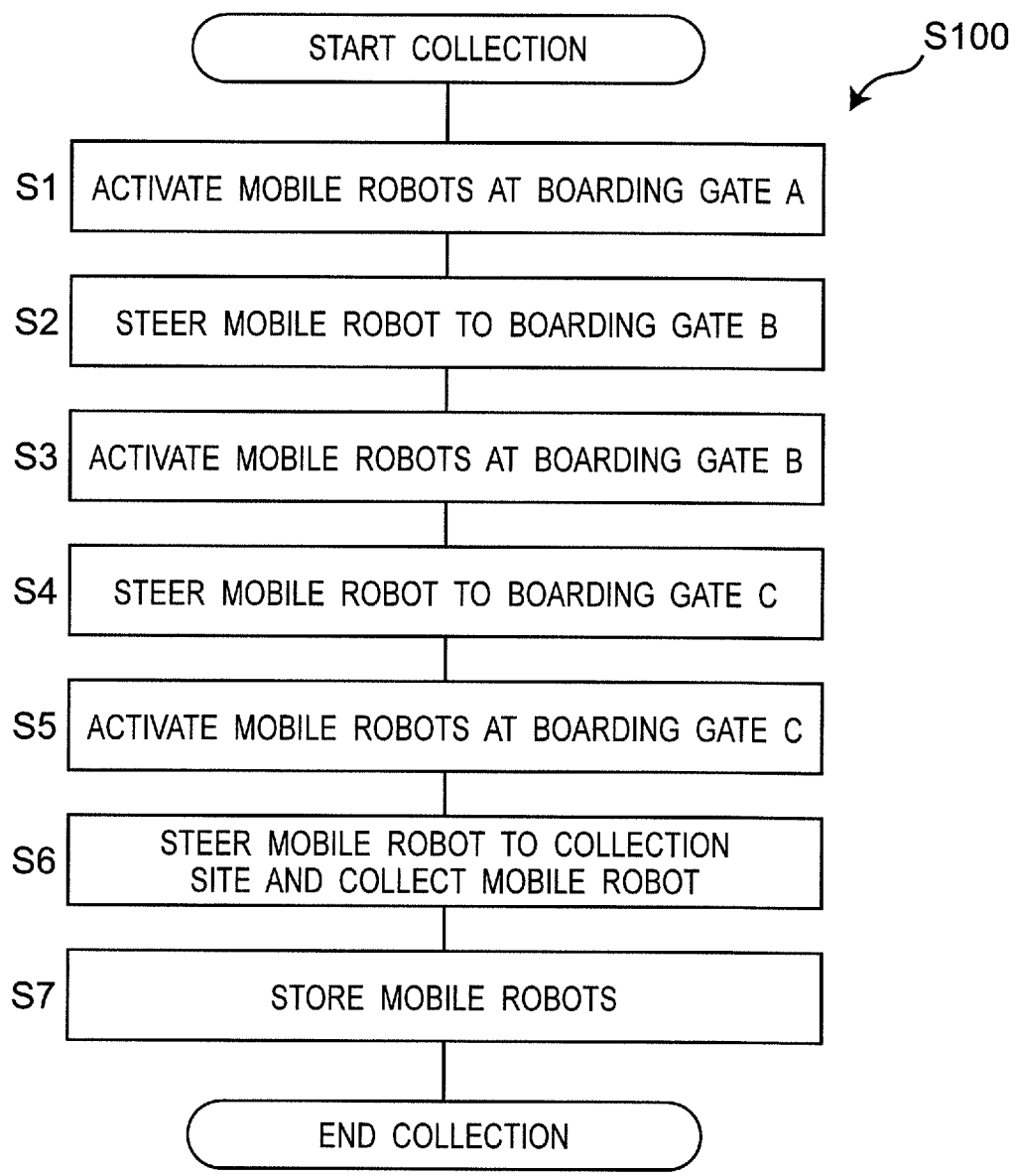
FIG. 9B is a specifically exemplified collection flowchart for the collection system according to the first embodiment of the present disclosure.

Described next is the specific example of the collection flow of the collection system S100 for the plurality of mobile robots 100 executing tracking travel in the single line. FIG. 9B is a flowchart specifically exemplifying the specific collection behavior. FIG. 9B exemplifies a case where the six mobile robots 100 eventually execute tracking travel in the single line.

Initially in step S1 "activate the mobile robots at the boarding gate A", the collector 11 expected to collect the mobile robots 100 moves to the location T1 as the boarding gate A and activates the drawing unit 6 in the first mobile robot 101 and the detector 7 in the second mobile robot 102 disposed at the location T1 as the boarding gate A to be ready for starting drawing and detection.

Subsequently, in step S2, the collector 11 boards the first mobile robot 101 and starts steering the first mobile robot 101 from the location T1 as the boarding gate A toward the location T2 as the boarding gate B. When the first mobile robot 101 starts travelling, under the control of the drive controller 10, the drawing unit 6 in the first mobile robot 101 causes the marker 6b to start drawing to leave the travel locus 5 on the travel plane 19, and executes drawing after the detector 7 finds that there is no travel locus 5. Such behavior corresponds to the drawing in step S41. The first mobile robot 101 subsequently executes only the drawing in step S41 and needs to execute neither the detection in step S42 nor the tracking in step S43.

In the second mobile robot 102 expected to track the first mobile robot 101, the distance sensor 4 measures a distance to the first mobile robot 101 positioned thereahead and transmits the measured distance to the calculator 9 in the controller 14. The distance sensor 4 is activated simultaneously when the mobile robot 100 is activated. The distance sensor 4 having been activated constantly measures a distance at a predetermined period interval or the like and transmits a result of the measurement to the calculator 9. The drive controller 10 can thus determine that this mobile robot 100 is not at the forefront of the line. When the calculator 9 determines that the measured distance exceeds the distance X, the drive controller 10 receives information on the determination from the calculator 9 and controls the travel driving unit 15 such that the second mobile robot 102 continuously travels straight by the distance X from the current position (that is, the position at the determination) until the detector 7 detects the travel locus 5.

The detector 7 in the second mobile robot 102 subsequently detects the travel locus 5 of the first mobile robot 101 and the calculator 9 calculates the travel locus 5 for tracking the first mobile robot 101 in accordance with a result of the detection. The drive controller 10 drive controls the travel driving unit 15 in accordance with the calculated travel locus 5, so that the second mobile robot 102 tracks the travel locus 5.

The detection and the tracking correspond to the detection in step S42 and the tracking in step S43. When the second mobile robot 102 tracks the first mobile robot 101, the distance sensor 4 in the second mobile robot 102 measures a distance to the preceding first mobile robot 101 and the controller 14 controls to execute tracking travel until the distance reaches a distance a. The distance a exceeds 0 cm and enables the distance sensor 4 in the second mobile robot 102 to detect the first mobile robot 101 positioned thereahead. The distance a can have a fixed numerical value or a certain numerical range.

In the following description, similarly to the second mobile robot 102, the fourth mobile robot 104 tracking the third mobile robot 103 at the boarding gate B and the sixth mobile robot 106 tracking the fifth mobile robot 105 at the boarding gate C execute tracking travel to have the distance a from the preceding mobile robots 103 and 105, respectively.

Figure 10:
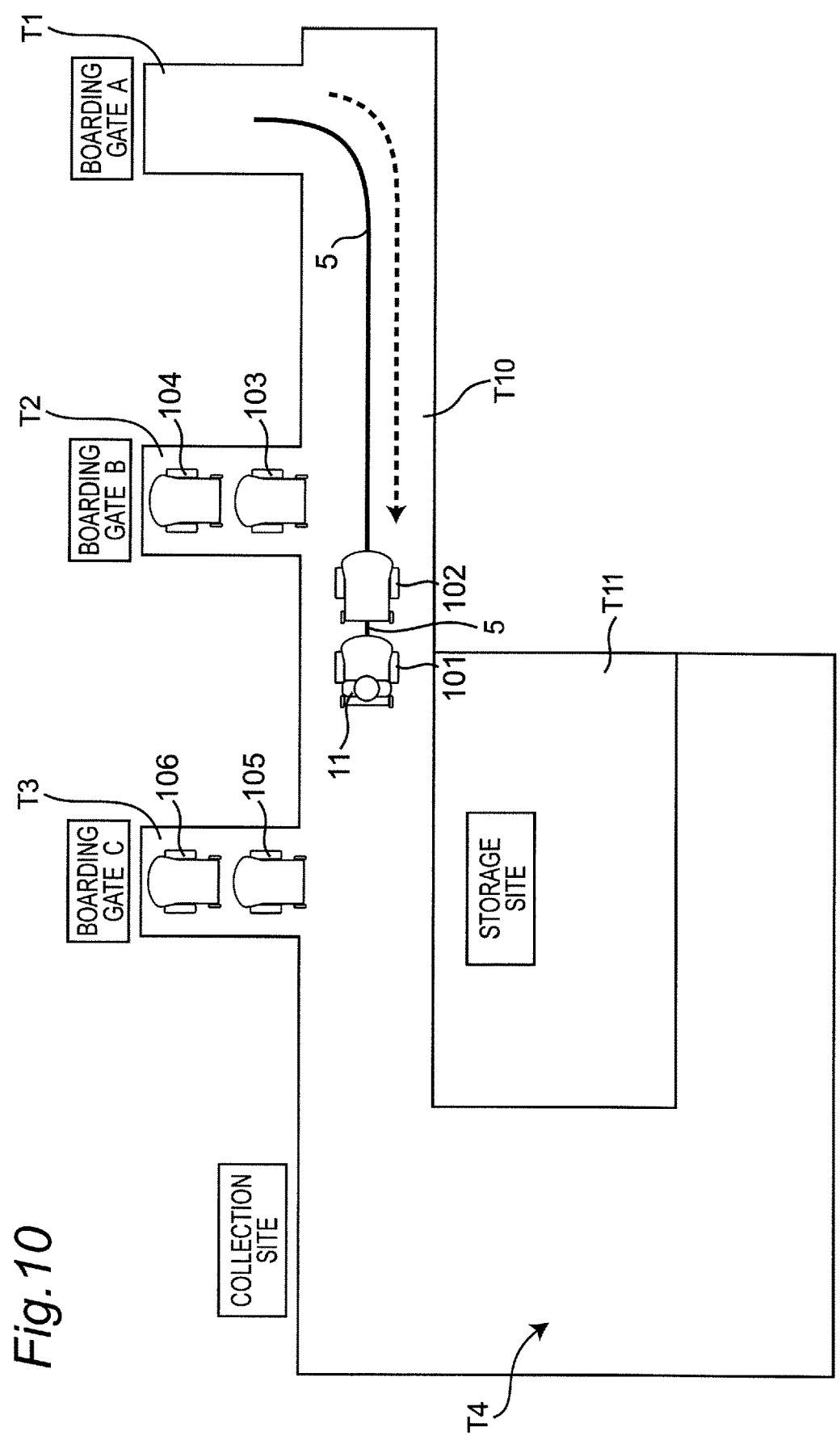
FIG. 10 is a state diagram of the collection flow shown in FIG. 9B according to the first embodiment of the present disclosure (depicting movement from in the vicinity of a boarding gate A to in the vicinity of a boarding gate B)

In step S2 "steer the mobile robot to the boarding gate B" subsequent to step S1, as shown in FIG. 10, the collector 11 continuously steers the first mobile robot 101 to a common passage T10 in the vicinity of the location T2 as the boarding gate B. The collector 11 stops the first mobile robot 101 such that the mobile robots 101 and 102 align straight on the common passage T10 in the vicinity of the location T2 as the boarding gate B. The second mobile robot 102 travels to track the preceding first mobile robot 101 with the distance a therebetween along the travel locus 5 drawn by the first mobile robot 101. The detection and the tracking correspond to the detection in step S42 and the tracking in step S43.

The first mobile robot 101 executes only step S41 in the basic behavior shown in FIG. 9A, whereas the second mobile robot 102 executes step S42 and step S43 other than step S41 in the basic behavior shown in FIG. 9A.

Figure 11:
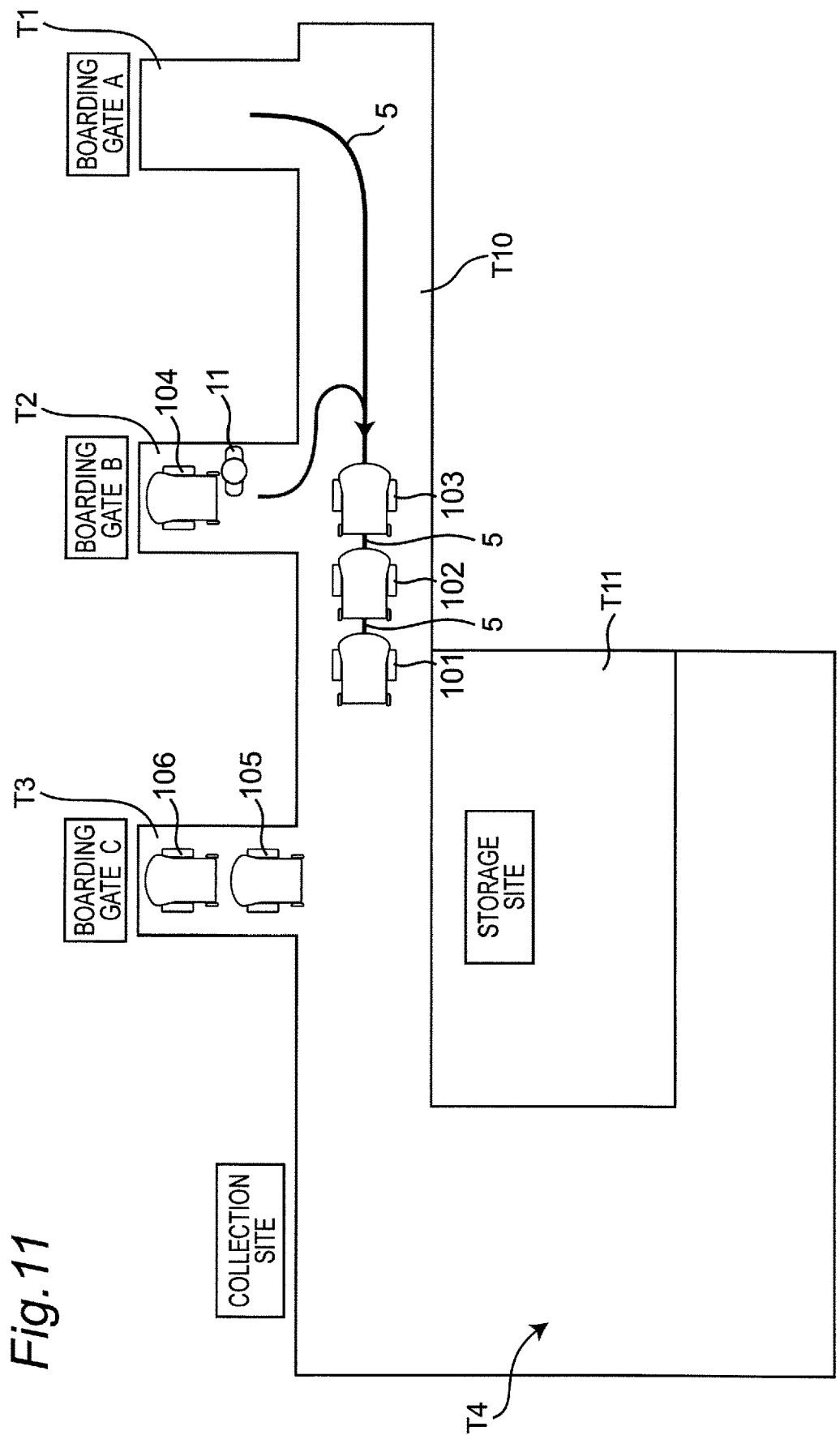
FIG. 11 is a state diagram of the collection flow according to the first embodiment of the present disclosure (depicting activation of the mobile robots in the vicinity of the boarding gate B)

In subsequent step S3 "activate the mobile robots at the boarding gate B", the collector 11 temporarily leaves the first mobile robot 101 and boards the third mobile robot 103 as shown in FIG. 11. The collector 11 then starts steering the third mobile robot 103 and manipulates the operation unit 16 to move the third and fourth mobile robots 103 and 104 at the location T2 as the boarding gate B as in step S1 and step S2 and dispose on the common passage T10 in the vicinity of the location T2 as the boarding gate B such that the third and fourth mobile robots 103 and 104 are disposed behind the second mobile robot 102 and are directed identically and the first to fourth mobile robots 101 to 104 form a single line.

Specifically, the collector 11 steers the third mobile robot 103 to dispose the mobile robots 103 and 104 on the common passage T10 in the vicinity of the location T2 as the boarding gate B so that the detector 7 in each of the mobile robots 103 and 104 can detect the travel locus 5 drawn on the travel plane 19 by the drawing unit 6 in the first mobile robot 101. The drive controller 10 subsequently activates the detector 7 in each of the mobile robots 103 and 104. After the detector 7 is activated, the collector 11 boards the first mobile robot 101 again to restart steering the first mobile robot 101 on the common passage T10 toward the location T3 as the boarding gate C. The first mobile robot 101 thereafter executes only step S41 in the basic behavior shown in FIG. 9A, whereas the second to fourth mobile robots 102 to 104 execute step S42 and step S43 other than step S41 in the basic behavior shown in FIG. 9A.

The mobile robots 103 and 104 can be disposed not in accordance with manipulation of the operation unit 16 by the collector 11 but by means of a remote device configured to remotely steer the mobile robots 103 and 104.

Figure 12:
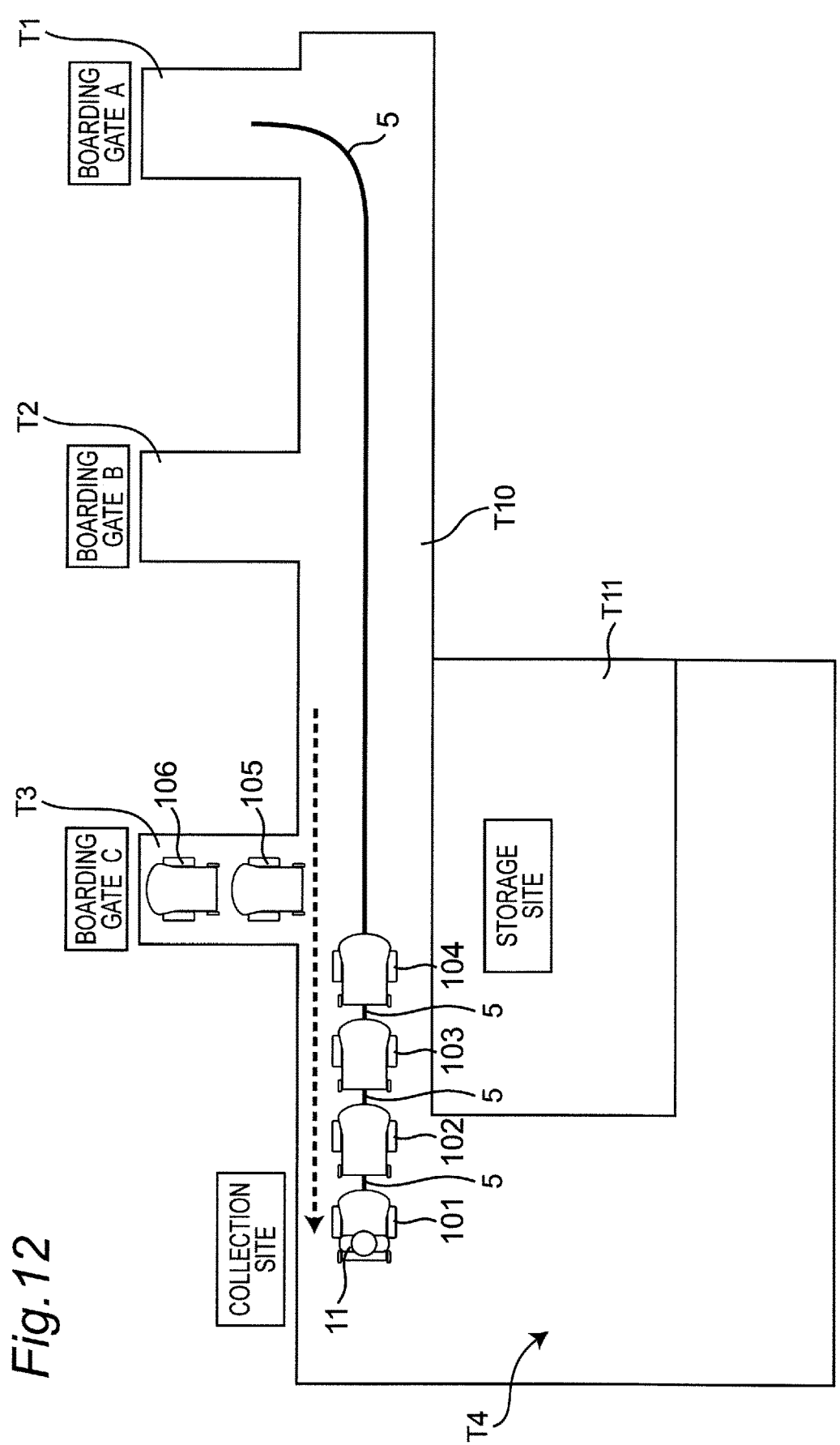
FIG. 12 is a state diagram of the collection flow according to the first embodiment of the present disclosure (depicting movement from in the vicinity of the boarding gate B to in the vicinity of a boarding gate C)

In subsequent step S4 "steer the mobile robot to the boarding gate C", as shown in FIG. 12, the collector 11 continuously steers the first mobile robot 101 to the common passage T10 in the vicinity of the location T3 as the boarding gate C. The collector 11 stops the first mobile robot 101 such that the mobile robots 101 to 104 align straight on the common passage T10 in the vicinity of the location T3 as the boarding gate C. The third and fourth mobile robots 103 and 104 travel to track the preceding second mobile robot 102 or the third mobile robot 103 with the distance a therebetween along the travel locus 5 drawn by the first mobile robot 101. The detection and the tracking correspond to the detection in step S42 and the tracking in step S43.

In this manner, the third and fourth mobile robots 103 and 104 execute step S42 and step S43 other than step S41 in the basic behavior shown in FIG. 9A.

Figure 13:
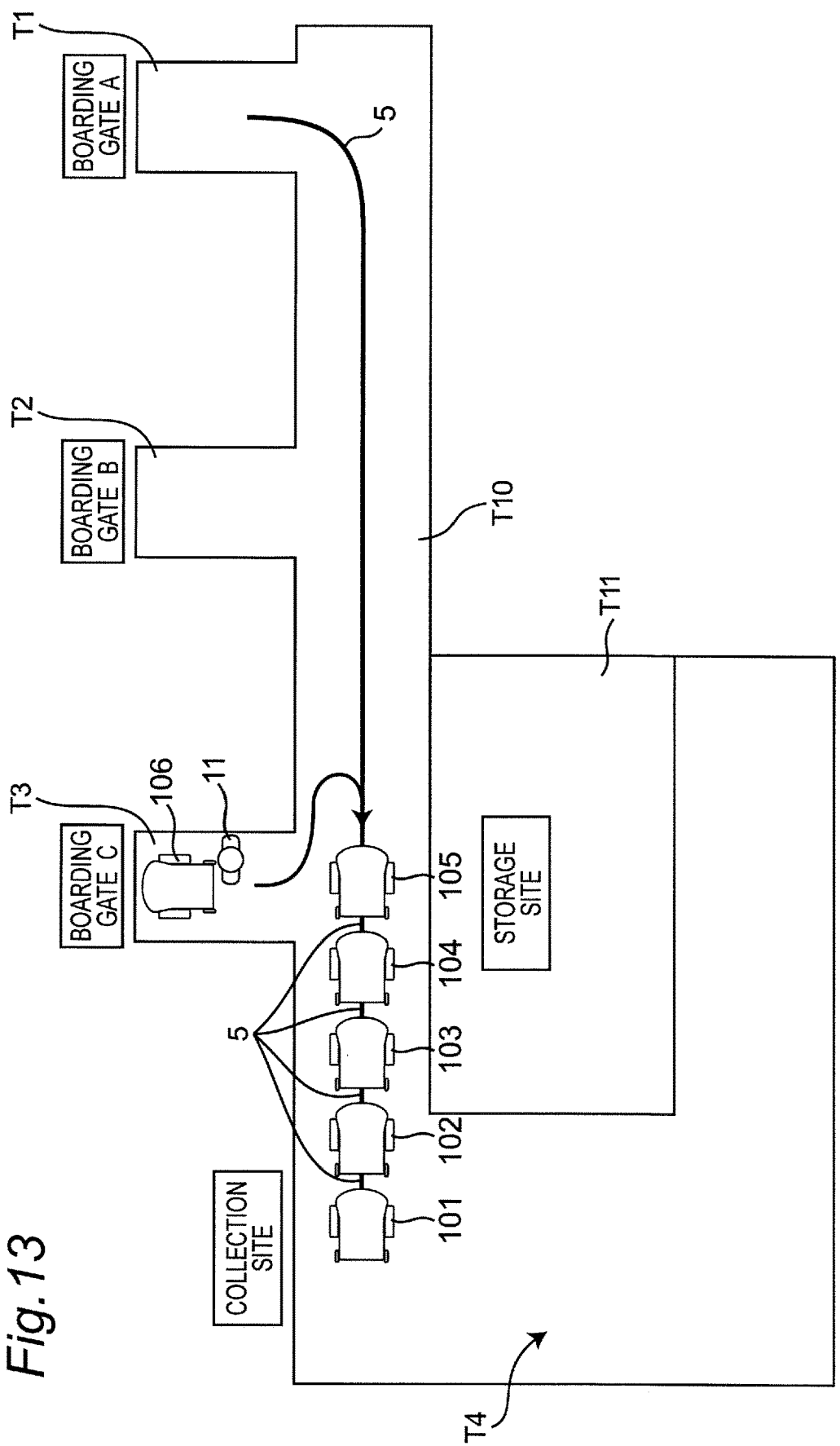
FIG. 13 is a state diagram of the collection flow according to the first embodiment of the present disclosure (depicting activation of the mobile robots in the vicinity of the boarding gate C)

In subsequent step S5 "activate the mobile robots at the boarding gate C", the collector 11 temporarily leaves the first mobile robot 101 and boards the fifth mobile robot 105 as shown in FIG. 13. The collector 11 starts steering the fifth mobile robot 105 and manipulates the operation unit 16 to move the mobile robots 105 and 106 at the location T3 as the boarding gate C as in step S1 and step S2 and dispose on the common passage T10 in the vicinity of the location T3 as the boarding gate C such that the mobile robots 105 and 106 are disposed behind the fourth mobile robot 104 and are directed identically and the first to sixth mobile robots 101 to 106 form a single line.

Specifically, the collector 11 steers the fifth mobile robot 105 to dispose the mobile robots 105 and 106 on the common passage T10 in the vicinity of the location T3 as the boarding gate C so that the detector 7 in each of the mobile robots 105 and 106 can detect the travel locus 5 drawn on the travel plane 19 by the drawing unit 6 in the first mobile robot 101. The drive controller 10 activates the detector 7 in each of the mobile robots 105 and 106. After the detector 7 is activated, the collector 11 boards the first mobile robot 101 again to restart steering the first mobile robot 101 toward the collection site T4. The first mobile robot 101 thereafter executes only step S41 in the basic behavior shown in FIG. 9A, whereas the second to sixth mobile robots 102 to 106 execute step S42 and step S43 other than step S41 in the basic behavior shown in FIG. 9A.

Figure 14:
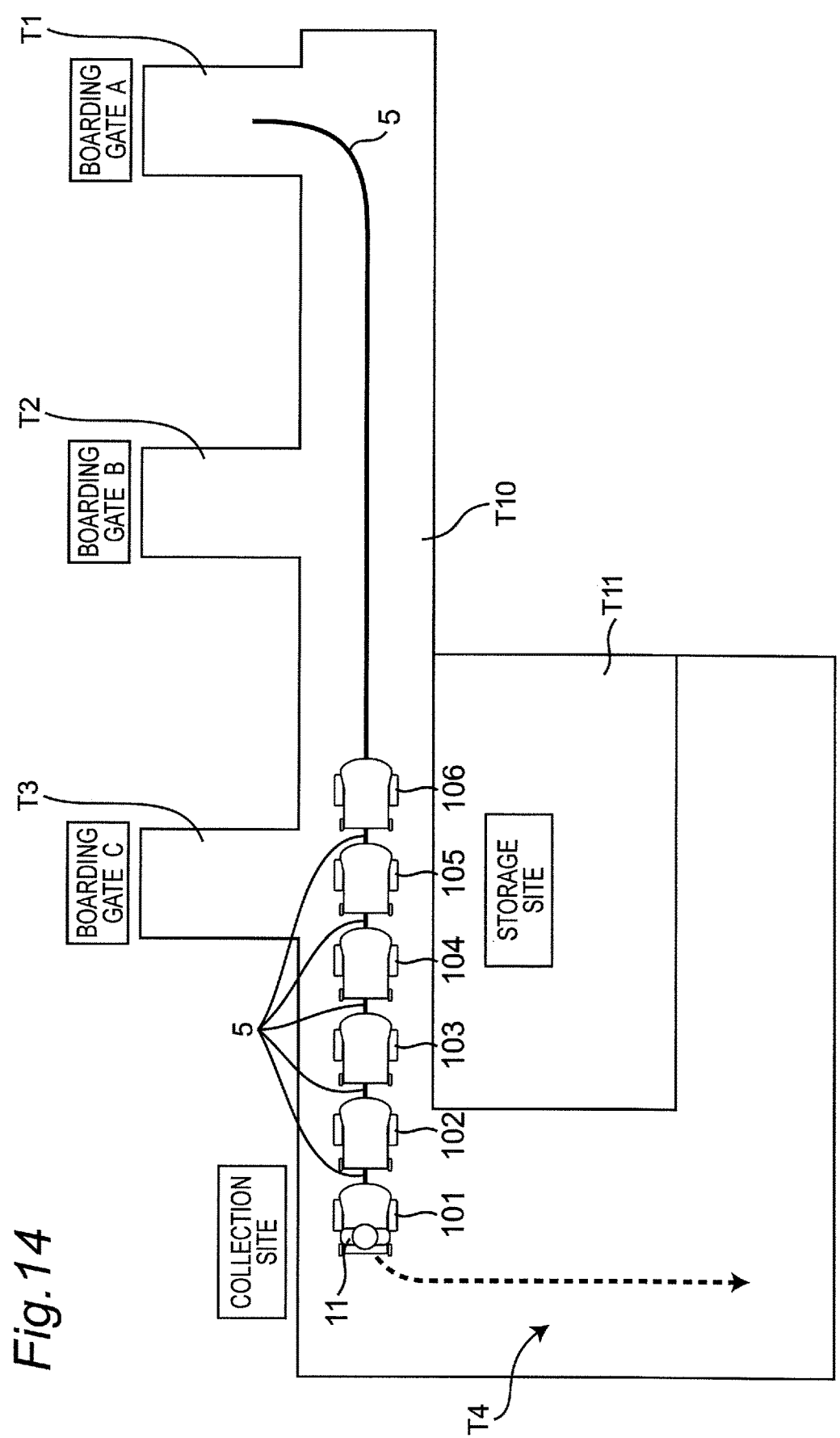
FIG. 14 is a state diagram of the collection flow according to the first embodiment of the present disclosure (depicting movement from in the vicinity of the boarding gate C to the collection site)
Figure 15:
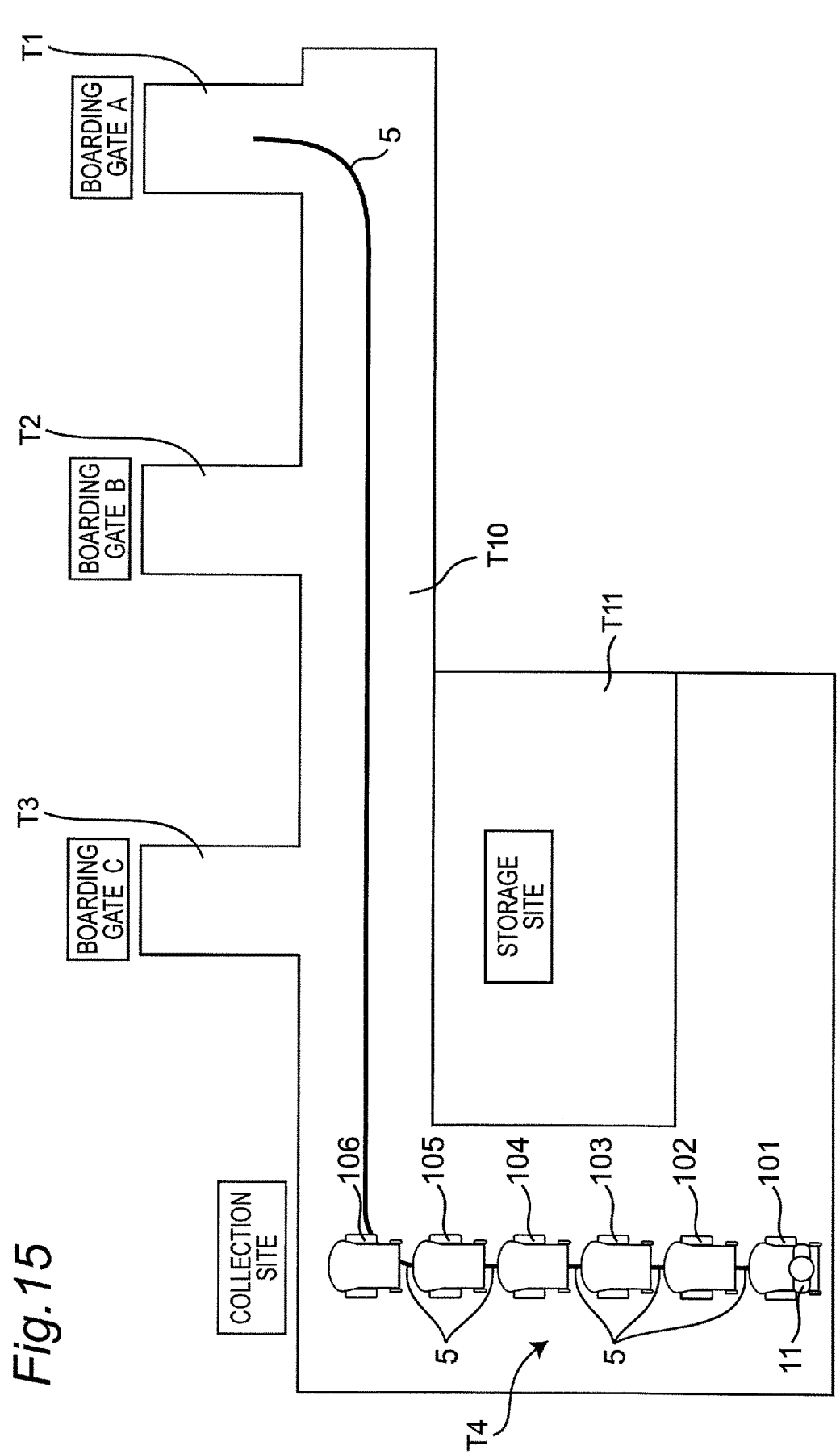
FIG. 15 is a state diagram of the collection flow according to the first embodiment of the present disclosure (depicting stopped positions of the mobile robots at the collection site)

In subsequent step S6 "steer the mobile robot to the collection site", as shown in FIG. 14, the collector 11 continuously steers the first mobile robot 101 to the collection site T4. As shown in FIG. 15, the collector 11 stops the first mobile robot 101 such that the first to sixth mobile robots 101 to 106 align straight to be collected at the collection site T4. The third to sixth mobile robots 103 to 106 travel to track the preceding second mobile robot 102, the third mobile robot 103, the fourth mobile robot 104, or the fifth mobile robot 105 with the distance a therebetween along the travel locus 5 drawn by the first mobile robot 101. The detection and the tracking correspond to the detection in step S42 and the tracking in step S43.

In subsequent step S7 "store the mobile robots", the collector 11 manipulates the operation unit 16 to move the first to sixth mobile robots 101 to 106 from the collection site T4 to a storage site T11.

Figure 16:
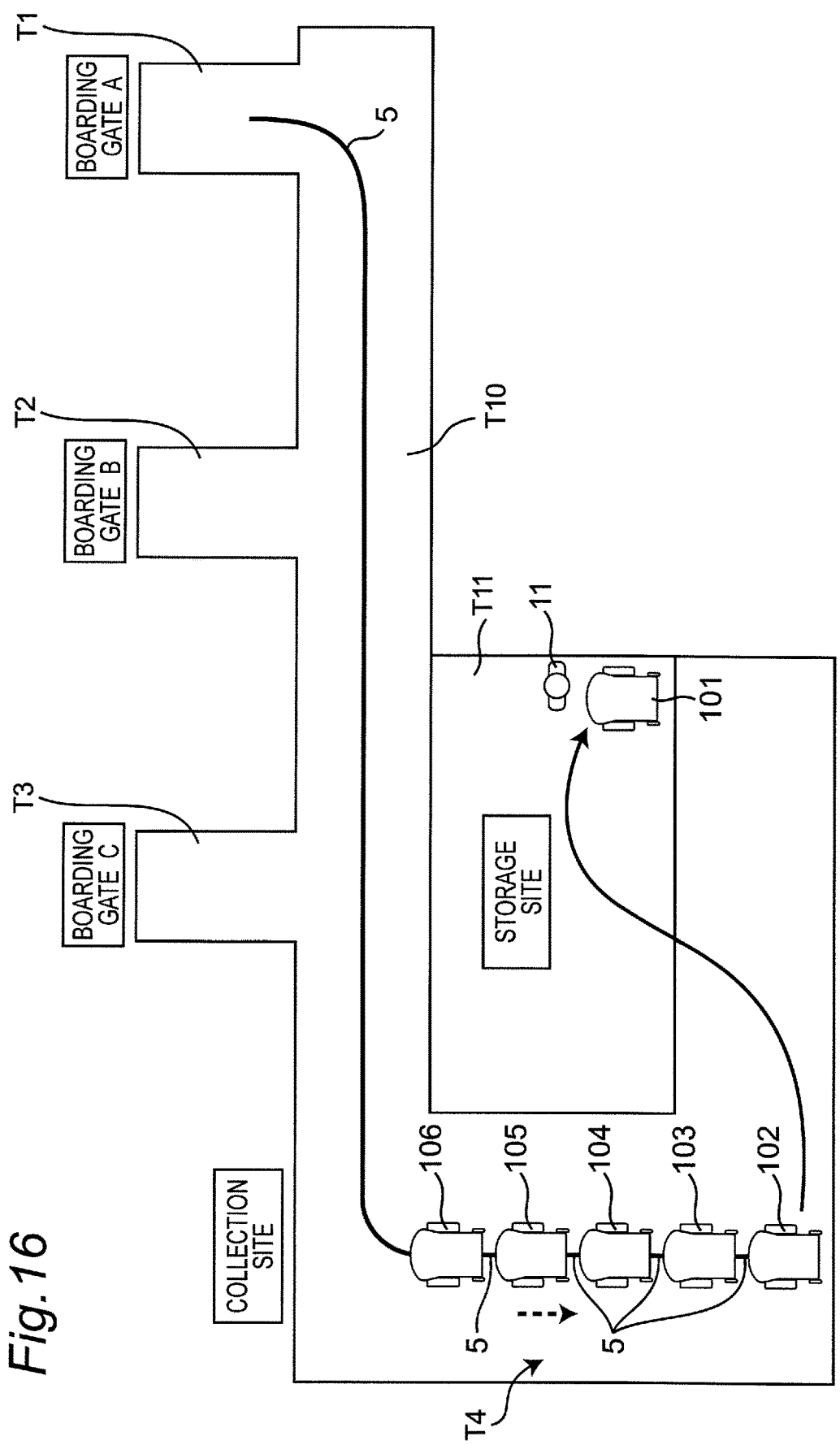
FIG. 16 is a state diagram of the collection flow according to the first embodiment of the present disclosure (depicting movement of a first mobile robot from the collection site to a storage site)

As exemplarily shown in FIG. 16, the collector 11 initially manipulates the operation unit 16 to cause the drive controller 10 to stop drawing by the drawing unit 6 in the first mobile robot 101, and manipulates the operation unit 16 to move the first mobile robot 101 to the storage site T11. The second to sixth mobile robots 102 to 106 travel forward until the detector 7 in the second mobile robot 102 becomes unable to detect the travel locus 5 drawn by the drawing unit 6 in the first mobile robot 101.

Figure 17:
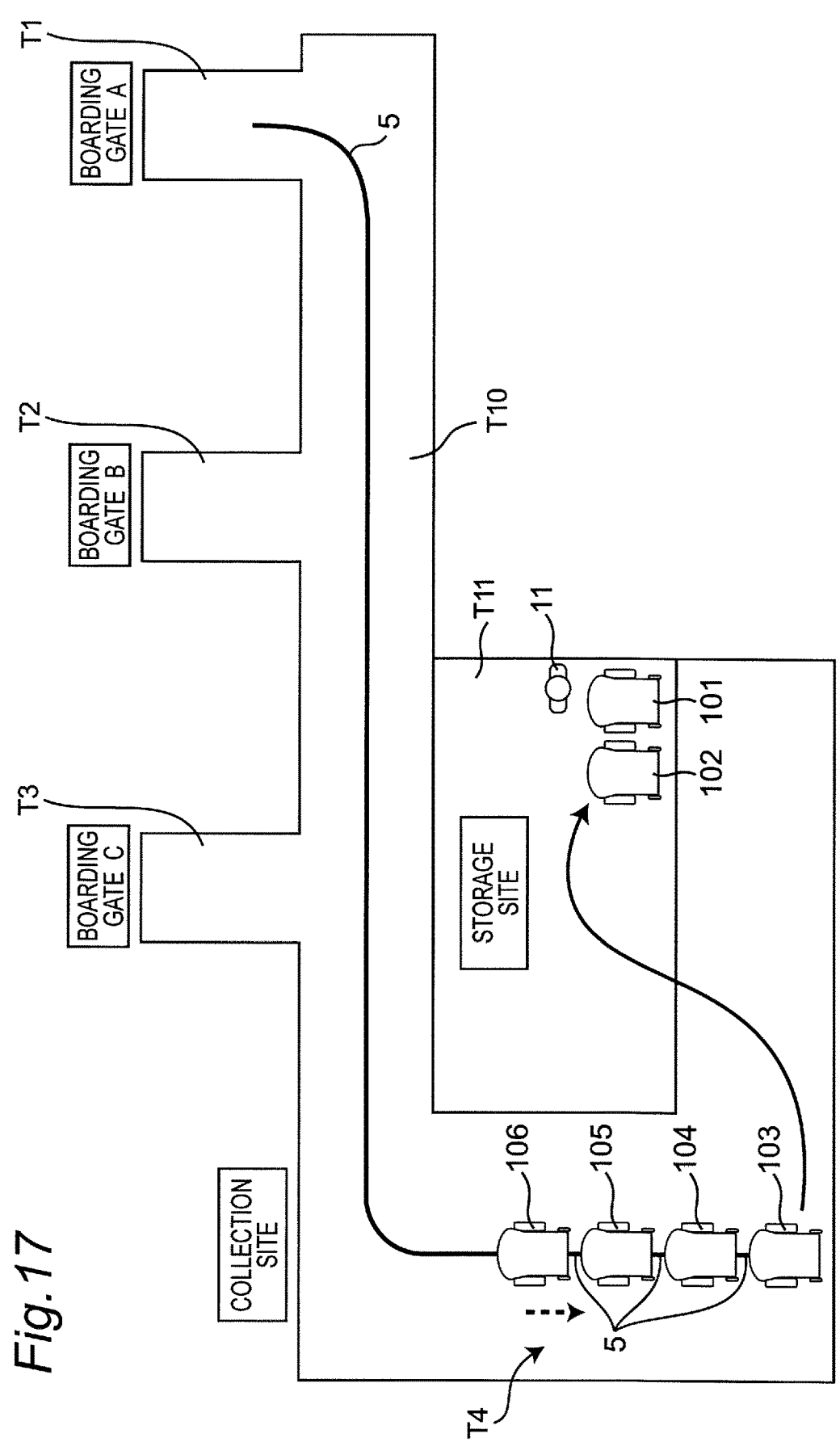
FIG. 17 is a state diagram of the collection flow according to the first embodiment of the present disclosure (depicting movement of a second mobile robot from the collection site to the storage site)

As shown in FIG. 17, the drive controller 10 subsequently stops detection by the detector 7 in the second mobile robot 102, and the collector 11 manipulates the operation unit 16 to move the second mobile robot 102 to the storage site T11. The third to sixth mobile robots 103 to 106 travel forward until the detector 7 in the third mobile robot 103 becomes unable to detect the travel locus 5 drawn by the drawing unit 6 in the first mobile robot 101. Such movement is repeated for each of the third to fifth mobile robots 103 to 105.

Figure 18:
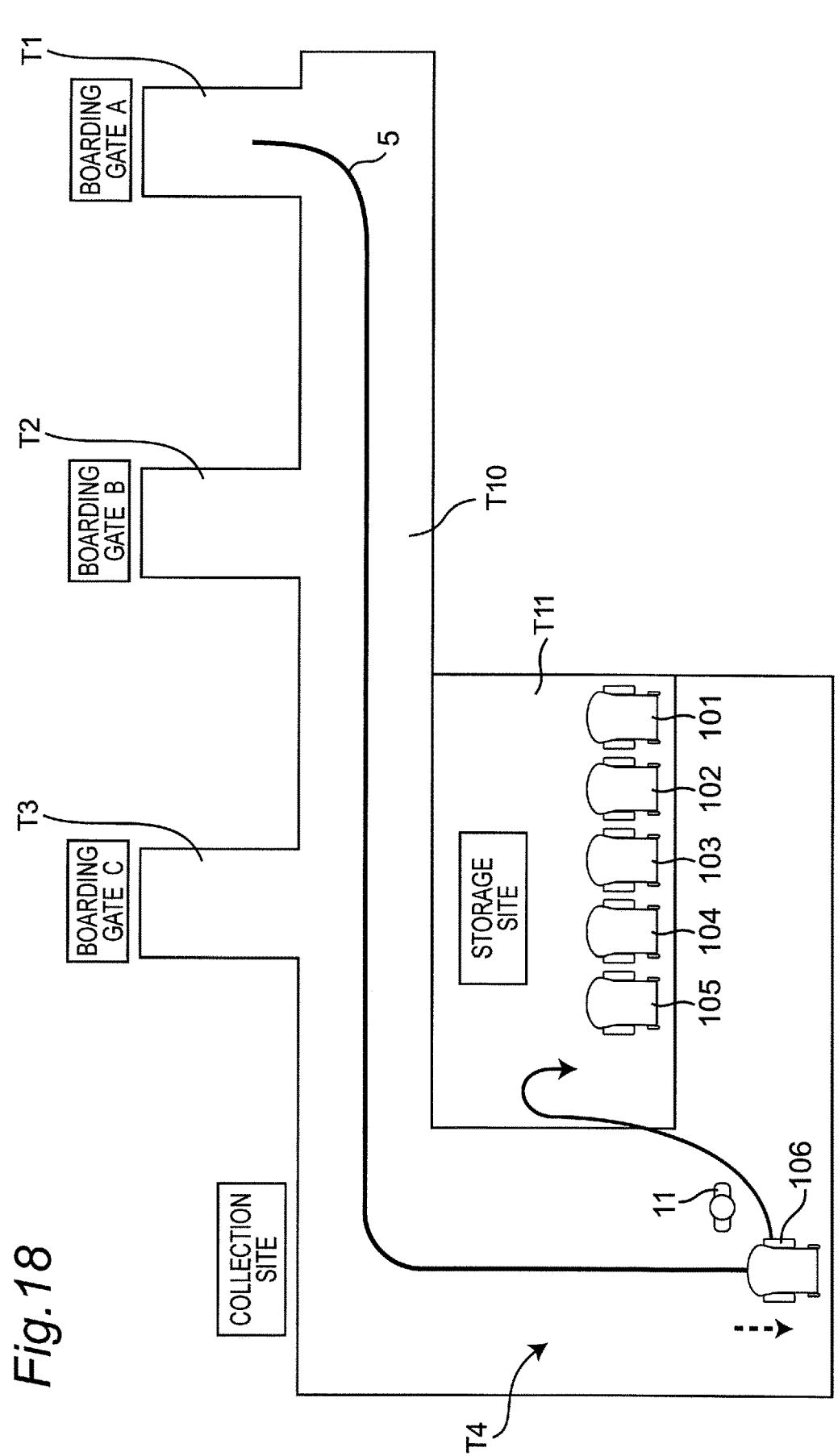
FIG. 18 is a state diagram of the collection flow according to the first embodiment of the present disclosure (depicting movement of a sixth mobile robot from the collection site to the storage site)

As shown in FIG. 18, the drive controller 10 eventually stops detection by the detector 7 in the sixth mobile robot 106, and the collector 11 manipulates the operation unit 16 to move the sixth mobile robot 106 to the storage site T11.

The first mobile robot 101 is moved initially and the remaining mobile robots are moved sequentially in the above example. The present embodiment is not limited in the order of moving the mobile robots, and any appropriate one of the second to sixth mobile robots 102 to 106 can be moved initially in place of the first mobile robot 101.

As described above, in tracking travel of the plurality of mobile robots 100, the drawing unit 6 in the mobile robot 100 at the forefront of the line draws the travel locus 5 on the travel plane 19, the detector 7 in the tracking mobile robot 100 detects the drawn travel locus 5, and the drive controller 10 controls the tracking mobile robots 100 to travel along the detected travel locus 5. Accordingly, tracking control along the identical travel locus 5 of the plurality of mobile robots 100 is achieved even in a broad space such as an air terminal including no wall or the like where the mobile robots 100 cannot recognize own positions.

Second Embodiment

Figure 19:
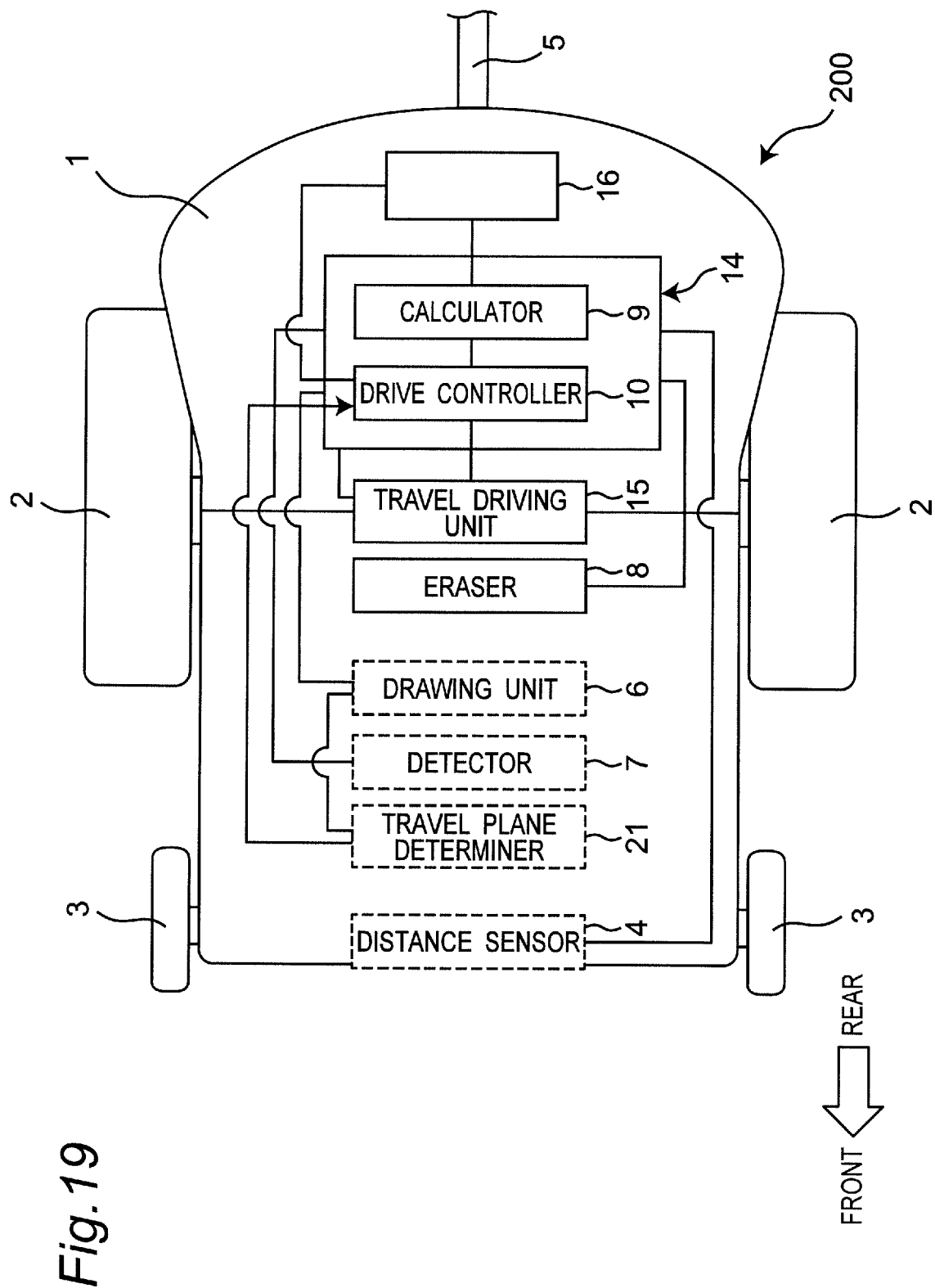
FIG. 19 is a schematic explanatory view from the top of a mobile robot according to a second embodiment of the present disclosure.

Described next with reference to FIG. 19 is a collection system S200 adopting tracking control of six mobile robots 200 according to the second embodiment of the present disclosure. For convenience in the description, the six mobile robots 200 will be denoted by a first mobile robot 201, a second mobile robot 202, a third mobile robot 203, a fourth mobile robot 204, a fifth mobile robot 205, and a sixth mobile robot 206.

Briefly, the collection system S200 is achieved by the mobile robots 200 each including the constituent elements according to the first embodiment as well as an eraser 8 configured to erase the travel locus 5 drawn on the travel plane 19.

FIG. 19 is a schematic explanatory view from the top of the mobile robot 200 according to the second embodiment of the present disclosure. The mobile robot 200 includes the mobile robot body 1, the drawing unit 6, the detector 7, the travel driving unit 15, the controller 14 including the drive controller 10, and the eraser 8. The constituent elements identical with those included in the mobile robot 100 will be denoted by the identical reference signs and will not repeatedly be described in detail.

The eraser 8 is provided at the mobile robot body 1 and erases the travel locus 5 drawn on the travel plane 19 by the drawing unit 6.

The controller 14 is connected to the drawing unit 6, the detector 7, and the eraser 8, and independently controls drawing by the drawing unit 6, detection by the detector 7, and erasing by the eraser 8.

Figure 20:
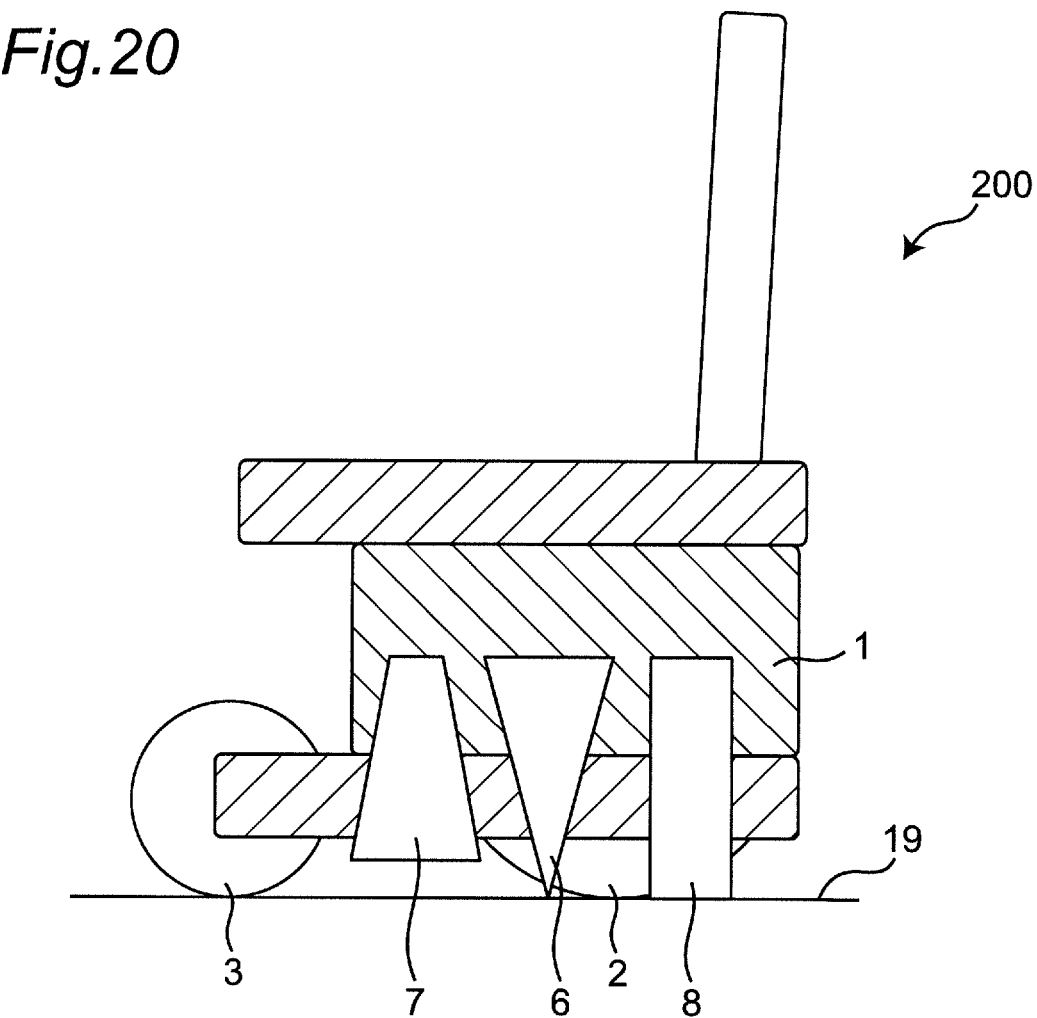
FIG. 20 is a schematic sectional view from a side of the mobile robot according to the second embodiment of the present disclosure.

FIG. 20 is a schematic sectional view from a side of the mobile robot 200. The drawing unit 6 and the detector 7 are configured and function similarly to those of the mobile robot 100.

The drawing unit 6 adopts paint in a case where the travel plane 19 is a hard tile. Examples of the paint include paint that is completely volatilized to disappear by frictional heat. Such paint is specifically exemplified by friction erasable ink having the commercial name "METAMO COLOR" sold by PILOT CORPORATION.

Figure 21A:
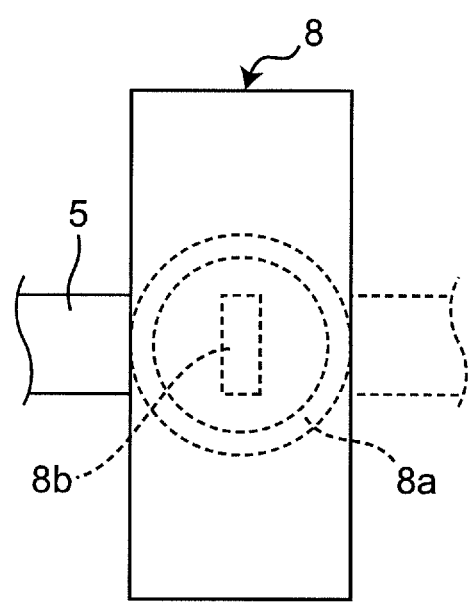
FIG. 21A is a plan view from the top of the mobile robot, of an eraser, according to the second embodiment of the present disclosure.

FIGS. 21A and 21B are detailed views of the eraser 8. FIG. 21A is a plan view from the top of the mobile robot 200, of the eraser 8, whereas FIG. 21B is a perspective view from the bottom of the mobile robot 200, of the eraser 8.

The eraser 8 includes an expandable portion 8a configured to be axially expandable (e.g. vertically in FIG. 21B), a resin portion 8b fixed at a distal end (e.g. the lower end in FIG. 21B) of the expandable portion 8a and having a projecting end, and an eraser driver 8g like a motor configured to axially move the resin portion 8b via the expandable portion 8a and drive-controlled by the drive controller 10.

When the eraser 8 is activated, under control of the drive controller 10, the eraser driver 8g like a motor lowers the resin portion 8b to extend the expandable portion 8a axially downward and thus, the lower end of the resin portion 8b comes into direct contact with the travel plane 19. The resin portion 8b is made of a material exemplified by elastomer and specifically exemplified by friction eraser sold by PILOT CORPORATION.

When the mobile robot 200 travels with the eraser 8 being activated and the lower end of the resin portion 8b being in direct contact with the travel plane 19, the travel plane 19 and the resin portion 8b have friction therebetween to generate heat that volatilizes the paint of the travel locus 5 drawn on the travel plane 19 to completely erase the travel locus 5.

When the mobile robot 200 stops or the eraser 8 stops erasing, under control of the drive controller 10, the eraser driver 8g like a motor raises the resin portion 8b to contract the expandable portion 8a so as to prevent the resin portion 8b from directly contacting the travel plane 19.

The eraser 8 described above is configured correspondingly to the case where the travel locus 5 is drawn with paint.

In another case where the travel locus 5 is drawn with particles, the eraser 8 can be configured as follows. As another example, the eraser 8 alternatively includes a sucking device 8h disposed in series in the travel direction with the elements such as the eraser driver 8g and configured to suck the particles applied onto the travel plane 19. The sucking device 8h sucks the particles to completely erase the travel locus 5. The eraser 8 selects how to erase the travel locus 5, specifically, which one to drive the sucking device 8h or the eraser driver 8g, in accordance with a result of determination by the travel plane determiner 21.

As shown in FIG. 21C, the sucking device 8h includes a nozzle 81, a dust box 82, a first filter 83, a dust collecting blade 84, a motor 85, and a second filter 86. The motor 85 rotates the dust collecting blade 84 to cause the particles configuring the travel locus 5 to be sucked through the nozzle 81 into the dust box 82. The first filter 83 catches most of the particles that are stored in the dust box 82. The second filter 86 catches fine particles having passed through the first filter 83.

Figure 22:
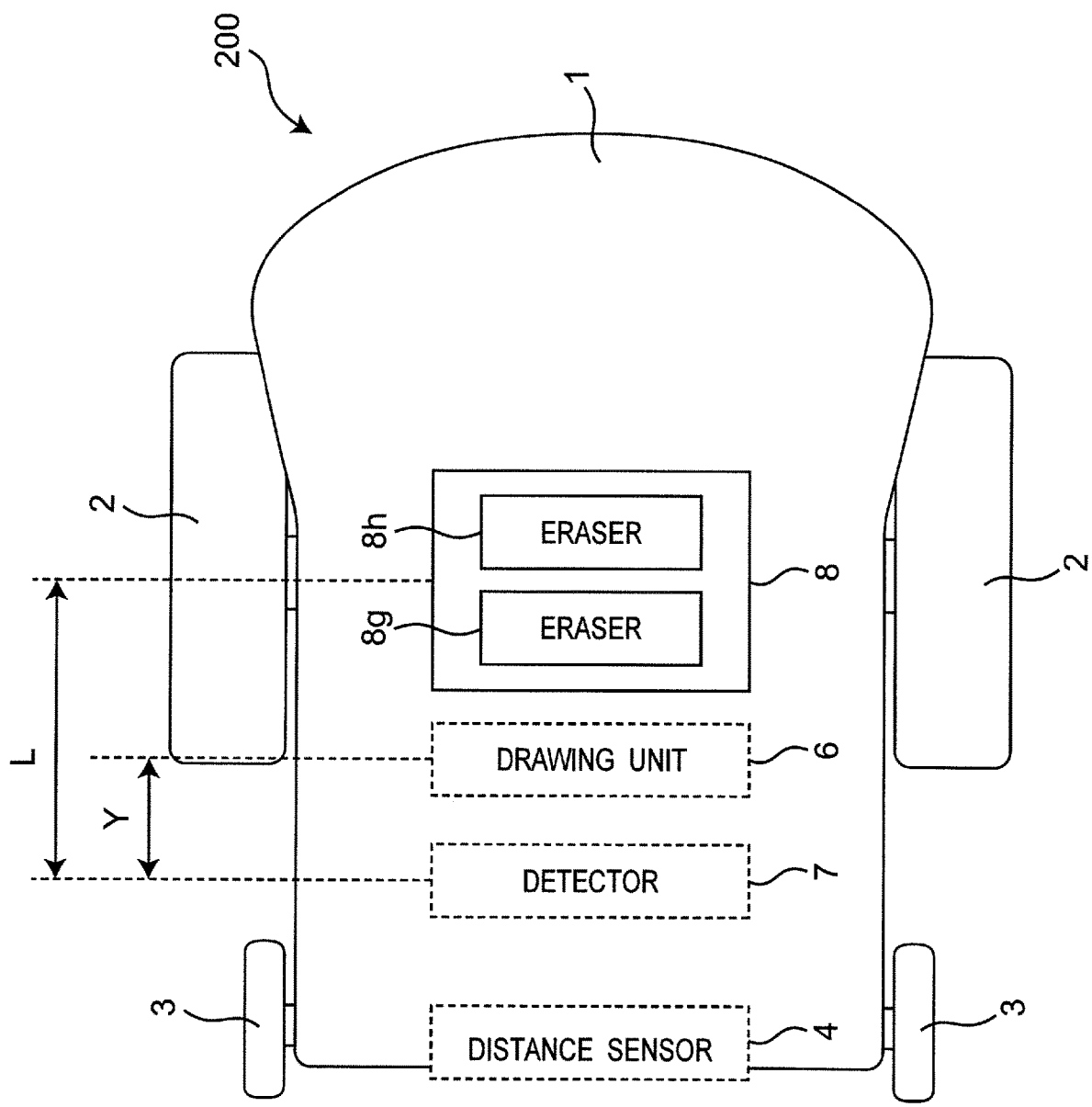
FIG. 22 is a positional relationship diagram of a drawing unit, a detector, and the eraser of the mobile robot according to the second embodiment of the present disclosure.

FIG. 22 depicts a positional relationship among the drawing unit 6, the detector 7, and the eraser 8 included in the mobile robot 200. The drawing unit 6, the detector 7, and the eraser 8 are disposed in series in the travel direction. For example, the detector 7, the drawing unit 6, and the eraser 8 are disposed in the mentioned order from ahead to behind in the travel direction. Assume that the drawing unit 6 and the detector 7 are disposed apart from each other by a distance Y and the detector 7 and the eraser 8 are disposed apart from each other by a distance L.

Figure 23:
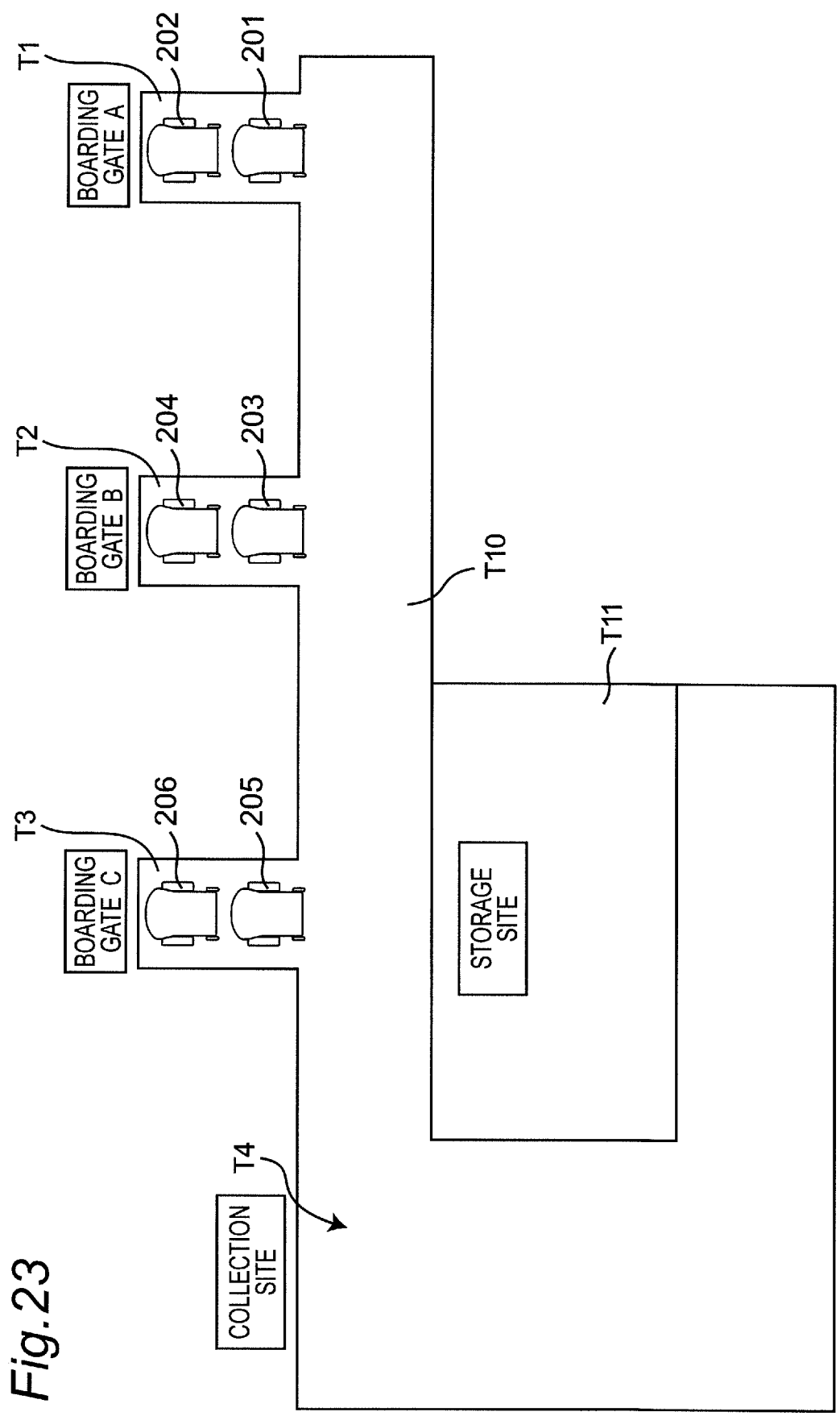
FIG. 23 is an explanatory view depicting a positional distribution state of mobile robots in a collection system according to the second embodiment of the present disclosure.

FIG. 23 is a view depicting a state where the six mobile robots, namely, the first to sixth mobile robots 201 to 206 are disposed at the locations T1 to T3 in the collection system S200. The two mobile robots, namely, the first mobile robot 201 and the second mobile robot 202 are disposed next to each other at the location T1 as the boarding gate A and are directed identically in the anteroposterior direction. The first mobile robot 201 is disposed ahead in the travel direction and the second mobile robot 202 is disposed behind in the travel direction of the first mobile robot 201. Similarly, the two mobile robots, namely, the third mobile robot 203 and the fourth mobile robot 204 are disposed next to each other at the location T2 as the boarding gate B and are directed identically in the anteroposterior direction. The third mobile robot 203 is disposed ahead in the travel direction and the fourth mobile robot 204 is disposed behind in the travel direction of the third mobile robot 203. Similarly, the two mobile robots, namely, the fifth mobile robot 205 and the sixth mobile robot 206 are disposed next to each other at the location T3 as the boarding gate C and are directed identically in the anteroposterior direction. The fifth mobile robot 205 is disposed ahead in the travel direction and the sixth mobile robot 206 is disposed behind in the travel direction of the fifth mobile robot 205.

Figure 24:
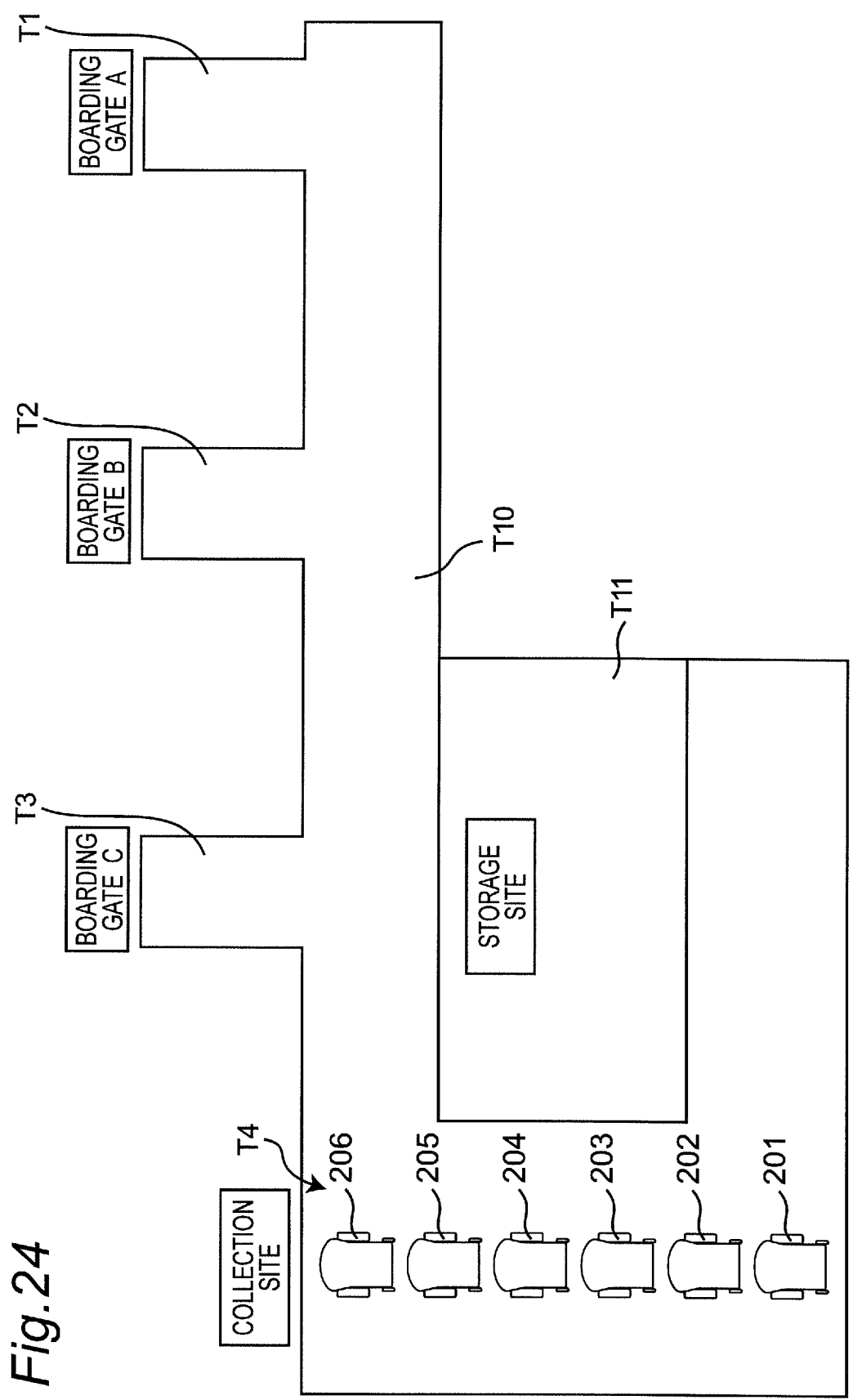
FIG. 24 is an arrangement plan of the mobile robots at a collection site in the collection system according to the second embodiment of the present disclosure.

FIG. 24 is a view of the collection site T4 for the six mobile robots, namely, the first to sixth mobile robots 201 to 206 in the collection system S200. The first to sixth mobile robots 201 to 206 are collected sequentially at the collection site T4 to form a single line such that the first mobile robot 201 is disposed at the forefront in the travel direction.

Figure 25:
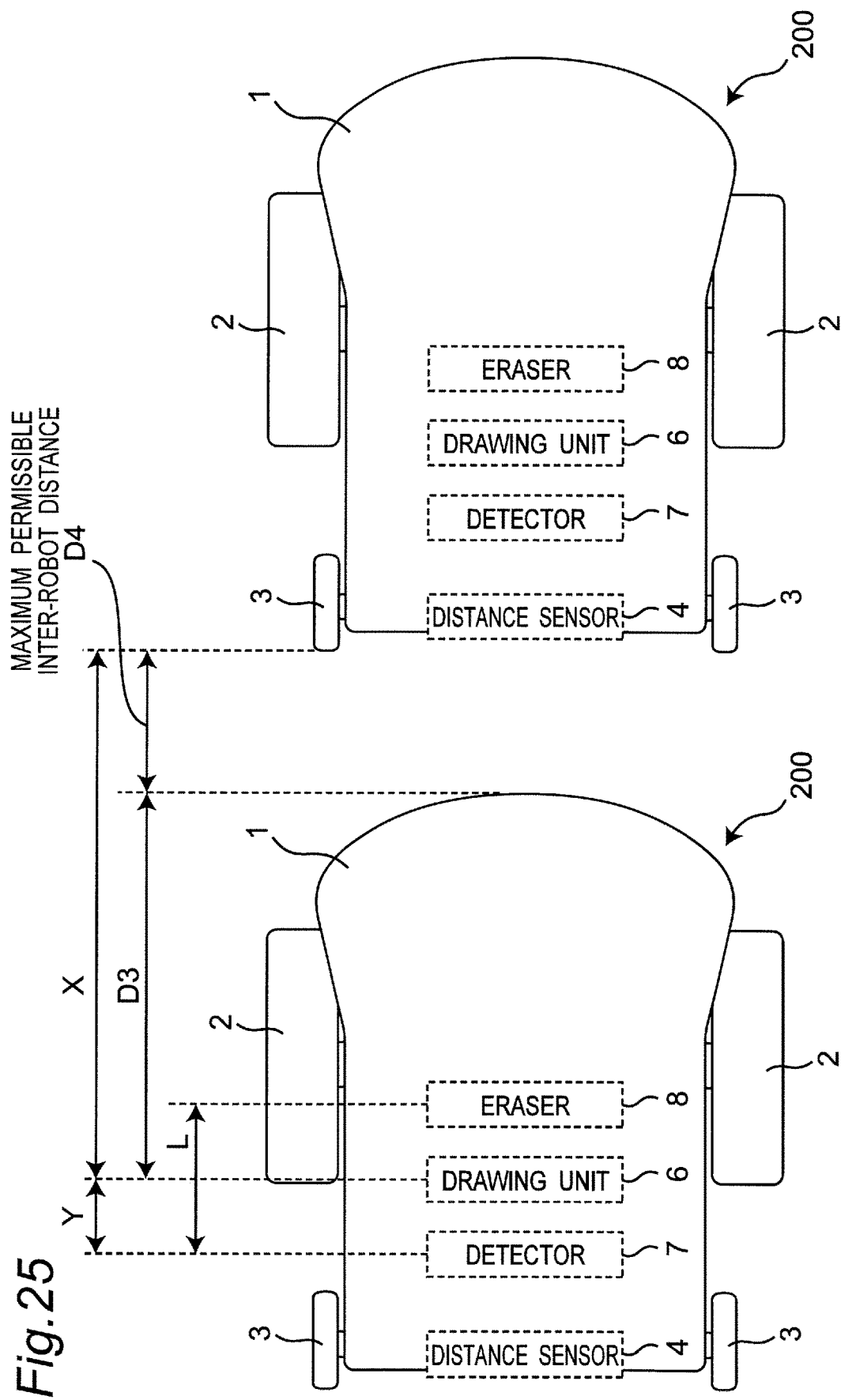
FIG. 25 is a positional relationship diagram of the mobile robot disposed in the vicinity of each boarding gate in the collection system according to the second embodiment of the present disclosure.

FIG. 25 is a view depicting a positional relationship of the first to sixth mobile robots 201 to 206 disposed at the locations T1 to T3 as the boarding gates. A distance from the rear end of the mobile robot 201, 203, or 205 disposed ahead at the location to the front end of the mobile robot 202, 204, or 206 disposed behind will be referred to as an inter-robot distance, and the permissible maximum value of the inter-robot distance will be referred to as a maximum permissible inter-robot distance D4. Assume that a distance X is obtained by adding the distance D3 from the drawing unit 6 included in each of the mobile robots 201 to 206 to the rear end of the mobile robot and the maximum permissible inter-robot distance D4 to each other.

Figure 26A:
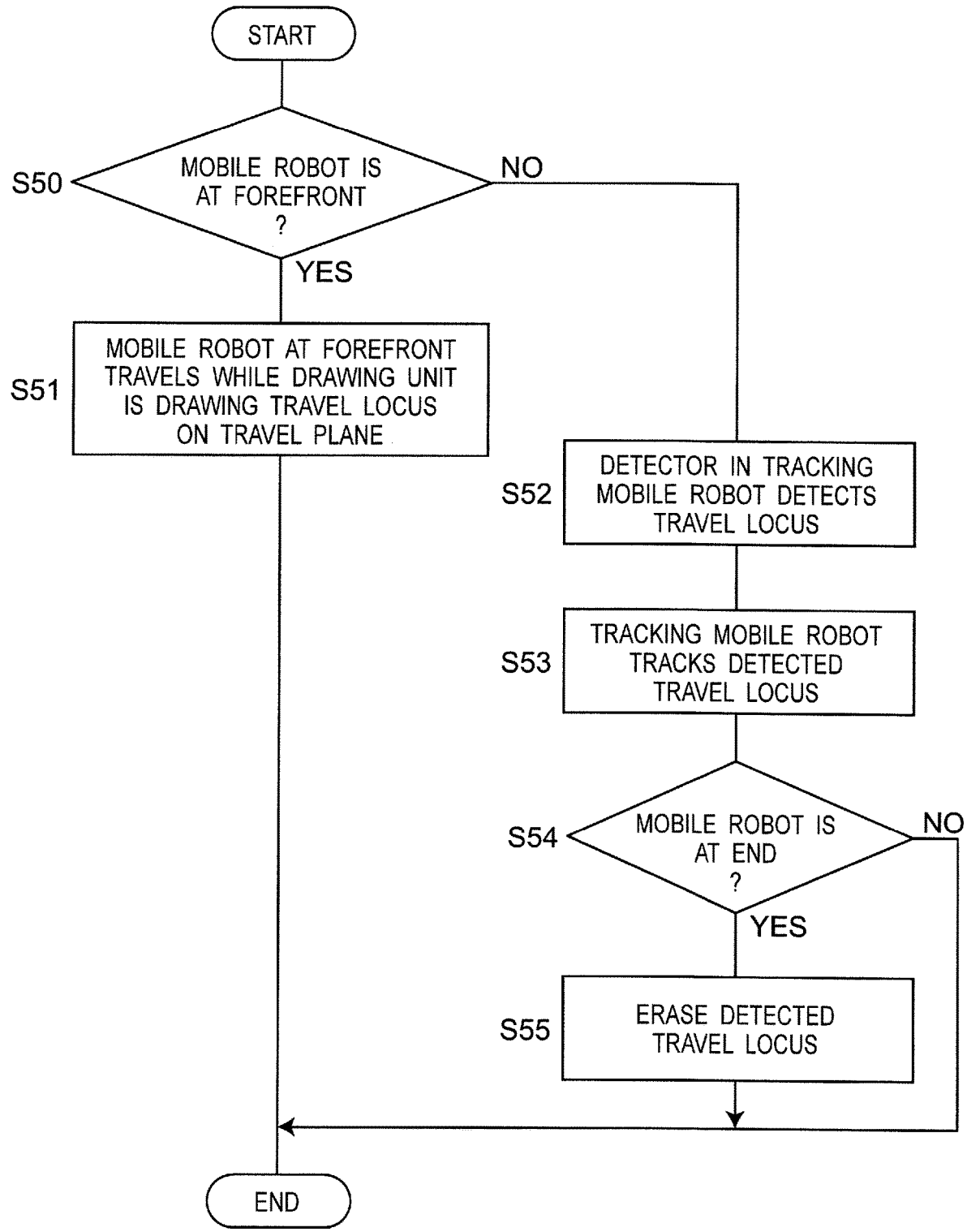
FIG. 26A is a collection flowchart of basic behavior of the collection system according to the second embodiment of the present disclosure.

Described next is a collection flow of the collection system S200 for a plurality of mobile robots 200 executing tracking travel in a single line. A specific example thereof will be described after description of basic behavior. FIG. 26A is a flowchart depicting the basic collection behavior.

Initially in step S50, when executing tracking travel in a single line of a plurality of mobile robots 200, the drive controller 10 determines whether or not the mobile robot 200 is at the forefront of the line. This determination can be made by the collector 11 who manipulates the operation unit 16 to inform the drive controller 10 that this mobile robot 200 is at the forefront of the line. The drive controller 10 can alternatively determine that this mobile robot 200 is at the forefront of the line when the distance sensor 4 detects that there is no other mobile robot 200 ahead of this mobile robot 200 for a predetermined period. The drive controller 10 can still alternatively determine that this mobile robot 200 is at the forefront of the line in an exemplary case where the detector 7 detects no travel locus 5 even after this mobile robot 200 moves for a predetermined period or by a predetermined distance.

The flow proceeds to step S51 if the drive controller 10 determines that this mobile robot 200 is at the forefront of the line. The flow proceeds to step S52 if the drive controller 10 determines that this mobile robot 200 is not at the forefront of the line.

Subsequently, in step S51, the drive controller 10 controls to activate the drawing unit 6 and the detector 7 in the mobile robot 200 at the forefront of the line so that the drawing unit 6 starts drawing the travel locus 5 on the travel plane 19 and the detector 7 starts detection. That is, drawing is executed after the detector 7 finds that drawing is not executed. The drive controller 10 controls the travel driving unit 15 while the drawing and the detection are executed. The mobile robot 200 at the forefront of the line having reached a predetermined position ends the basic collection behavior shown in FIG. 26A.

In step S52, the detector 7 in each of the mobile robots 200 tracking at the second and the subsequent positions in the line detects the travel locus 5 drawn on the travel plane 19.

Subsequently, in step S53, the drive controller 10 in each of the mobile robots 200 tracking the detected travel locus 5 at the second and the subsequent positions in the line controls the travel driving unit 15 for tracking travel.

Subsequently, in step S54, it is determined whether or not the mobile robot 200 is at the end of the line. In a case where the collector 11 collecting the mobile robots 200 manipulates the operation unit 16 to transmit, to the drive controller 10, information that the mobile robot 200 is at the end of the line, in step S55, the eraser 8 in the mobile robot 200 at the end of the line erases the travel locus 5 and the drive controller 10 in the mobile robot 200 at the end of the line controls the travel driving unit 15 for tracking travel. The eraser 8 does not execute erasing without such information. The mobile robots 200 tracking at the second and the subsequent positions in the line then end the basic collection behavior shown in FIG. 26A.

Figure 26B:
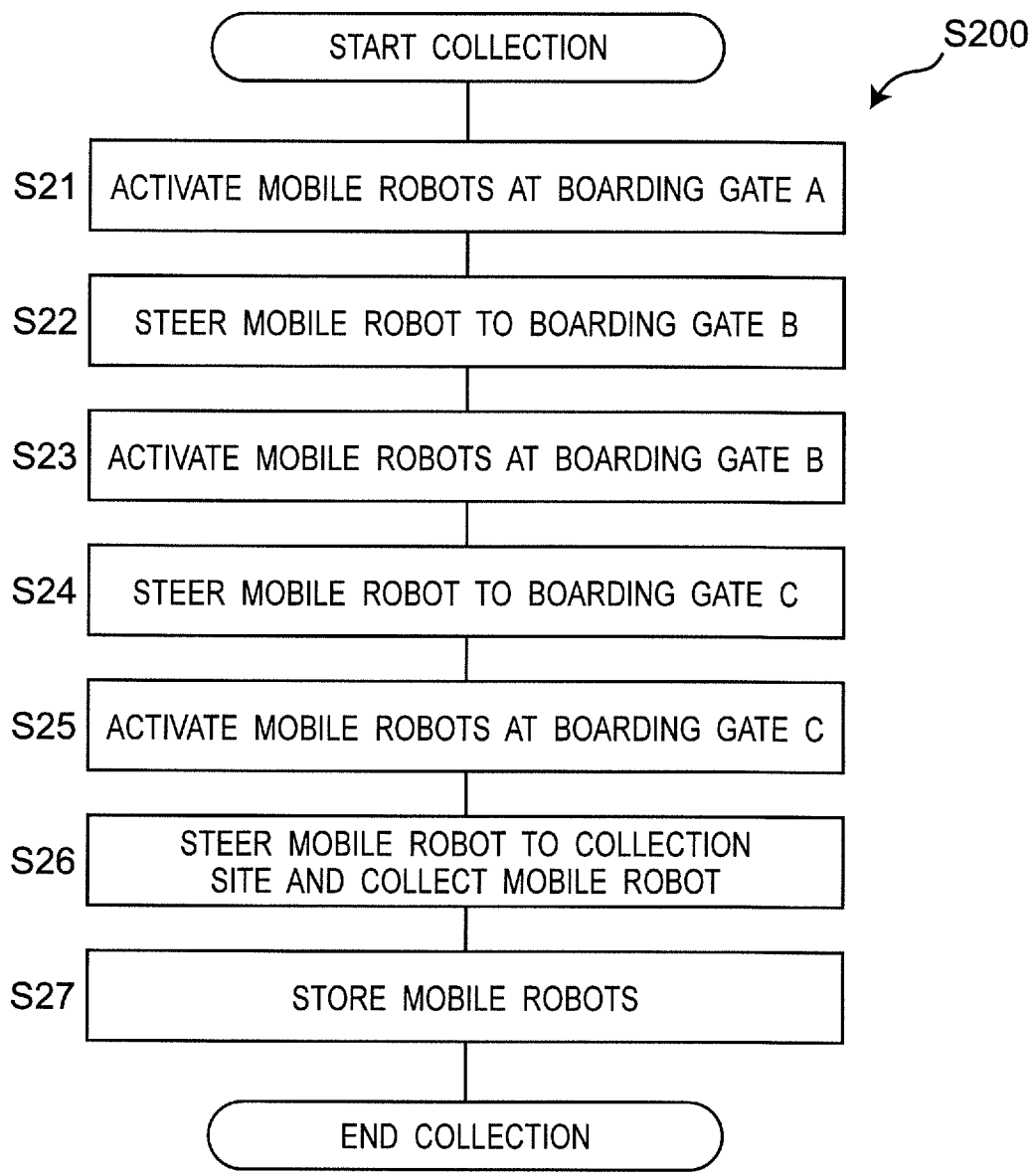
FIG. 26B is a specifically exemplified collection flowchart for the collection system according to the second embodiment of the present disclosure.

Described next is the specific example of the collection flow of the collection system S200 for the plurality of mobile robots 200 executing tracking travel in the single line. FIG. 26B is a flowchart depicting the specific collection behavior. FIG. 26B exemplifies a case where the six mobile robots 200 eventually execute tracking travel in the single line.

Initially in step S21 "activate the mobile robots at the boarding gate A", the collector 11 expected to collect the mobile robots 200 moves to the location T1 as the boarding gate A, and activates the drawing unit 6 in the first mobile robot 201 and the detector 7 and the eraser 8 in the second mobile robot 202 disposed at the location T1 as the boarding gate A to be ready for starting drawing and detection.

Subsequently, in step S22, the collector 11 boards the first mobile robot 201 and starts steering the first mobile robot 201 from the location T1 as the boarding gate A toward the location T2 as the boarding gate B. When the first mobile robot 201 starts travelling, under the control of the drive controller 10, the drawing unit 6 in the first mobile robot 201 causes the marker 6b to start drawing to leave the travel locus 5 on the travel plane 19, and executes drawing after the detector 7 detects that there is no travel locus 5. Such behavior corresponds to the drawing in step S51. The first mobile robot 201 subsequently executes only the drawing in step S51 and needs to execute neither the detection in step S52 nor the subsequent behavior.

In the second mobile robot 202 expected to track the first mobile robot 201, the distance sensor 4 measures a distance to the first mobile robot 201 positioned thereahead and transmits the distance to the calculator 9 in the controller 14. The drive controller 10 can thus determine that this mobile robot 200 is not at the forefront of the line. When the calculator 9 determines that the measured distance exceeds the distance X, the drive controller 10 receives information on the determination from the calculator 9 and controls the travel driving unit 15 such that the second mobile robot 202 continuously travels straight by the distance X from the current position until the detector 7 detects the travel locus 5.

In order to achieve control of the travel driving unit 15 by the drive controller 10 for continuous straight travel by the distance X, the drive controller 10 has only to control the travel driving unit 15 such that the distance sensor 4 measures the distance to an identical obstacle shortened by the distance X in the travel direction. Alternatively, the travel driving unit 15 may include the encoder 15e configured to detect rotational speed of the motor 15m and the drive controller 10 controls the travel driving unit 15 such that a distance obtained from the detected rotational speed is shortened by the distance X. The collection system S100 according to the foregoing embodiment can similarly execute such control.

The detector 7 in the second mobile robot 202 subsequently detects the travel locus 5 of the first mobile robot 201 and the calculator 9 calculates the travel locus 5 for tracking the first mobile robot 201 in accordance with a result of the detection. The drive controller 10 drive controls the travel driving unit 15 in accordance with the calculated travel locus 5, so that the second mobile robot 202 tracks the travel locus 5. The detection and the tracking correspond to the detection in step S52 and the tracking in step S53. The collector 11 manipulates the operation unit 16 to transmit, to the drive controller 10, information that the second mobile robot 202 is at the end of the line during tracking. The eraser 8 in the second mobile robot 202 accordingly erases the detected travel locus 5. Such behavior corresponds to the line end checking in step S54 and the erasing in step S55. When the second mobile robot 202 tracks the first mobile robot 201, the distance sensor 4 in the second mobile robot 202 measures a distance to the preceding first mobile robot 201 and the controller 14 controls to execute tracking travel such the distance is equal to the distance a. The distance a is similar to the distance a exemplified earlier.

In the following description, similarly to the second mobile robot 202, the fourth mobile robot 204 tracking the third mobile robot 203 at the boarding gate B and the sixth mobile robot 206 tracking the fifth mobile robot 205 at the boarding gate C execute tracking travel to have the distance a from the preceding mobile robots 203 and 205, respectively.

Figure 27:
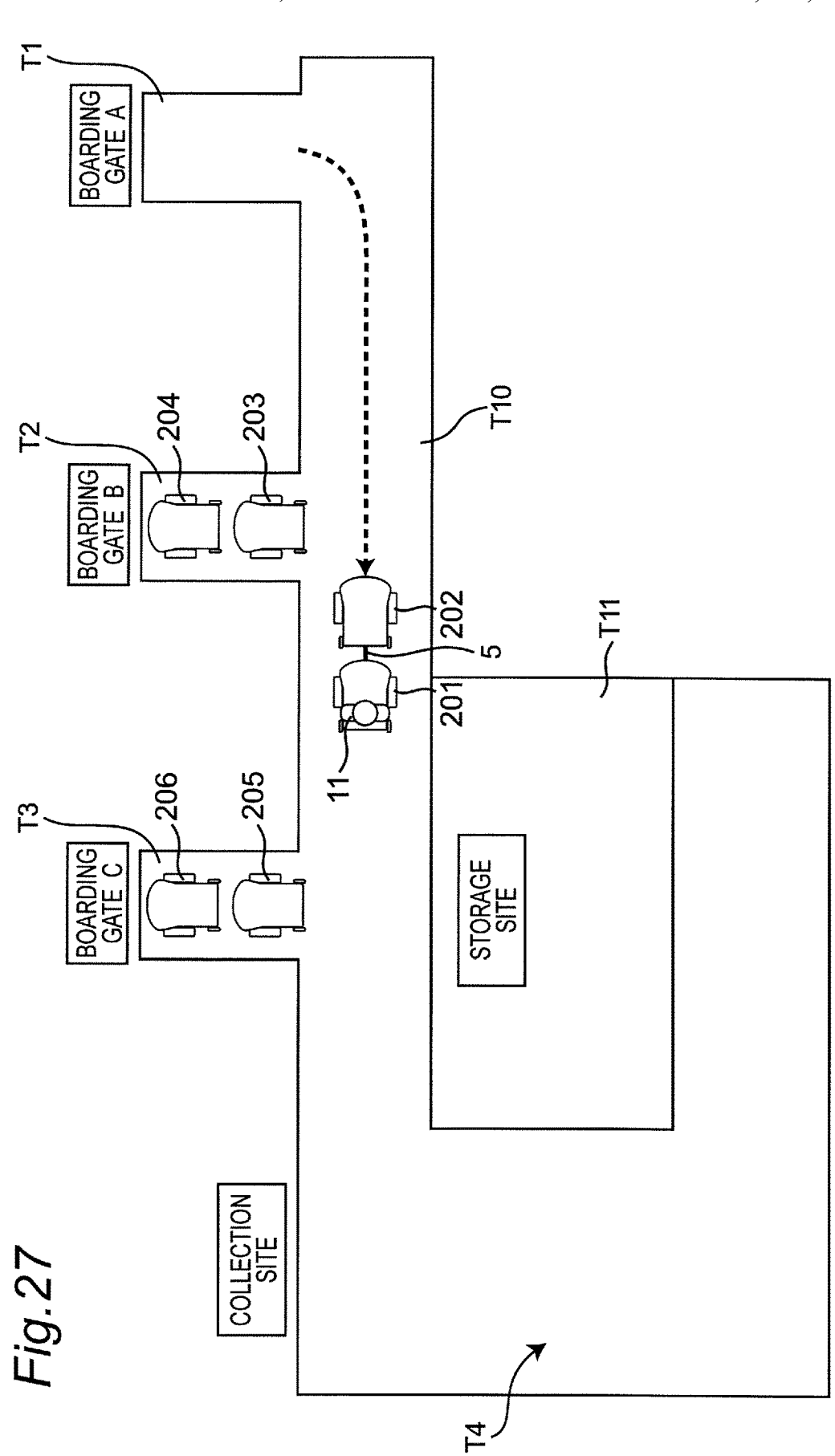
FIG. 27 is a state diagram of the collection flow shown in FIG. 26B according to the second embodiment of the present disclosure (depicting movement from in the vicinity of a boarding gate A to in the vicinity of a boarding gate B)

In step S22 "steer the mobile robot to the boarding gate B" subsequent to step S21, as shown in FIG. 27, the collector 11 continuously steers the first mobile robot 201 to the common passage T10 in the vicinity of the location T2 as the boarding gate B. The collector 11 stops the first mobile robot 201 such that the mobile robots 201 and 202 align straight on the common passage T10 in the vicinity of the location T2 as the boarding gate B. The second mobile robot 202 travels to track the preceding first mobile robot 201 with the distance a therebetween on the travel locus 5 drawn by the first mobile robot 201. The detection and the tracking correspond to the detection in step S52 and the tracking in step S53. The travel locus 5 is completely erased by the activated eraser 8 in the second mobile robot 202. The line end checking and the erasing correspond to the line end checking in step S54 and the erasing in step S55.

The first mobile robot 201 executes only step S51 in the basic behavior shown in FIG. 26A, whereas the second mobile robot 202 executes step S52 and the subsequent steps other than step S51 in the basic behavior shown in FIG. 26A.

Figure 28:
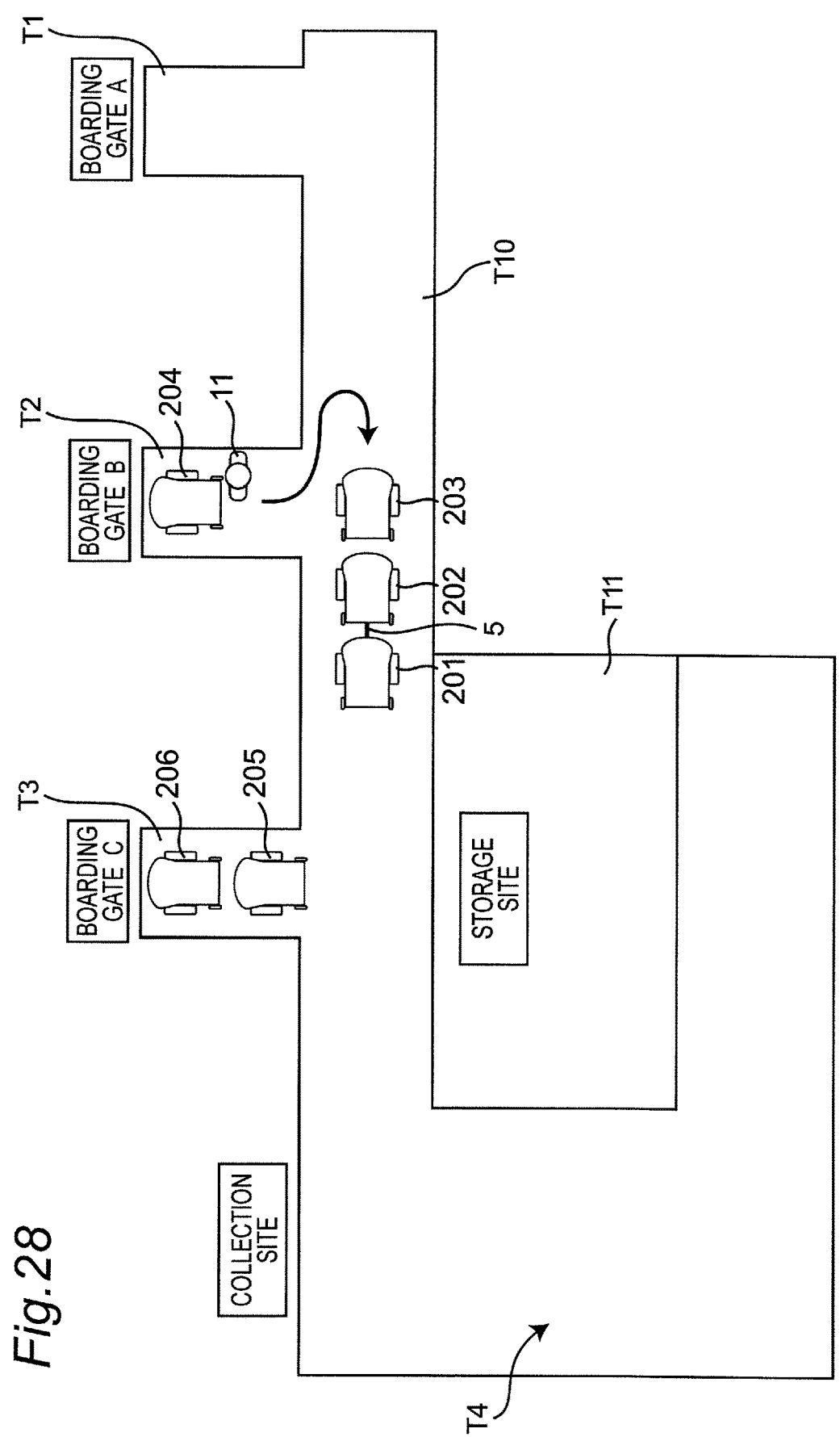
FIG. 28 is a state diagram of the collection flow according to the second embodiment of the present disclosure (depicting activation of the mobile robots in the vicinity of the boarding gate B)

In subsequent step S23 "activate the mobile robots at the boarding gate B", the collector 11 temporarily leaves the first mobile robot 201 and boards the third mobile robot 203 as shown in FIG. 28. The collector 11 manipulates the operation unit 16 to cause the drive controller 10 to stop erasing by the eraser 8 in the second mobile robot 202. The collector 11 then starts steering the third mobile robot 203 and manipulates the operation unit 16 to move the third and fourth mobile robots 203 and 204 at the location T2 as the boarding gate B as in step S21 and step S22 and dispose on the common passage T10 in the vicinity of the location T2 as the boarding gate B such that the third and fourth mobile robots 203 and 204 are disposed behind the second mobile robot 202 and are directed identically and the first to fourth mobile robots 201 to 204 form a single line.

Specifically, the collector 11 steers the third mobile robot 203 to dispose the mobile robots 203 and 204 on the common passage T10 in the vicinity of the location T2 as the boarding gate B so that the detector 7 in each of the mobile robots 203 and 204 can detect the travel locus 5 drawn on the travel plane 19 by the drawing unit 6 in the first mobile robot 201. Then, the drive controller 10 activates the detector 7 in each of the mobile robots 203 and 204. Thereafter, the collector 11 manipulates the operation unit 16 to cause the drive controller 10 in each of the disposed mobile robots to activate the drawing unit 6 and the detector 7 in the third mobile robot 203 and activate the detector 7 and the eraser 8 in the fourth mobile robot 204. After these units are activated, the collector 11 boards the first mobile robot 201 again to restart steering the first mobile robot 201 on the common passage T10 toward the location T3 as the boarding gate C. The first mobile robot 201 thereafter executes only step S51 in the basic behavior shown in FIG. 26A, whereas the second to fourth mobile robots 202 to 204 execute step S52 and step S53 other than step S51 in the basic behavior shown in FIG. 26A. The fourth mobile robot 204 further executes step S54 and step S55 in the basic behavior shown in FIG. 26A.

After these units (namely, the drawing unit 6, the detector 7, and the eraser 8) are activated, the collector 11 boards the first mobile robot 201 again to restart steering the first mobile robot 201 on the common passage T10 toward the location T3 as the boarding gate C. The third and fourth mobile robots 203 and 204 continuously travel straight by the distance X until the detectors 7 each detect the travel locus 5, and the drive controller 10 in the third mobile robot 203 automatically stops drawing by the drawing unit 6 when the third mobile robot 203 travels by the distance Y after the detector 7 detects the travel locus 5. In order to cause the drive controller 10 to automatically stop the drawing unit 6 after travel by the distance Y, the drive controller 10 has only to stop the drawing unit 6 after the drive controller 10 controls the travel driving unit 15 such that the distance sensor 4 measures the distance to an identical obstacle shortened by the distance Y in the travel direction. Alternatively, the travel driving unit 15 may include the encoder 15e configured to detect rotational speed of the motor 15m, the drive controller 10 controls the travel driving unit 15 such that a travel distance of the mobile robot 200 obtained from the detected rotational speed is shortened by the distance Y, and the drive controller 10 then stops the drawing unit 6.

Figure 29:
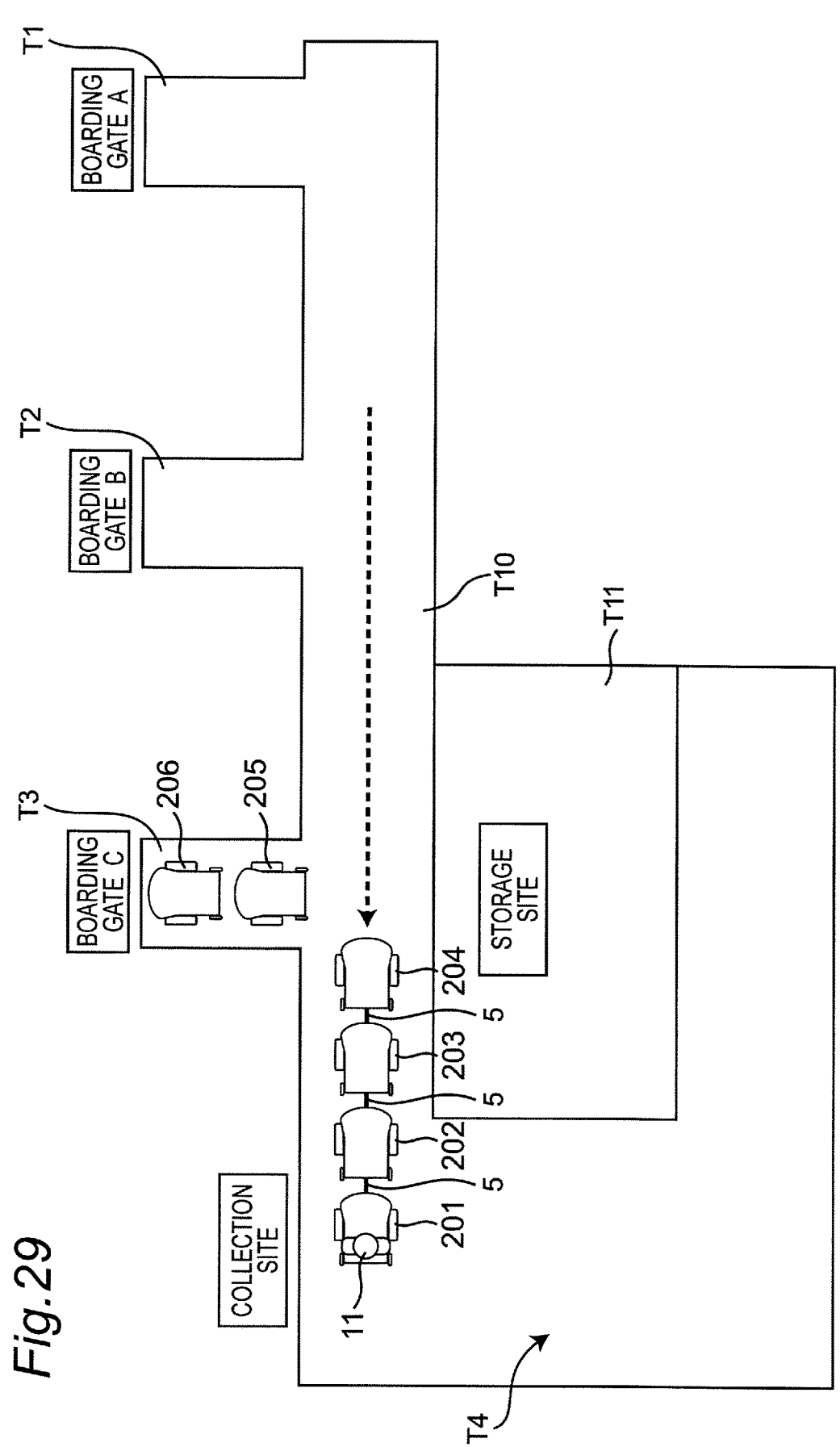
FIG. 29 is a state diagram of the collection flow according to the second embodiment of the present disclosure (depicting movement from in the vicinity of the boarding gate B to in the vicinity of a boarding gate C)

In subsequent step S24 "steer the mobile robot to the boarding gate C", as shown in FIG. 29, the collector 11 continuously steers the first mobile robot 201 to the common passage T10 in the vicinity of the location T3 as the boarding gate C. The collector 11 stops the first mobile robot 201 such that the mobile robots 201 to 204 align straight on the common passage T10 in the vicinity of the location T3 as the boarding gate C. The third and fourth mobile robots 203 and 204 travel to track the preceding second mobile robot 202 or the third mobile robot 203 with the distance a therebetween along the travel locus 5 drawn by the first mobile robot 201. The detection and the tracking correspond to the detection in step S52 and the tracking in step S53.

In this manner, the third and fourth mobile robots 203 and 204 execute step S52 and step S53 other than step S51 in the basic behavior shown in FIG. 26A.

The travel locus 5 is completely erased by the activated eraser 8 in the fourth mobile robot 204. Such behavior corresponds to step S54 and step S55 in the basic behavior shown in FIG. 26A.

Figure 30:
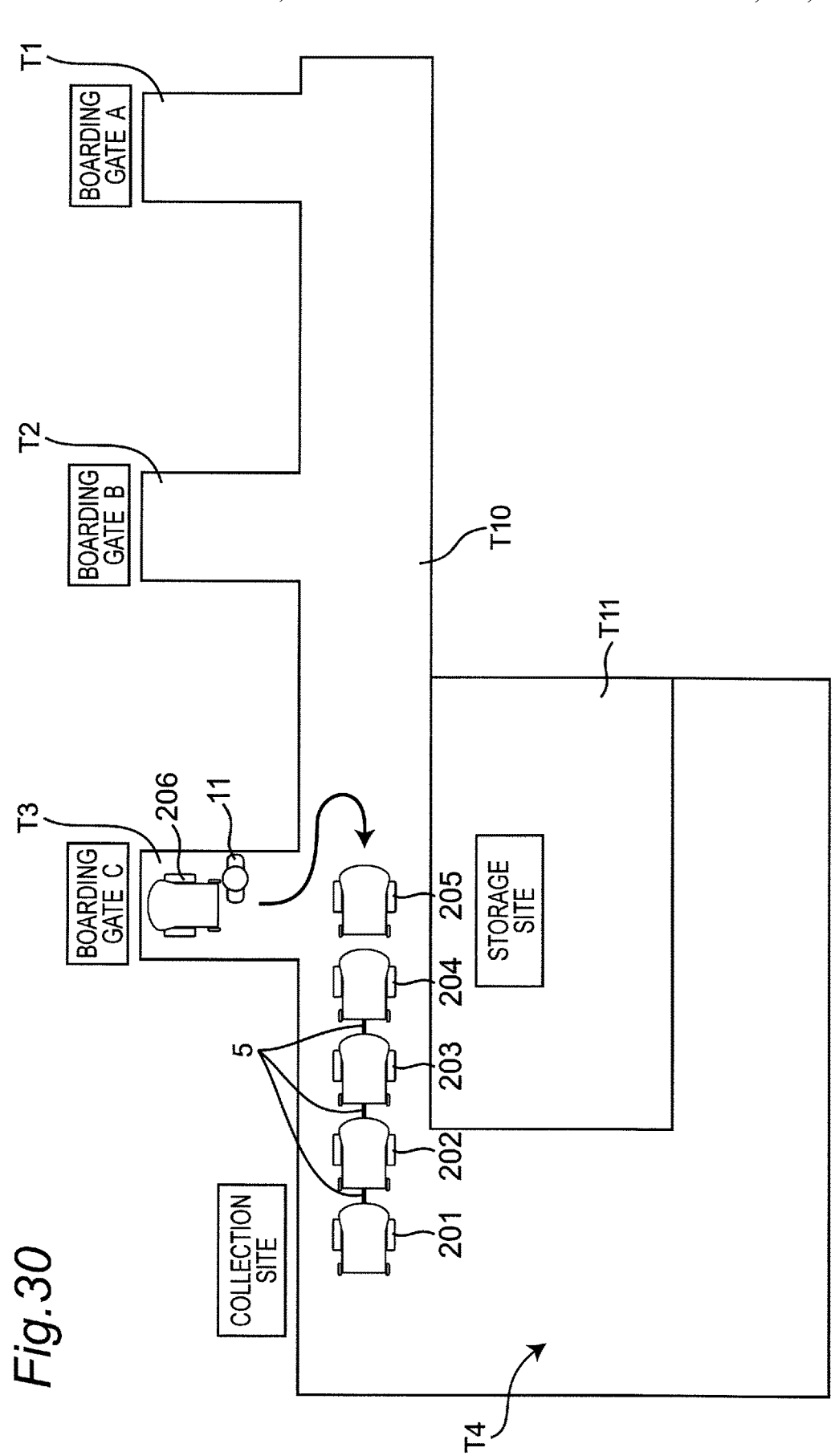
FIG. 30 is a state diagram of the collection flow according to the second embodiment of the present disclosure (depicting activation of the mobile robots in the vicinity of the boarding gate C)

In subsequent step S25 "activate the mobile robots at the boarding gate C", the collector 11 temporarily leaves the first mobile robot 201 and boards the fifth mobile robot 205 as shown in FIG. 30. The collector 11 manipulates the operation unit 16 to cause the drive controller 10 to stop the eraser 8 in the fourth mobile robot 204. The collector 11 starts steering the fifth mobile robot 205 and manipulates the operation unit 16 to move the mobile robots 205 and 206 at the location T3 as the boarding gate C as in step S21 and step S22 and dispose on the common passage T10 in the vicinity of the location T3 as the boarding gate C such that the mobile robots 205 and 206 are disposed behind the fourth mobile robot 204 and are directed identically and the first to sixth mobile robots 201 to 206 form a single line.

Specifically, the collector 11 steers the fifth mobile robot 205 to dispose the mobile robots 205 and 206 on the common passage T10 in the vicinity of the location T3 as the boarding gate C so that the detector 7 in each of the mobile robots 205 and 206 can detect the travel locus 5 drawn on the travel plane 19 by the drawing unit 6 in the first mobile robot 201, in other words, such that the mobile robots 204 to 206 align straight.

The collector 11 then activates the drawing unit 6 and the detector 7 in the fifth mobile robot 205 and activates the detector 7 and the eraser 8 in the sixth mobile robot 206.

After these units (namely, the drawing unit 6, the detector 7, and the eraser 8) are activated, the collector 11 boards the first mobile robot 201 again to restart steering the first mobile robot 201 toward the collection site T4. The mobile robots 205 and 206 continuously travel straight by the distance X until the detectors 7 each detect the travel locus 5, and the drive controller 10 in the fifth mobile robot 205 automatically stops the drawing unit 6 when the fifth mobile robot 205 travels by the distance Y after the detector 7 detects the travel locus 5.

The fifth and sixth mobile robots 205 and 206 subsequently execute step S52 and step S53 other than step S51 in the basic behavior shown in FIG. 26A. The sixth mobile robot 206 further executes step S54 and step S55 in the basic behavior shown in FIG. 26A.

Figure 31:
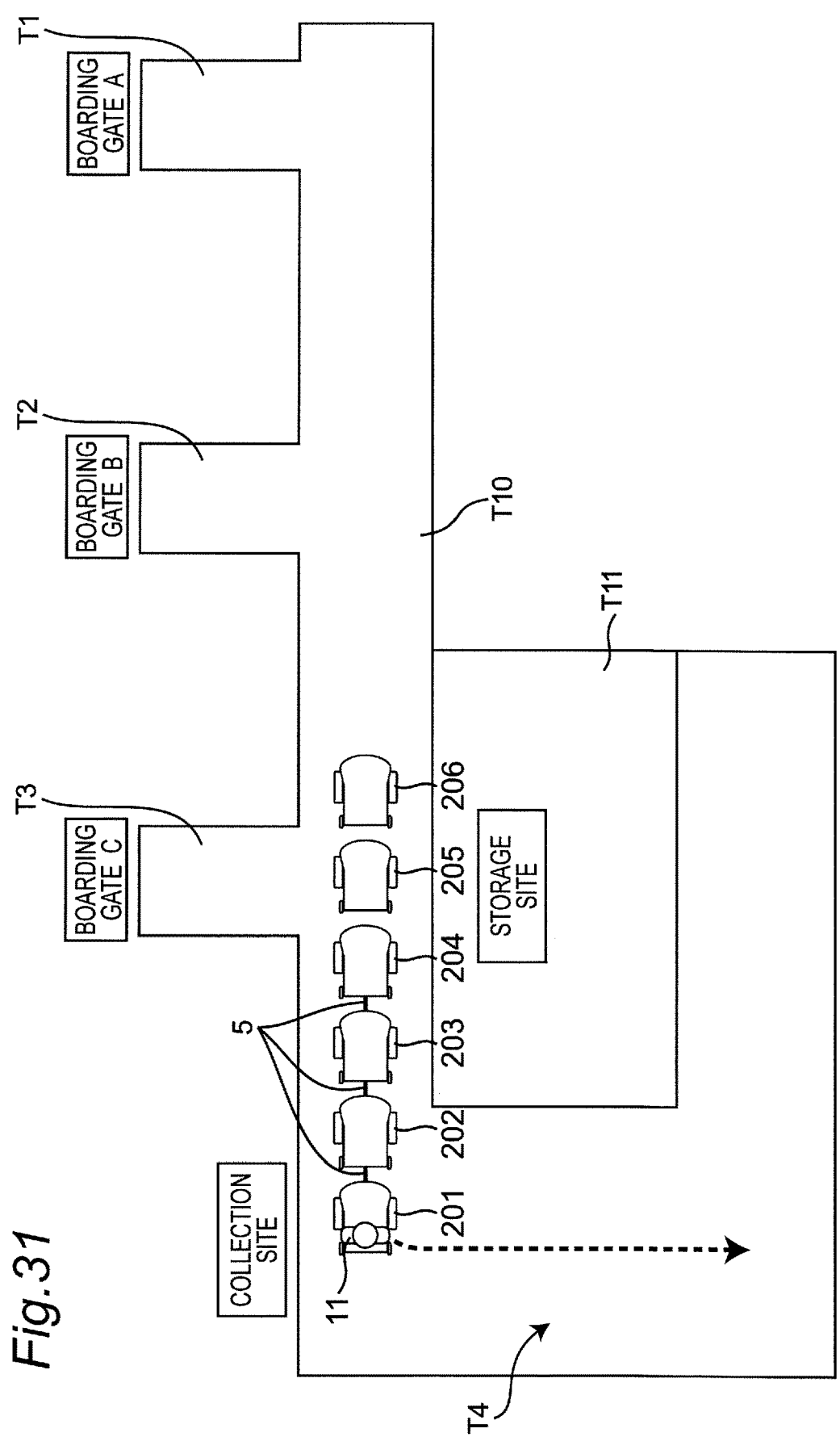
FIG. 31 is a state diagram of the collection flow according to the second embodiment of the present disclosure (depicting movement from in the vicinity of the boarding gate C to the collection site)
Figure 32:
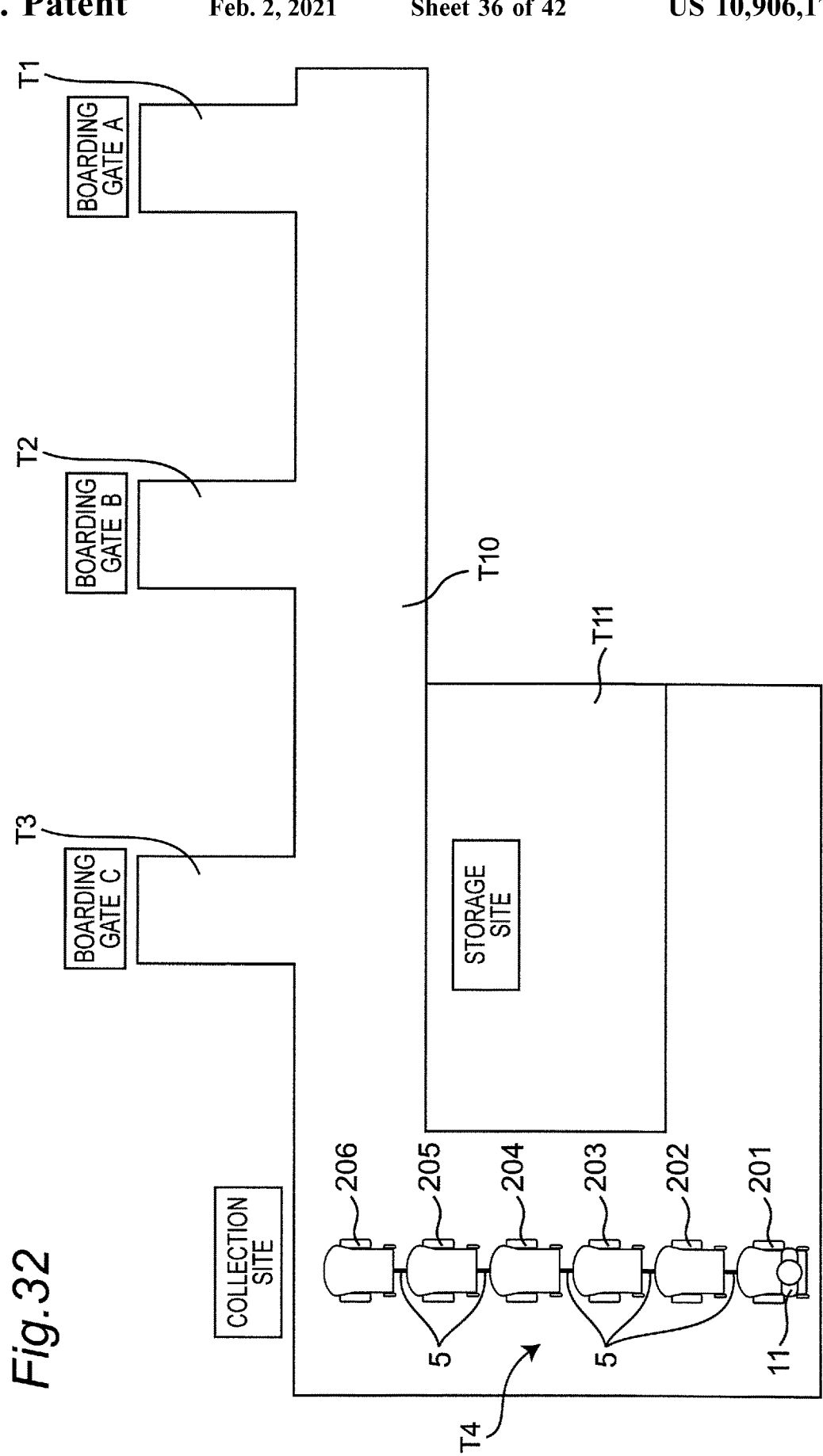
FIG. 32 is a state diagram of the collection flow according to the second embodiment of the present disclosure (depicting stopped positions of the mobile robots at the collection site)

In subsequent step S26 "steer the mobile robot to the collection site", as shown in FIG. 31, the collector 11 continuously steers the first mobile robot 201 to the common passage T10 in the vicinity of the collection site T4. As shown in FIG. 32, the collector 11 stops the first mobile robot 201 such that the first to sixth mobile robots 201 to 206 align straight to be collected at the collection site T4. The third to sixth mobile robots 203 to 206 travel to track the preceding second mobile robot 202, the third mobile robot 203, the fourth mobile robot 204, or the fifth mobile robot 205 with the distance α therebetween along the travel locus 5 drawn by the first mobile robot 201. The detection and the tracking correspond to the detection in step S52 and the tracking in step S53.

In subsequent step S27 "store the mobile robots", the collector 11 manipulates the operation unit 16 to move the first to sixth mobile robots 201 to 206 from the collection site T4 to a storage site T11.

Figure 33:
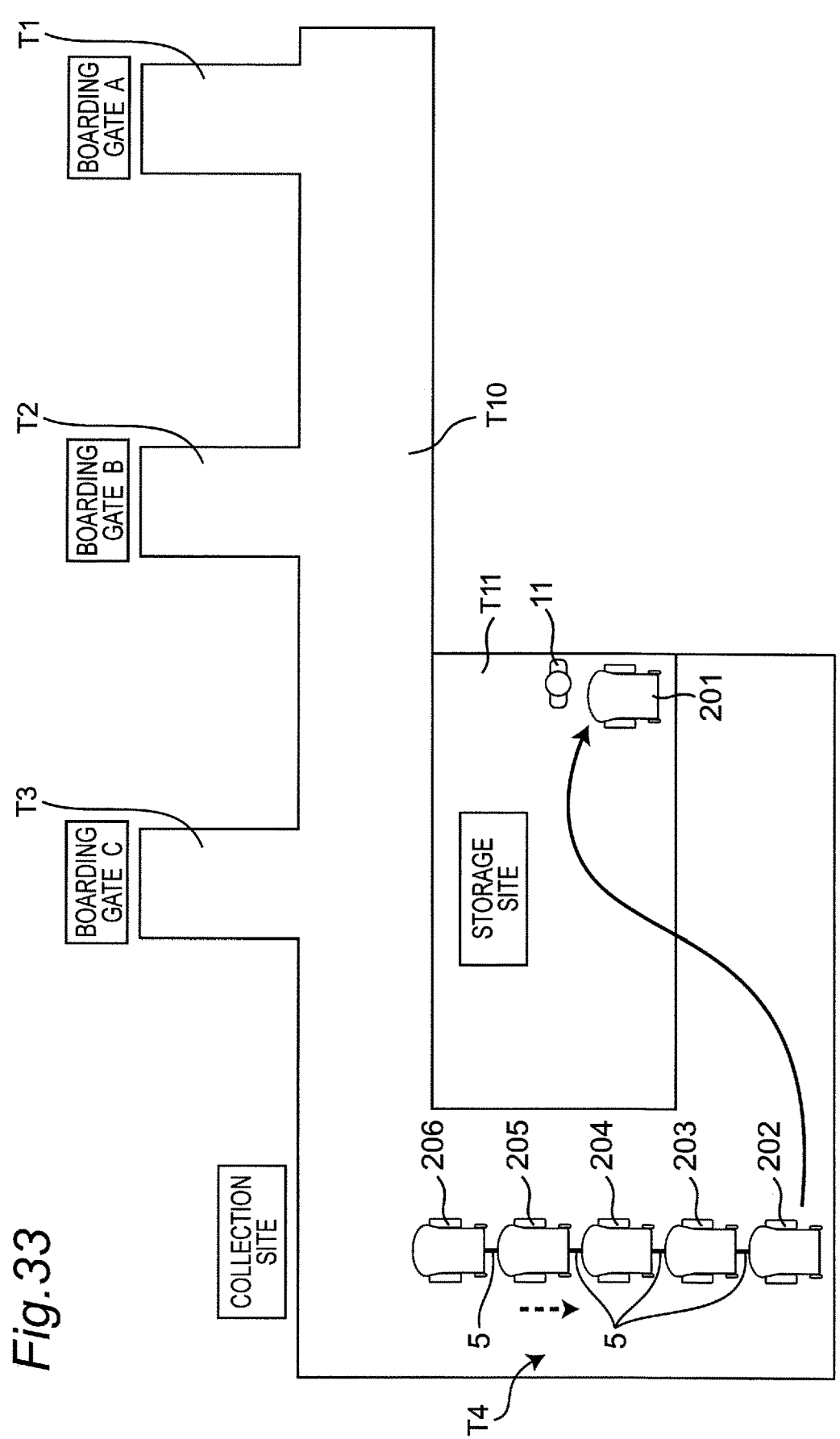
FIG. 33 is a state diagram of the collection flow according to the second embodiment of the present disclosure (depicting movement of a first mobile robot from the collection site to a storage site)

As exemplarily shown in FIG. 33, the collector 11 initially manipulates the operation unit 16 to cause the drive controller 10 to stop drawing by the drawing unit 6 in the first mobile robot 201, and manipulates the operation unit 16 to move the first mobile robot 201 to the storage site T11. The second to sixth mobile robots 202 to 206 travel forward until the detector 7 in the second mobile robot 202 becomes unable to detect the travel locus 5 drawn by the drawing unit 6 in the first mobile robot 201.

Figure 34:
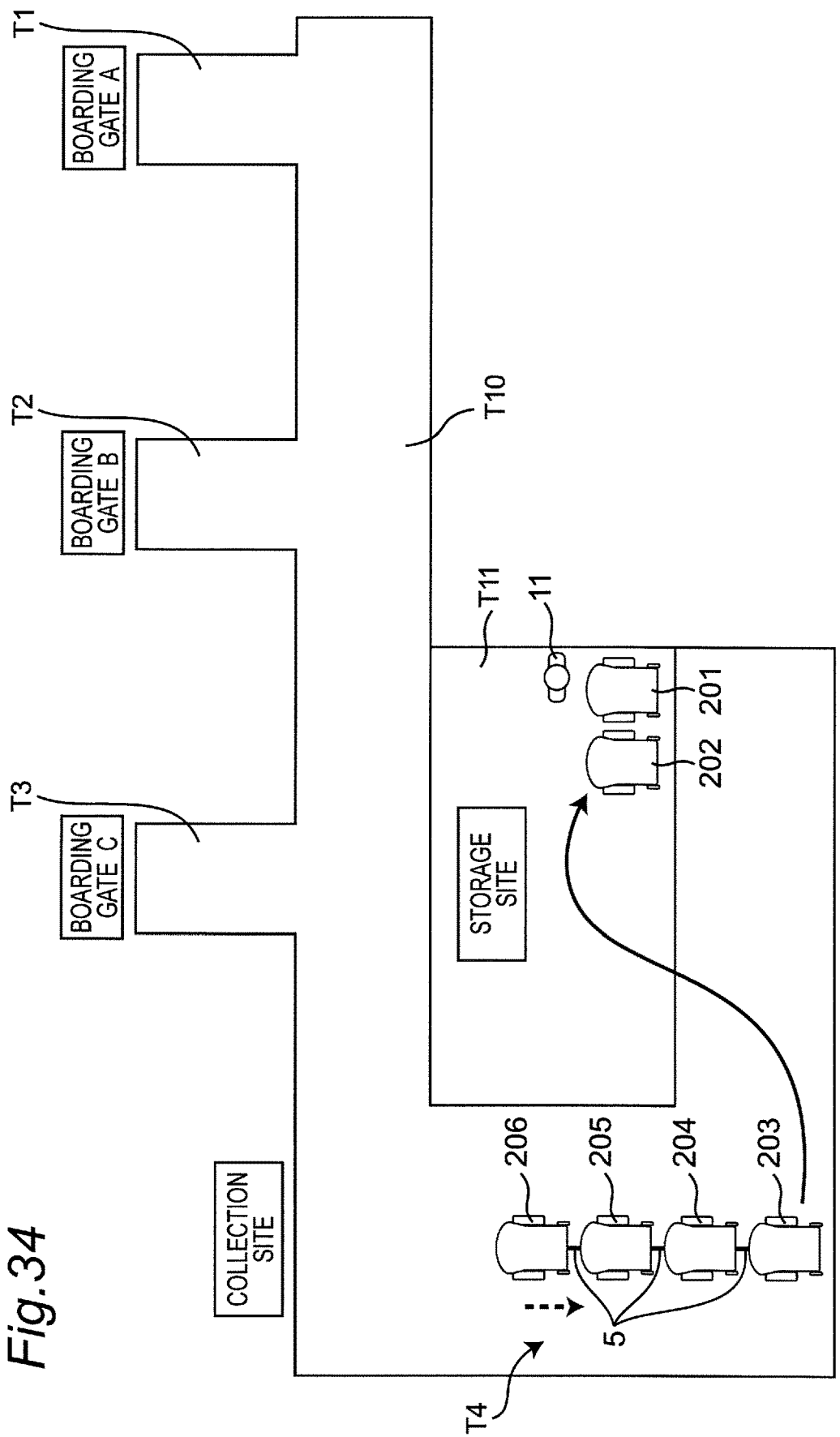
FIG. 34 is a state diagram of the collection flow according to the second embodiment of the present disclosure (depicting movement of a second mobile robot from the collection site to the storage site)

As shown in FIG. 34, the drive controller 10 subsequently stops detection by the detector 7 in the second mobile robot 202, and the collector 11 manipulates the operation unit 16 to move the second mobile robot 202 to the storage site T11. The third to sixth mobile robots 203 to 206 travel forward until the detector 7 in the third mobile robot 203 becomes unable to detect the travel locus 5 drawn by the drawing unit 6 in the first mobile robot 201. Such movement is repeated for each of the third to fifth mobile robots 203 to 205.

Figure 35:
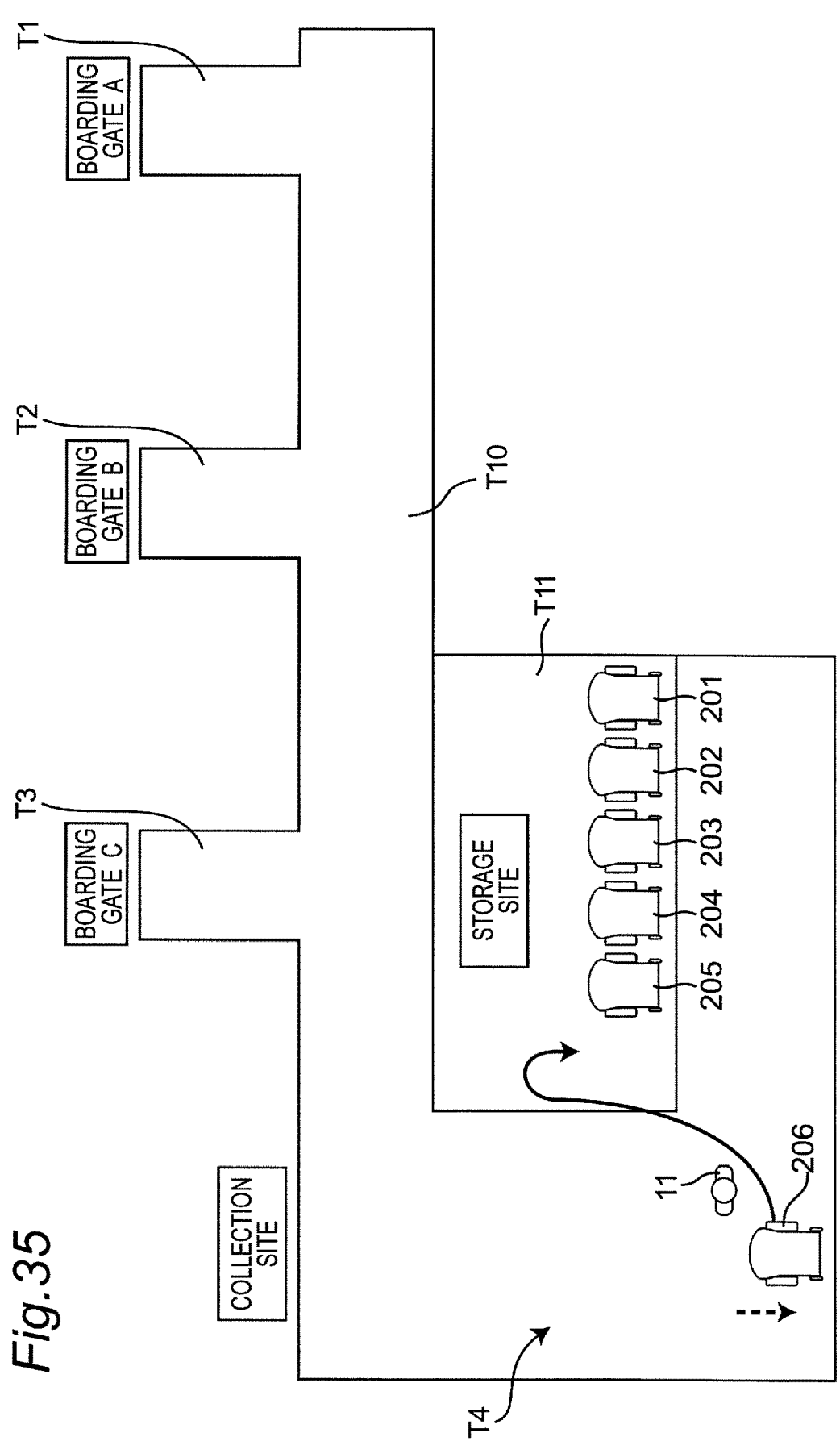
FIG. 35 is a state diagram of the collection flow according to the second embodiment of the present disclosure (depicting movement of a sixth mobile robot from the collection site to the storage site)

As shown in FIG. 35, when the sixth mobile robot 206 eventually travels forward and stops where no travel locus 5 is detected, the collector 11 causes the drive controller 10 to stop detection by the detector 7 and manipulates the operation unit 16 to move forward the sixth mobile robot 206 by the distance L.

The drive controller 10 then stops the eraser 8, and the collector 11 manipulates to move the sixth mobile robot 206 to the collection site T4. The travel locus 5 is completely erased by the activated eraser 8 in the sixth mobile robot 206.

The first mobile robot 201 is moved initially and the remaining mobile robots are moved sequentially in the above example. The present embodiment is not limited in the order of moving the first to fifth mobile robots 201 to 205 as long as the sixth mobile robot 206 including the activated eraser 8 moves last.

As described above, the mobile robots 200 can move while the eraser 8 is erasing the travel locus 5 drawn on the travel plane 19. This configuration achieves tracking control of the plurality of mobile robots 200 along the identical travel locus 5 that is not left on the travel plane 19.

Third Embodiment

Figure 36:
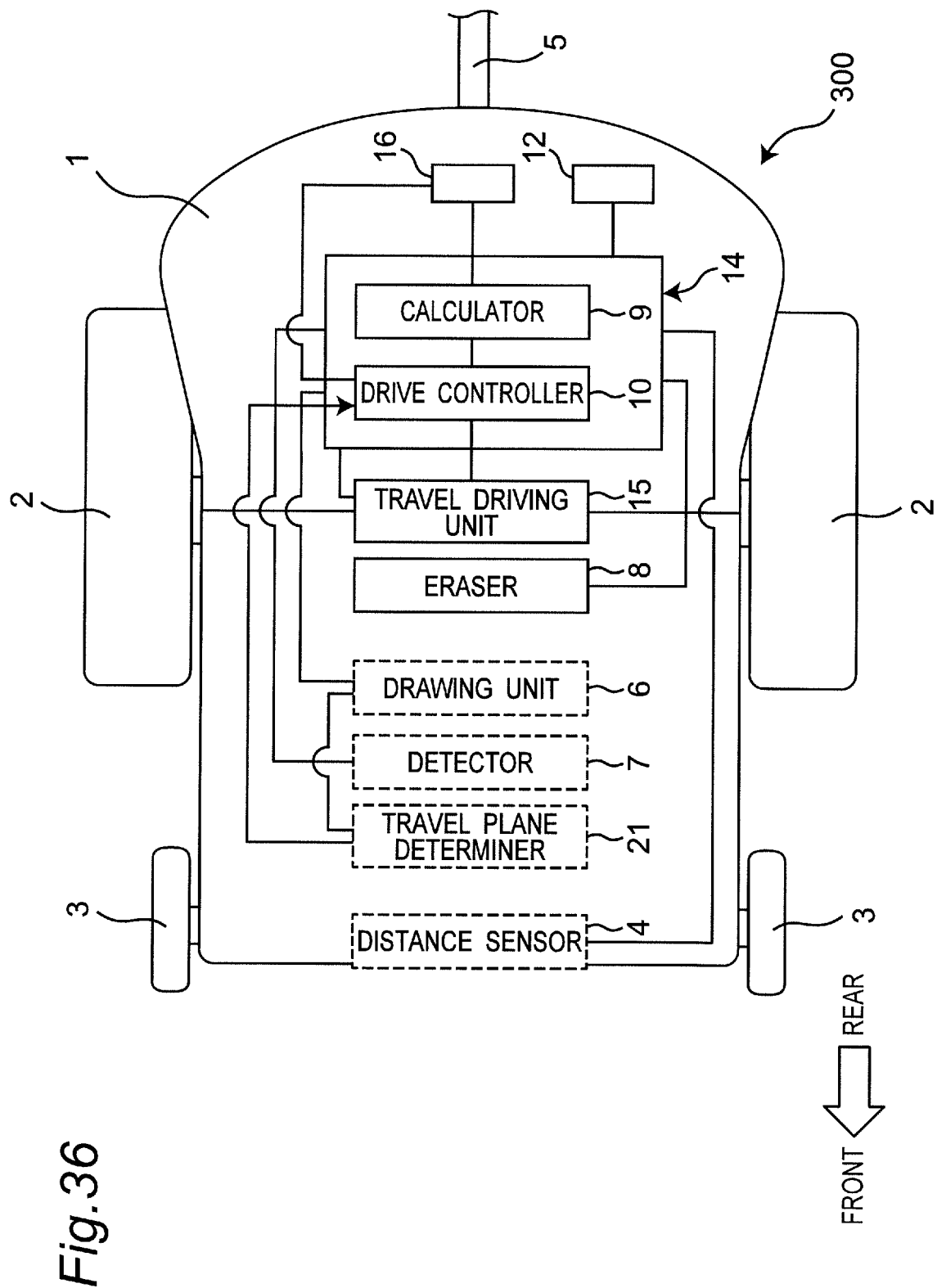
FIG. 36 is a schematic explanatory view from the top of a mobile robot according to a third embodiment of the present disclosure.

Described next with reference to FIG. 36 is a collection system S300 adopting tracking control of six mobile robots 300 according to the third embodiment of the present disclosure. For convenience in the description, the six mobile robots 300 will be denoted by a first mobile robot 301, a second mobile robot 302, a third mobile robot 303, a fourth mobile robot 304, a fifth mobile robot 305, and a sixth mobile robot 306.

Briefly, the collection system S300 is achieved by the mobile robots 300 each including the constituent elements according to the second embodiment and configured to automatically recognize the end of the line not by the collector 11 but by the mobile robots 300.

FIG. 36 is a schematic explanatory view from the top of the mobile robot 300 according to the third embodiment of the present disclosure. Similarly to the mobile robot 200 according to the second embodiment, the mobile robot 300 includes the mobile robot body 1, the drawing unit 6, the detector 7, the travel driving unit 15, the controller 14 including the drive controller 10, the eraser 8, as well as a rear tracking determiner 12 configured to determine whether or not there is any mobile robot 200 tracking from behind. The constituent elements identical with those included in the mobile robot 100 or 200 will be denoted by the identical reference signs and will not repeatedly be described in detail.

Examples of the rear tracking determiner 12, which will hereinafter be called the determiner 12, include an image sensor and any other element configured to recognize any mobile robot 300 disposed behind the mobile robot 300 including the determiner 12 executing determination. The determiner 12 exemplarily configured by an image sensor compares image information acquired by the image sensor with information such as an outline or color of the mobile robot 300, determines whether or not there is any mobile robot 300, and transmits a result of the determination to the drive controller 10 in the controller 14. In a case where the determiner 12 determines that there is no mobile robot 300 therebehind, the drive controller 10 in the controller 14 activates the eraser 8. In another case where the determiner 12 determines that there is the mobile robot 300 therebehind, the controller 14 does not activate the eraser 8.

In the collection flow according to the second embodiment, the collector 11 manipulates the operation unit 16 every time to activate and stop the eraser 8 in the mobile robot 200 at the end of the line. In contrast, the present third embodiment achieves automatically activating and stopping the eraser 8 in accordance with a result of determination by the controller 14. A specific collection flow according to the present embodiment is similar to the collection flow according to the second embodiment. The following will thus mainly mention differences therebetween with reference to the collection flow shown in FIG. 37 similar to the collection flow shown in FIG. 26B.

Figure 37:
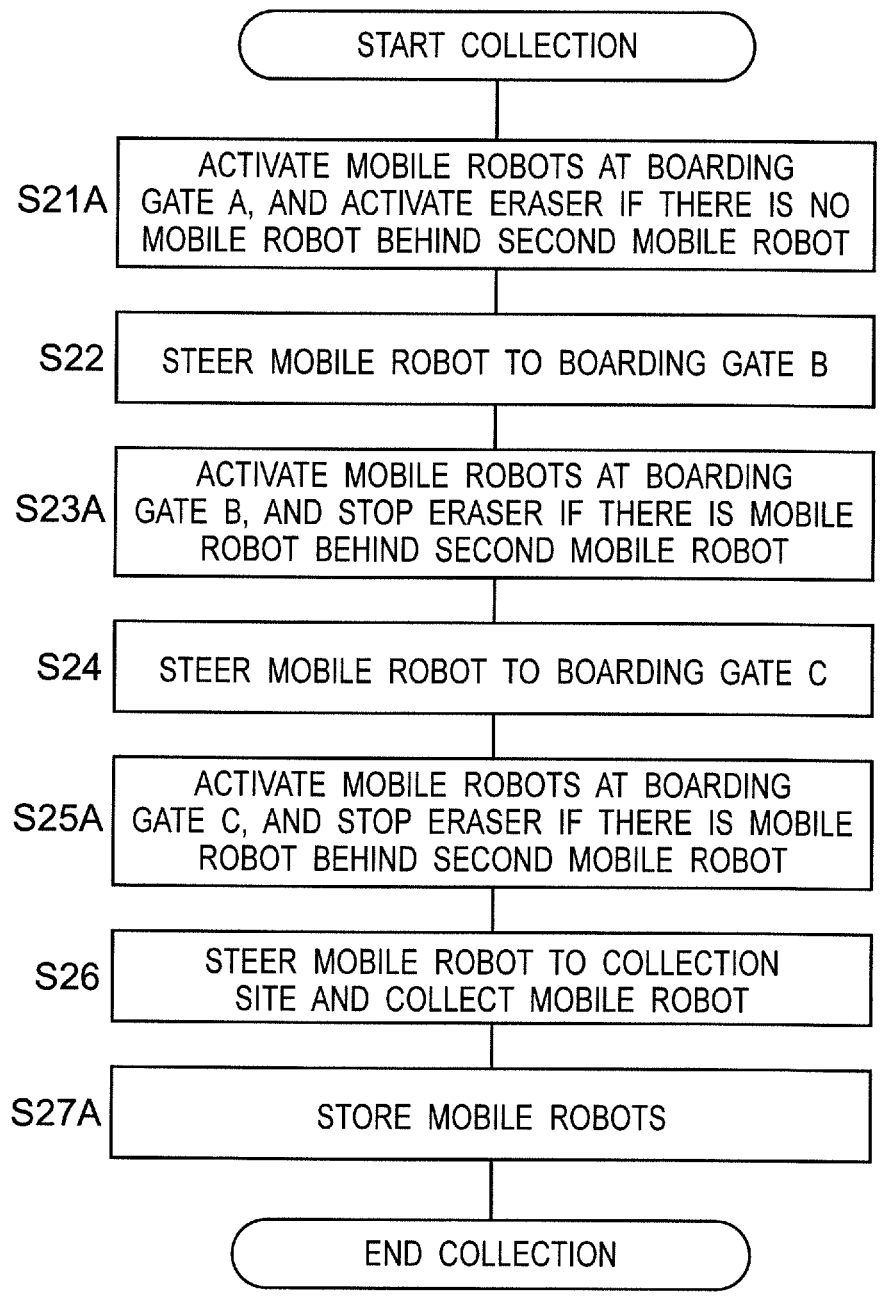
FIG. 37 is a collection flowchart for a collection system according to the third embodiment of the present disclosure.
Figure 38:
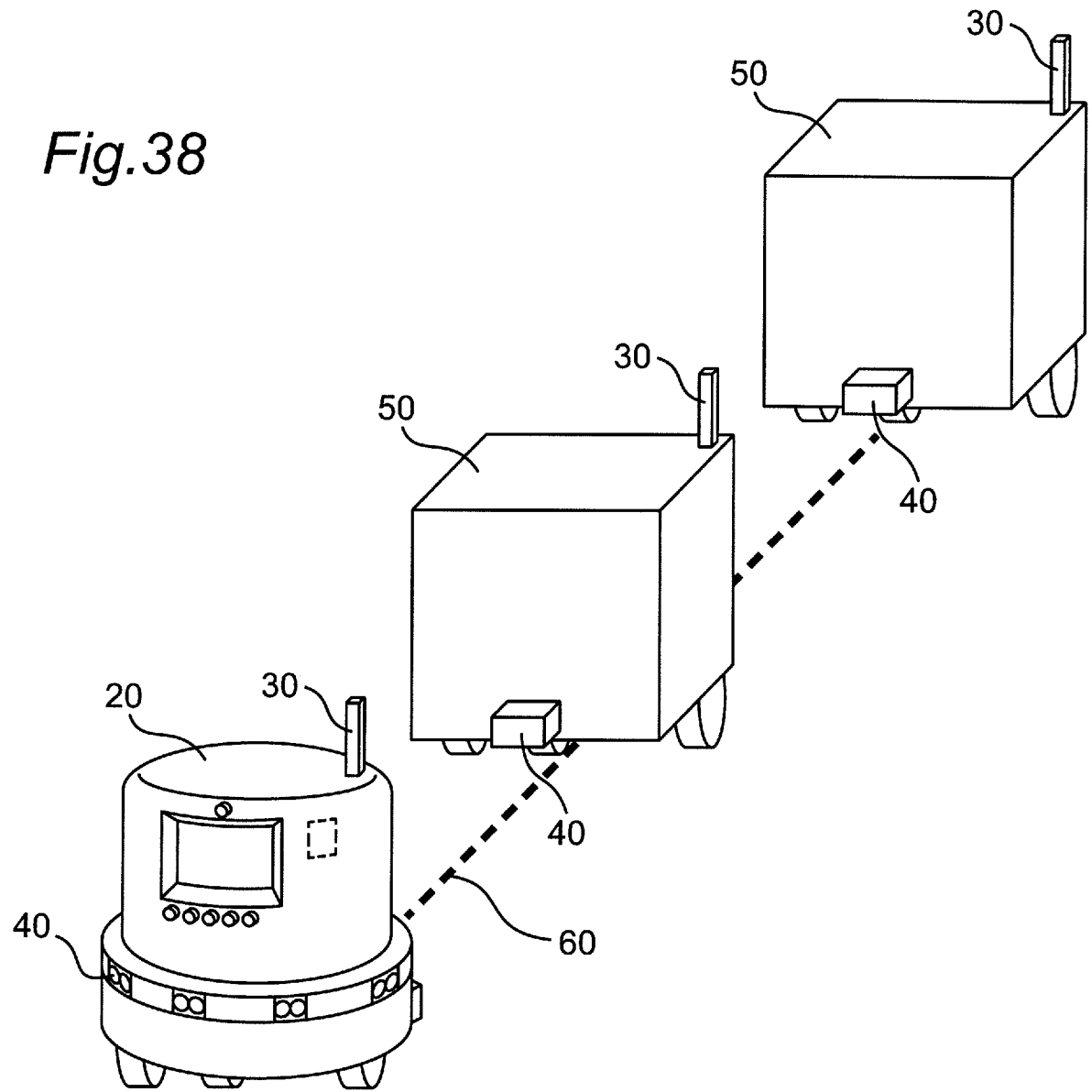
FIG. 38 is an outline view of tracking control along an identical travel locus of a plurality of mobile robots according to a conventional method.

Initially in step S21A in FIG. 37 "activate the mobile robots at the boarding gate A", as in FIG. 26B, the collector 11 expected to collect the mobile robots 300 moves to the location T1 as the boarding gate A and activates the drawing unit 6 in the mobile robot 301 and the detector 7 in the second mobile robot 302 disposed at the location T1 as the boarding gate A to be ready for starting drawing and detection. The determiner 12 in the second mobile robot 302 constantly determines whether or not there is any additional mobile robot 300 behind the second mobile robot 302 in accordance with a locus drawn by the drawing unit 6. If the determiner 12 in the second mobile robot 302 determines that there is no mobile robot 300 therebehind, the controller 14 activates the eraser 8.

Subsequent step S22 in FIG. 37 is similar to step S22 in FIG. 26A, and the collector 11 steers the mobile robot to the boarding gate B.

In subsequent step S23A in FIG. 37 "activate the mobile robots at the boarding gate B", the collector 11 temporarily leaves the first mobile robot 301 and boards the third mobile robot 303. The collector 11 then manipulates the operation unit 16 to cause the drive controller 10 to move the third and fourth mobile robots 303 and 304 at the location T2 as the boarding gate B as in step S21A and step S22 and dispose on the common passage T10 in the vicinity of the location T2 as the boarding gate B such that the third and fourth mobile robots 303 and 304 are disposed behind the second mobile robot 302 and are directed identically. If the determiner 12 in the second mobile robot 302 determines that there is the additional mobile robot 300 behind the second mobile robot 302, the drive controller 10 in the second mobile robot 302 stops the eraser 8. The determiner 12 in the second mobile robot 302 constantly determines whether or not there is any additional mobile robot 300 behind the second mobile robot 302. In a case where the third mobile robot 303 moves to be disposed behind the second mobile robot 302, the determiner 12 determines that there is the additional mobile robot 300 behind the second mobile robot 302. The determiner 12 transmits information on the determination to the drive controller 10 that stops the eraser 8 in the second mobile robot 302.

Subsequent step S24 in FIG. 37 is similar to step S24 in FIG. 26A, and the collector 11 steers the mobile robot to the boarding gate C.

In subsequent step S25A in FIG. 37 "activate the mobile robots at the boarding gate C", the collector 11 temporarily leaves the first mobile robot 301 and boards the fifth mobile robot 305. The collector 11 manipulates the operation unit 16 to start steering the fifth mobile robot 305 and manipulates the operation unit 16 to move the mobile robots 305 and 306 at the location T3 as the boarding gate C as in step S21A and step S22 and dispose on the common passage T10 in the vicinity of the location T3 as the boarding gate C such that the mobile robots 305 and 306 are disposed behind the fourth mobile robot 304 and are directed identically and the first to sixth mobile robots 301 to 306 form a single line. The determiner 12 in the fourth mobile robot 304 determines that there is the additional mobile robot 300 behind the fourth mobile robot 304, and the drive controller 10 stops the eraser 8.

Subsequent step S26 in FIG. 37 is similar to step S26 in FIG. 26A, and the collector 11 steers the mobile robot to the collection site.

In subsequent step S27A in FIG. 37 "store the mobile robots", when the drive controller 10 stops the detector 7 in the sixth mobile robot 306 at the end of the line, the collector 11 manipulates the operation unit 16 to move forward the sixth mobile robot 306 by the distance L and then manipulates the operation unit 16 to cause the drive controller 10 to stop the eraser 8.

Assume that the determiner 12 is configured by an image sensor or the like to detect and determine whether or not there is any other mobile robot 300 therebehind and recognize whether or not the mobile robot 300 is at the end of the line. The collector 11 can specify the mobile robot 306 at the end of the line instead of detection with the image sensor or the like. In such a case, there can be provided an input unit configured to receive input of information by the collector 11 to cause the mobile robot 306 at the end of the line to recognize as being at the end of the line.

As described above, the controller 14 can activate the eraser 8 in a case where the determiner 12 thus provided determines that there is no mobile robot 300 therebehind. In another case where the determiner 12 determines that there is the mobile robot therebehind, the controller 14 can cause the drive controller 10 to stop the eraser 8. This configuration achieves reduction in workload of the collector 11 as well as tracking control of the plurality of mobile robots 300 along the identical travel locus 5 that is not left on the travel plane 19.

The present disclosure has been described by exemplifying the first to third embodiments and the modification examples. The present disclosure is obviously not limited to the first to third embodiments or the modification examples. The present disclosure is also applicable to the following modes.

Part or entirety of each of the controllers 14 like the drive controller 10 is specifically configured by a computer system including a microprocessor, a ROM, a RAM, a hard disk unit, a display unit, a keyboard, a mouse, and the like. The RAM or the hard disk unit stores a computer program. The controllers 14 each achieve the function when the microprocessor operates in accordance with the computer program. The computer program includes a plurality of command codes indicating commands to a computer for achievement of a predetermined function.

The constituent elements are each achieved by causing a program executor like a CPU to read and execute a software program stored in a recording medium such as a hard disk or a semiconductor memory.

Software achieving part or entirety of the elements in the controller 14 according to any one of the embodiments and the modification examples is a program relevant to a method of tracking a mobile robot according to the following aspects. Specifically, this program is a control program relevant to a method of tracking a mobile robot for causing a computer to execute the following control or the following determination.

This program can be downloaded from a server or the like to be executed, or can be read from a predetermined recording medium (e.g. an optical disk like a CD-ROM, a magnetic disk, or a semiconductor memory) preliminarily storing the program.

This program can be executed by a single or a plurality of computers. In other words, the program can be processed in a centralized or decentralized manner.

The embodiments of the present disclosure have been described in detail above with reference to the drawings, and various aspects of the present disclosure will be described below.

According to a first aspect of the present disclosure, there is provided a mobile robot comprising:

a mobile robot body;

a drawing unit provided at the mobile robot body and including a marker configured to draw a travel locus of the mobile robot on a travel plane;

a detector provided at the mobile robot body and configured to detect the travel locus drawn by the drawing unit;

a travel driving unit configured to drive to move the mobile robot body; and a drive controller configured to drive control the travel driving unit such that the mobile robot body travels along the travel locus detected by the detector.

According to a second aspect of the present disclosure, there is provided the mobile robot according to the first aspect, wherein the drawing unit and the detector are disposed in series in the mobile robot body in a travel direction of the mobile robot and the drawing unit is positioned ahead of the detector.

According to a third aspect of the present disclosure, there is provided the mobile robot according to the first or second aspect, further comprising an eraser provided at the mobile robot body and configured to erase the travel locus drawn on the travel plane by the drawing unit.

According to a fourth aspect of the present disclosure, there is provided the mobile robot according to the third aspect, further comprising
a determiner provided at the mobile robot body and configured to determine whether or not the mobile robot is at an end of a line in accordance with information on whether or not there is any mobile robot behind the mobile robot body,
wherein when the determiner determines that the mobile robot is at the end of the line, the erasers erases the travel locus drawn on the travel plane by the drawing unit.

According to a fifth aspect of the present disclosure, there is provided the mobile robot according to any one of the first to fourth aspects,
assuming that the drawing unit including the marker is referred to as a first drawing unit,
the mobile robot further comprising:
a second drawing unit provided at the mobile robot body and including a particle discharge mechanism configured to scatter particles to draw the travel locus of the mobile robot on the travel plane; and
a travel plane determiner provided at the mobile robot body and configured to detect and determine a type of the travel plane,
wherein the first drawing unit or the second drawing unit is selectively driven in accordance with a result of determination by the travel plane determiner.

According to a sixth aspect of the present disclosure, there is provided a method of tracking a mobile robot when a plurality of mobile robots, each configured identically to the mobile robot according to anyone of the first to fifth aspects, executes tracking travel in a single line, the method comprising:
determining whether each of the mobile robots is at a forefront of the line;
in a first case where the mobile robot is at the forefront of the line, moving the mobile robot at the forefront of the line while drawing the travel locus on the travel plane by the drawing unit; and
in a second case where the mobile robot is not at the forefront of the line but is tracking, detecting the travel locus drawn on the travel plane by the detector in the tracking mobile robot; and tracking the detected travel locus by the tracking mobile robot to execute tracking travel.

According to a seventh aspect of the present disclosure, there is provided the method of tracking a mobile robot according to the sixth aspect, when a plurality of mobile robots, each configured identically to the mobile robot according to the fourth aspect, executes tracking travel in a single line, the method comprising:
determining whether each of the mobile robots is at a forefront of the line;
in a first case where the mobile robot is at the forefront of the line, moving the mobile robot at the forefront of the line while drawing the travel locus on the travel plane by the drawing unit; and
in a second case where the mobile robot is not at the forefront of the line but is tracking, tracking while detecting the travel locus by the detector in the tracking mobile robot; and determining by the determiner provided at the mobile robot body whether the mobile robot is at an end of the line, and when the determiner determines that the mobile robot is at the end of the line, executing tracking travel while erasing the travel locus by the eraser in the mobile robot at the end of the line.

Any of the various embodiments and the modification examples can be appropriately combined to achieve effects thereof. The present disclosure is applicable to appropriate combination among the embodiments, appropriate combination among the examples, appropriate combination among the embodiments and the examples, as well as appropriate combination of different features in the embodiments or the examples.

The mobile robot and the method of tracking the mobile robot according to any one of the aspects of the present disclosure are applicable to simultaneous collection of a plurality of mobile robots each loading cargo or a person in a large facility such an air terminal.

What is claimed is:
1. A method of tracking a mobile robot when a plurality of mobile robots executes tracking travel in a single line, each of the mobile robots comprising:
a mobile robot body;
a drawing unit provided at the mobile robot body and including a marker configured to draw a travel locus of the mobile robot on a travel plane;
a detector provided at the mobile robot body and configured to detect the travel locus drawn by the drawing unit;
a travel driving unit configured to drive to move the mobile robot body; and
a drive controller configured to drive control the travel driving unit such that the mobile robot body travels along the travel locus detected by the detector;
an eraser provided at the mobile robot body and configured to erase the travel locus drawn on the travel plane by the drawing unit; and
a determiner provided at the mobile robot body and configured to determine whether or not the mobile robot is at an end of a line in accordance with information on whether or not there is any mobile robot behind the mobile robot body,
and wherein when the determiner determines that the mobile robot is at the end of the line, the erasers erases the travel locus drawn on the travel plane by the drawing unit,
the method comprising:
determining whether each of the mobile robots is at a forefront of the line;
in a first case where the mobile robot is at the forefront of the line, moving the mobile robot at the forefront of the line while drawing the travel locus on the travel plane by the drawing unit; and
in a second case where the mobile robot is not at the forefront of the line but is tracking, detecting the travel locus drawn on the travel plane by the detector in the tracking mobile robot, tracking the detected travel locus by the tracking mobile robot to execute tracking travel, and
determining by the determiner provided at the mobile robot body whether the mobile robot is at an end of the line, and when the determiner determines that the mobile robot is at the end of the line, executing tracking travel while erasing the travel locus by the eraser in the mobile robot at the end of the line.

2. The method of tracking a mobile robot according to claim 1,
   wherein the drawing unit and the detector are disposed in series in the mobile robot body in a travel direction of the mobile robot and the drawing unit is positioned ahead of the detector.

3. The method of tracking a mobile robot according to claim 1, wherein the drawing unit in the mobile robot at the forefront of the line executes drawing after the detector finds that there is no travel locus.

4. The method of tracking a mobile robot according to claim 2, wherein the drawing unit in the mobile robot at the forefront of the line executes drawing after the detector finds that there is no travel locus.

5. The method of tracking a mobile robot according to claim 1,
   wherein assuming that the drawing unit including the marker is referred to as a first drawing unit,
   the mobile robot further comprises:
      a second drawing unit provided at the mobile robot body and including a particle discharge mechanism configured to scatter particles to draw the travel locus of the mobile robot on the travel plane; and
      a travel plane determiner provided at the mobile robot body and configured to detect and determine a type of the travel plane,
   wherein the first drawing unit or the second drawing unit is selectively driven in accordance with a result of determination by the travel plane determiner.

* * * * *